US008405799B2

(12) United States Patent
Fujisawa et al.

(10) Patent No.: US 8,405,799 B2
(45) Date of Patent: Mar. 26, 2013

(54) POLYMER-STABILIZED LIQUID CRYSTAL COMPOSITION, LIQUID CRYSTAL DISPLAY DEVICE, METHOD FOR PRODUCING LIQUID CRYSTAL DISPLAY DEVICE

(75) Inventors: Toru Fujisawa, Kitaadachi-gun (JP); Kiyofumi Takeuchi, Kitaadachi-gun (JP); Kazuaki Hatsusaka, Kitaadachi-gun (JP); Isa Nishiyama, Kitaadachi-gun (JP); Shunsuke Kobayashi, Tokyo (JP)

(73) Assignee: DIC Corporation, Tokyo (JP)

( * ) Notice: Subject to any disclaimer, the term of this patent is extended or adjusted under 35 U.S.C. 154(b) by 531 days.

(21) Appl. No.: 12/594,034

(22) PCT Filed: Mar. 25, 2008

(86) PCT No.: PCT/JP2008/055549
§ 371 (c)(1),
(2), (4) Date: Jan. 12, 2010

(87) PCT Pub. No.: WO2008/123235
PCT Pub. Date: Oct. 16, 2008

(65) Prior Publication Data
US 2010/0149446 A1 Jun. 17, 2010

(30) Foreign Application Priority Data

Mar. 30, 2007 (JP) ................................ 2007-090521

(51) Int. Cl.
*G02F 1/1343* (2006.01)
*C09K 19/38* (2006.01)
*C09K 19/34* (2006.01)
*C09K 19/52* (2006.01)
*C09K 19/12* (2006.01)
*C09K 19/20* (2006.01)

(52) U.S. Cl. .............. 349/88; 349/42; 349/51; 349/139; 349/183; 349/191; 252/299.01; 252/299.5; 252/299.61; 252/299.66; 252/299.67

(58) Field of Classification Search .............. 252/299.01, 252/299.61, 299.66, 299.6, 299.57, 299.5, 252/299.67; 349/38, 88, 183, 191, 42, 51, 349/139
See application file for complete search history.

(56) References Cited

U.S. PATENT DOCUMENTS

| 6,730,241 | B2* | 5/2004 | Obi et al. ................. 252/299.67 |
| 7,871,540 | B2* | 1/2011 | Yamazaki et al. ....... 252/299.01 |
| 2003/0122105 | A1 | 7/2003 | Ichihashi |
| 2004/0011994 | A1 | 1/2004 | Yumoto et al. |
| 2005/0127326 | A1 | 6/2005 | Ichihashi |
| 2007/0170394 | A1 | 7/2007 | Kawamura et al. |

FOREIGN PATENT DOCUMENTS

| JP | 58-196285 A | 11/1983 |
| JP | 62-32170 A | 2/1987 |
| JP | 6-194635 A | 7/1994 |
| JP | 6-222320 A | 8/1994 |
| JP | 9-13036 A | 1/1997 |
| JP | 9-111239 A | 4/1997 |
| JP | 9-211462 A | 8/1997 |
| JP | 9-211463 A | 8/1997 |
| JP | 11-21554 A | 1/1999 |
| JP | 2000-226582 A | 8/2000 |
| JP | 2002-265421 A | 9/2002 |
| JP | 2002-265945 A | 9/2002 |
| JP | 2003-66422 A | 3/2003 |
| JP | 2003-82352 A | 3/2003 |
| JP | 2003-248226 A | 9/2003 |
| JP | 2003-313292 A | 11/2003 |
| JP | 2004-277488 A | 10/2004 |
| JP | 2005-10202 A | 1/2005 |
| JP | 2006-16599 A | 1/2006 |
| JP | 2006045416 A | * 2/2006 |
| JP | 2006276649 A | * 10/2006 |
| JP | 2006-348133 A | 12/2006 |
| JP | 2007045963 A | * 2/2007 |
| JP | 2007065286 A | * 3/2007 |
| JP | 2007091650 A | * 4/2007 |

OTHER PUBLICATIONS

Niwa, Haruki et al.; "An Efficient Enantioselective Synthesis of (+)-Indicine N-Oxide, An Antitumor Pyrrolizidine Alkaloid"; Tetrahedron Letters, 1989, pp. 4985-4986, vol. 30, No. 37.
Oku, Akira et al.; "Selective Cleavage of Ethers by Sodium Iodide-Acyl Chloride"; Tetrahedron Letters, 1982, pp. 681-684, vol. 23, No. 6.
Furue, Hirokazu et al.,; "Fabrication of Zigzag Defect- Free Surface-Stabilized Ferroelectric Liquid Crystal Display Using Polyimide Orientation Film"; Jpn. J. Appl. Phys, 1998, pp. 3417-3421, vol. 37.
Furue, Hirokazu et al.; "Mesogenic Polymer Stabilized Ferroelectric Liquid Crystal Display Exhibiting Monostability with High Contrast Ratio and Grayscale Capability."; Jpn. J. Appl. Phys., (1997), pp. L1517-L1519, vol. 36.
Itoh, Hideyuki et al.; "Synthesis of New Hybrid Monomers and Oligomers Containing Cationic and Radical Polymerizable Vinyl Groups and Their Photoinitiated Polymerization"; Journal of Polymer Science: Part A: Polymer Chemistry, 1996, pp. 217-225, vol. 34.

(Continued)

Primary Examiner — Shean C Wu
(74) Attorney, Agent, or Firm — Westerman, Hattori, Daniels & Adrian LLP

(57) ABSTRACT

An object of the present invention is to obtain a polymer-stabilized liquid crystal composition which can suppress dependency of a driving voltage on a temperature by decreasing the driving voltage. To a low-molecular liquid crystal compound, a chiral compound, and a specific acrylate and a polymerizable liquid crystal compound as polymerizable acrylate compounds are added, to prepare a polymer-stabilized liquid crystal composition. By subjecting the polymer-stabilized liquid crystal composition to ultraviolet exposure while maintaining a desired alignment state to form a polymer chain in a liquid crystal phase, a polymer-stabilized liquid crystal display device containing a low-molecular liquid crystal in a stabilized alignment state is obtained.

19 Claims, 3 Drawing Sheets

OTHER PUBLICATIONS

Konno, Takayuki et al.; "OCB-cell using the polymer stabilized bend alignment cell"; The Institute of Electronics, Information and Communication Engineers, Technical Report of IEICE, EID95-17, 1995, pp. 43-48, including an English abstract in front page.

International Search Report for PCT/JP2008/055549, mailing date of Jul. 1, 2008.

\* cited by examiner

POLYMER-STABILIZED LIQUID CRYSTAL COMPOSITION, LIQUID CRYSTAL DISPLAY DEVICE, METHOD FOR PRODUCING LIQUID CRYSTAL DISPLAY DEVICE

TECHNICAL FIELD

The present invention relates to a composition which is useful for a polymer-stabilized liquid crystal display device that can be operated by an active device, and a polymer-stabilized liquid crystal display device using the relevant composition and a method for producing the same.

BACKGROUND ART

As a technique of stabilizing liquid crystal alignment using a polymer, a technique is disclosed in which a photocurable monomer is added to a twisted nematic liquid crystal, followed by light irradiation in an attempt in polymer-stabilization of alignment (refer to Non-Patent Document 1). The nematic liquid crystal described in the relevant cited document retains an original twisted structure before polymer stabilization is performed even after photocuring, and tries not to eliminate liquid crystallinity and alignment properties of a liquid crystal material for display by using a liquid crystalline monomer containing a liquid crystal skeleton as a photocurable monomer.

The relevant cited document discloses an example of a polymer-stabilized liquid crystal device produced by adding a photocurable monomer into a twisted nematic liquid crystal host in a concentration of several %, followed by light irradiation in a state where no voltage is applied. Furthermore, Examples disclose voltage-dielectric constant characteristics when the concentration of the liquid crystalline monomer is varied (2%, 3%, 4%, 5%). As is apparent from the results, a saturated dielectric constant decreases when the addition amount of the liquid crystalline monomer increases so as to have a higher voltage applied for saturation, and thus a driving voltage increases, resulting in an increased driving voltage of the device. This is a point of issue in practical use of a polymer-stabilized liquid crystal device.

When a smectic liquid crystal is used for the liquid crystal device, it exhibits behavior which is basically different from that of a nematic phase. When the smectic phase is applied for the liquid crystal display device, we utilize a phenomenon that a major axis of liquid crystal molecules (direction of molecules) inclines from a direction where a layer structure of a smectic phase is formed. An angle at which liquid crystal molecules incline from a layer normal line direction is called as a tilt angle, which is a characteristic physical property when the smectic liquid crystal is used for the liquid crystal device, and acquisition of the tilt angle suited for the liquid crystal device is desirable. However, the cited document does not disclose an influence on this tilt angle.

As an example of applying a polymer-stabilized twisted nematic liquid crystal for a TFT liquid crystal display device, a technique is disclosed in which a small amount of a photocurable liquid crystalline monomer is added and polymerized in a TFT liquid crystal display device, thereby stabilizing alignment by an action of the formed polymer (refer to Patent Document 1). However, in the relevant cited document, a response speed of a liquid crystal upon falling is revised, but aforementioned problem of the driving voltage is not solved. Also, the cited document does not disclose an influence that addition of the photocurable liquid crystal monomer exerts on aforementioned tilt angle.

In a polymer-stabilized liquid crystal display device, a technique of applying for an OCB (optically compensated birefringence) mode is proposed, except for a twisted nematic liquid crystal display mode (refer to Non-Patent Document 2). The relevant cited document discloses a technique of dispersing liquid crystal molecules in a photoreactive monomer, applying an external electric field to obtain a desired bend alignment structure, and immobilizing the bend alignment by light irradiation. In the OCB mode, liquid crystal molecules take spray alignment in an initial state by applying a high voltage when a display device is booted. Since it requires an alignment transition operation for converting it into bend alignment, the bend alignment is preliminarily immobilized with a polymer so as to enable display boot without requiring an alignment transition operation to this bend alignment, as well as display by the OCB mode, and thus overcoming drawbacks of the OCB mode.

There is also a technique disclosed in which liquid crystal molecules are immobilized in a polymer liquid crystal matrix on a sheet of substrate, thereby immobilizing hybrid alignment, and two sheets of substrate are laminated so as to contact the homogeneous alignment portion on the substrate to make bent alignment of an OCB mode, which is used for a liquid crystal display device (refer to Patent Document 2). This case is characterized by forming bent alignment without applying a voltage.

However, aforementioned problem of the driving voltage is not solved in these inventions disclosed in the cited documents, and also the cited documents do not disclose an influence of the addition of the photocurable liquid crystal monomer on aforementioned tilt angle.

With respect to a polymer-stabilized ferroelectric liquid crystal (polymer-stabilized FLC), there is a proposed technique for making an attempt of polymer stabilization, in which a FLC material is used together with a monomer, and ultraviolet rays are irradiated while liquid crystal molecules are aligned in one direction by applying an eclectic field (refer to Non-Patent Documents 3 and 4).

There is also a polymer-stabilized ferroelectric liquid crystal display device disclosed, which is obtained by injecting a liquid crystal composition containing a ferroelectric liquid crystal and a monofunctional liquid crystalline (meth)acrylate monomer into a liquid crystal cell, and irradiating it with ultraviolet rays at a temperature at which the composition exhibits a predetermined liquid crystal phase, thereby polymerizing the monofunctional liquid crystalline (meth)acrylate monomer (refers to Patent Documents 3, 4, and 5). Although polymer stabilization for the alignment of liquid crystal molecules imparts a novel function, and aforementioned OCB mode and a device using a monofunctional liquid crystalline (meth)acrylate as a ferroelectric liquid crystal have such features as obtaining satisfactory bent alignment and enabling satisfactory grayscale display, there was a problem that the polymer obtained by polymerization of the monofunctional liquid crystalline (meth)acrylate monomer had unfavorable heat resistance, resulting in unsatisfactory reliability at a high temperature. Furthermore, there was a problem that the driving voltage was high in a device using a monofunctional liquid crystalline (meth)acrylate as a ferroelectric liquid crystal. There was also a problem of high driving voltage in a document disclosed, in which it becomes possible to achieve grayscale display in proportion to an applied voltage when polymer stabilization is conducted by ultraviolet exposure in a smectic A phase and phase transition is conducted by annealing to the smectic C phase (refer to Patent Document 3). As described above, aforementioned problem of the driving voltage is not solved in these inventions disclosed in the cited documents, and also the cited documents do not disclose an influence that the addition of the photocurable liquid crystal monomer exerts on aforementioned tilt angle.

There is a polymer-stabilized ferroelectric liquid crystal display device disclosed, using a polyfunctional liquid crystalline monomer which gives a polymer having superior heat resistance to a monofunctional liquid crystalline (meth)acrylate monomer (refer to Patent Document 6). However, many of the polyfunctional liquid crystalline monomers require a high temperature (80° C. or higher) at which liquid crystallinity is exhibited, and it becomes necessary to raise temperature in a stage before ultraviolet rays are irradiated for production of a polymer-stabilized liquid crystal device. As a result, there occurred a problem that undesirable thermopolymerization is induced, resulting in deterioration of uniformity of liquid crystal alignment.

Since the content of a liquid crystal is from 60 to 95% by weight and the remainder is a network-shaped polymer, light scattering commonly observed in polymer-dispersed liquid crystals arises. This scattering causes a decrease in contrast of a display device using polarized light. Therefore, the liquid crystal display device had a drawback that other means is required to improve the contrast. Furthermore, regarding a polyfunctional liquid crystalline (meth)acrylate, reliability of polymer stabilization increases as a result of suppression of thermal fluctuation of a mesogen group when compared with a monofunctional liquid crystalline (meth)acrylate. However, there was a problem that an interaction with a low-molecular liquid crystal increases and thus a driving voltage increases.

[Patent Document 1]
Japanese Unexamined Patent Application, First Publication No. 2005-10202
[Patent Document 2]
Japanese Unexamined Patent Application, First Publication No. 2003-248226
[Patent Document 3]
Japanese Unexamined Patent Application, First Publication No. Hei 9-211462
[Patent Document 4]
Japanese Unexamined Patent Application, First Publication No. Hei 9-211463
[Patent Document 5]
Japanese Unexamined Patent Application, First Publication No. Hei 11-21554
[Patent Document 6]
Japanese Unexamined Patent Application, First Publication No. Hei 6-194635
[Non-Patent Document 1]
Japan Society for Promotion of Science, Organic Material for Information Science, 142nd Committee, Sectional Meeting A (Liquid Crystal Material), Documents of 91st Society (pp. 28-30)
[Non-Patent Document 2]
The Institute of Electronics, Information and Communication Engineers Technical Research Report, Vol. 95, (EID95-17), pp. 43-48, 1995
[Non-Patent Document 3]
H. Fume, Jpn. J. Appl. Phys. 36, L1517 (1997)
[Non-Patent Document 4]
H. Fume, Jpn. J. Appl. Phys., 37, 3417 (1998)

DISCLOSURE OF THE INVENTION

Problems to be Solved by the Invention

An object of the present invention is to provide a polymer-stabilized liquid crystal composition, which decreases a driving voltage to a level capable of conducting a TFT (thin film transistor) operation, suppresses a temperature change of the driving voltage to give stable display by a TFT operation, and gives a tilt angle suited for display in a polymer-stabilized liquid crystal display device using a smectic liquid crystal which enables grayscale display, and to provide a polymer-stabilized liquid crystal display device produced using the same.

Means to Solve the Problems

In order to strongly exert the polymer stabilization effect on liquid crystal molecules in a composition for a polymer-stabilized liquid crystal display device using a smectic liquid crystal, a liquid crystalline polymer precursor such as a liquid crystalline acrylate having a mesogen structure as a polymer precursor may be used. This is because the liquid crystalline acrylate has a mesogen structure and therefore can have a strong anchoring force with the mesogen structure of the surrounding low-molecular liquid crystal, and thus thermal and dynamic stability in a polymer-stabilized state is improved. However, there was a problem that, since the anchoring force increases, a driving voltage increases and thus it becomes difficult to operate by amorphous silicon-TFT or polysilicon TFT. Also, there was a drawback that, since the anchoring force increases, it becomes difficult to incline liquid crystal molecules in a smectic layer and a tilt angle decreases.

In order to improve stability in the polymer-stabilized state, a crosslinked polymer may be exploited using a difunctional liquid crystalline acrylate. Since a mesogen group is disposed on a polymer main chain and both ends of the mesogen group are immobilized by crosslinking by use of a difunctional liquid crystalline acrylate, a less influence of thermal fluctuation is exerted and reliability of alignment stabilization of a low-molecular liquid crystal is improved. In contrast, since thermal fluctuation decreases, an interaction with the low-molecular liquid crystal increases. As a result, an anchoring force at an interface between the low-molecular liquid crystal and the polymer surface produced when alignment of the low-molecular liquid crystal is immobilized increases further, resulting in a problem such as more increased driving voltage. Furthermore, it becomes more difficult to incline liquid crystal molecules in a smectic layer, resulting in a small tilt angle.

In order to improve reliability of polymer stabilization, there is a method of increasing a glass transition temperature by increasing crosslinking density of a polymer chain. However, an anchoring force of the low-molecular liquid crystal and the polymer simultaneously increases to cause an increase in a driving voltage and a decrease in a tilt angle. When a volume ratio of a network-shaped polymer chain increases, thermal and dynamic stability of the polymer chain is improved. However, a refractive index of the polymer chain exerts a strong influence on refractive index distribution of the low-molecular liquid crystal in a display device and a difference in a refractive index with the low-molecular liquid crystal causes light scattering, resulting in a decrease in contrast of the display.

As described above, when the liquid crystalline polymer precursor is used, the polymer-stabilized state is stabilized, but the anchoring force simultaneously increases to cause unpreferable increase in a driving voltage and a decrease in a tilt angle. The present inventors have intensively studied about compositions of various polymerizable liquid crystal compounds and liquid crystal compounds and found that an increase in a driving voltage and a decrease in a tilt angle were prevented and also temperature dependency of a driving voltage was suppressed by using both of a liquid crystalline polymer precursor and a non-liquid crystalline polymer precursor in combination. Thus, the present invention has been completed.

The present invention provides a polymer-stabilized liquid crystal composition comprising:

a polymerizable compound (I) represented by general formula (I-a);

a compound (II) represented by general formula (II-a) or (II-b);

at least one polymerizable compound (III) selected from the group consisting of compounds represented by general formulas (III-a), (III-b), and (III-c); and a chiral compound (IV) represented by general formula (IV-a) or (IV-b), wherein the polymerizable compound (I) forms a polymer that has a glass transition temperature of −100° C. to 25° C., the general formula (I-a):

[Chemical Formula 1]

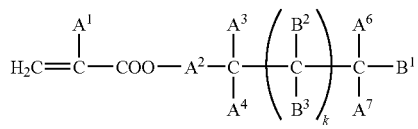

(I-a)

(in the formula (I-a), $A^1$ represents a hydrogen atom or a methyl group, $A^2$ represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $A^3$ and $A^6$ each independently represents a hydrogen atom or an alkyl group of 1 to 18 carbon atoms (one, or two or more methylene group(s) existing in the alkyl group each independently may be substituted with an oxygen atom, —CO—, —COO—, or —OCO— in a manner that any oxygen atoms are not directly bonded to each other, one, or two or more hydrogen atom(s) existing in the alkyl group each independently may be substituted with a halogen atom or an alkyl group of 1 to 17 carbon atoms), $A^4$ and $A^7$ each independently represents a hydrogen atom or an alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other, and one, or two or more hydrogen atom(s) existing in the alkyl group each independently may be substituted with a halogen atom or an alkyl group of 1 to 9 carbon atoms), k represents 1 to 40, and $B^1$, $B^2$ and $B^3$ each independently represents a hydrogen atom, or a linear or branched alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other), or a group represented by general formula (I-b):

[Chemical Formula 2]

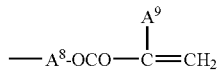

(I-b)

(in the formula (I-b), $A^9$ represents a hydrogen atom or a methyl group, and $A^8$ represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group)), provided that the number of groups represented by the general formula (I-b) among $B^1$, $B^2$ and $B^3$, a total number of which is 2k+1, is from 0 to 3);

the general formula (II-a) or (II-b):

[Chemical Formula 3]

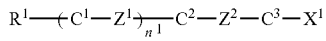

(II-a)

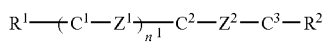

(II-b)

(in the formulas (II-a) and (II-b), $R^1$ and $R^2$ each independently represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other), $C^1$ represents a 1,4-phenylene group, a 1,4-cyclohexylene group, or a 1,3-dioxane-2,5-diyl group (the 1,4-phenylene group among these groups is unsubstituted, or can contain one, or two or more fluorine atom(s), chlorine atom(s), methyl group(s), trifluoromethyl group(s) or trifluoromethoxy group(s) as substituent(s)), $C^2$ and $C^3$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, a 1,3,4-thiadiazole-2,5-diyl, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $Z^1$ and $Z^2$ each independently represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH=CH—, —C≡C—, —CF$_2$O—, —OCF$_2$—, —COO—, or —OCO—, $X^1$ represents a fluorine atom, a chlorine atom, a trifluoromethyl group, a trifluoromethoxy group, a difluoromethyl group, or an isocyanate group or cyano group, and $n^1$ represents 0, 1, or 2, provided that plural $C^1$ and $Z^1$ may be the same or different when $n^1$ represents 2);

the general formula (III-a):

[Chemical Formula 4]

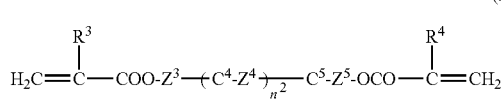

(III-a)

(in the formula (III-a), $R^3$ and $R^4$ each independently represents a hydrogen atom or a methyl group, $C^4$ and $C^5$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $Z^3$ and $Z^5$ each independently represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—, and $n^2$ represents 0, 1, or 2, provided that plural $C^4$ and $Z^4$ may be the same or different when $n^2$ represents 2);

the general formula (III-b):

[Chemical Formula 5]

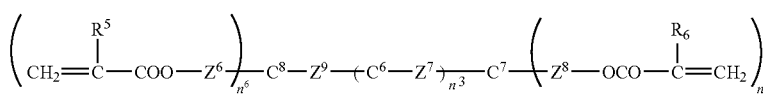

(III-b)

(in the formula (III-b), $R^5$ and $R^6$ each independently represents a hydrogen atom or a methyl group, $C^6$ represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s) or trifluoromethoxy group(s) as substituent(s)), $C^7$ and $C^8$ each independently represents a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group, $Z^6$ and $Z^8$ each independently represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^7$ and $Z^9$ each independently represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH=CH—, —C≡C—, —CF$_2$O—, —OCF$_2$—, —COO—, or —OCO—, and $n^3$ represents 0, 1, or 2, provided that plural $C^6$ and $Z^7$ may be the same or different when $n^3$ represents 2, and $n^5$ and $n^6$ each independently represents 1, 2, or 3);

the general formula (III-c):

[Chemical Formula 6]

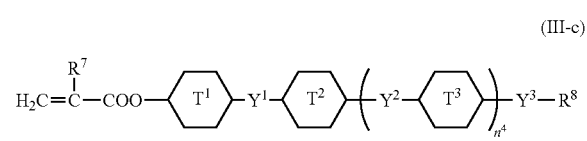

(III-c)

(in the formula (III-c), $R^7$ represents a hydrogen atom or a methyl group, 6-membered rings $T^1$, $T^2$ and $T^3$ each independently represents any one of:

[Chemical Formula 7]

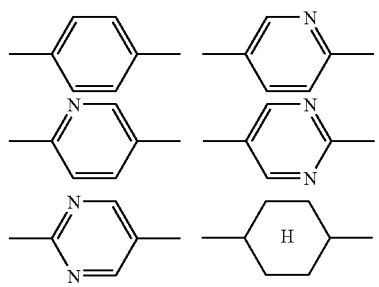

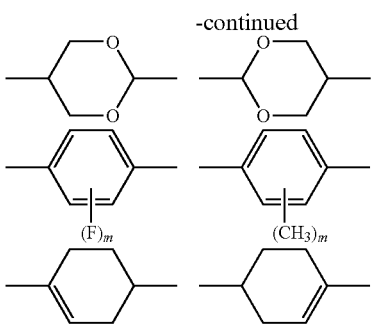

(in which m represents an integer of 1 to 4),
$n^4$ represents an integer of 0 or 1,
$Y^1$ and $Y^2$ each independently represents a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —$CH_2$=$CHCH_2CH_2$—, or —$CH_2CH_2CH$=$CH$—,
$Y^3$ represents a single bond, —COO—, or —OCO—, and
$R^8$ represents a hydrocarbon group of 1 to 18 carbon atoms; and
the general formula (IV-a) or (IV-b):

[Chemical Formula 8]

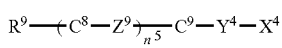 (IV-a)

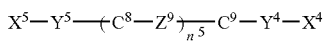 (IV-b)

(in the formula (IV-a) and (IV-b), $R^9$ represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other),
$C^8$ and $C^9$ each independently represents a 1,4-phenylene group, a 1,4-cyclohexylene group, or a pyrimidine-2,5-diyl group (the 1,4-phenylene group or the 1,4-cyclohexylene group among these groups is unsubstituted, or can contain one, or two or more fluorine atom(s), chlorine atom(s), methyl group(s), cyano group(s), trifluoromethyl group(s) or trifluoromethoxy group(s) as substituent(s)),
$Z^9$ represents a single bond, —$CH_2CH_2$—, —C≡C—, —$CF_2O$—, —COO—, or —OCO—,
$Y^4$ and $Y^5$ each independently represents a single bond, an oxygen atom, an alkylene group of 1 to 14 carbon atoms, —$OCH_2$—, —COO—, —OCO—, —$OCH_2CH_2$—, or —$OCOCH_2$—,
$n^5$ represents 0, 1, or 2, provided that plural $C^8$ and $Z^9$ may be the same or different when $n^5$ represents 2, and
$X^4$ and $X^5$ each independently represents a group represented by any of general formulas (IV-c) to (IV-h):

[Chemical Formula 9]

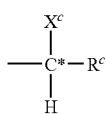 (IVc)

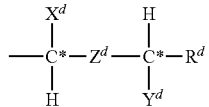 (IV-d)

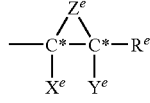 (IV-e)

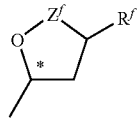 (IV-f)

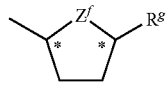 (IV-g)

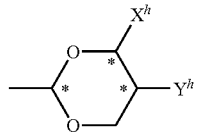 (IV-h)

(in the formulas (IV-c) to (IV-h), the symbol * represents that a carbon atom is an asymmetric carbon,
$R^c$, $R^d$, $R^e$, $R^f$, and $R^g$ each independently represents an alkyl group of 2 to 20 carbon atoms (one, or two or more methylene group(s) existing in the alkyl group each independently may be substituted with an oxygen atom, —CO—, —COO—, or —OCO— in a manner that any oxygen atoms are not directly bonded to each other),
$X^c$, $X^d$, and $Y^d$ each independently represents a fluorine atom, a chlorine atom, a methyl group, or a cyano group,
$X^e$ and $Y^e$ each independently represents a hydrogen atom, a fluorine atom, a chlorine atom, a methyl group, or a cyano group,
$X^h$ and $Y^h$ each independently represents a fluorine atom, a chlorine atom, a methyl group, or a cyano group,
$Z^d$ represents a single bond or methylene group,
$Z^e$ represents an oxygen atom or a group represented by —$OC(R^{e1})(R^{e2})O$— (in which $R^{e1}$ and $R^{e2}$ each independently represents a hydrogen atom or an alkyl group of 1 to 10 carbon atoms),
$Z^f$ represents a carbonyl group or a group represented by —$CH(R^{f1})$— (in which $R^{f1}$ represents a hydrogen atom or an alkyl group of 1 to 10 carbon atoms), and
$Z^g$ represents —OCO—, —COO—, —$CH_2O$—, or —$OCH_2$—)).

Effects of the Invention

The polymer-stabilized ferroelectric liquid crystal display device including the polymer-stabilized liquid crystal composition of the present invention as a structural member has characteristics such that it exhibits a low driving voltage, suppresses temperature dependency of a driving voltage to give a stable display by a TFT operation within a temperature range of a low temperature (−10° C.) to a high temperature (60° C.), enables a grayscale display which cannot be achieved by a display device of a single ferroelectric liquid crystal, and is excellent in thermal and dynamic stability. It is also useful as a structural member for a plastic liquid crystal cell or the like since it enables a TFT operation.

BEST MODE FOR CARRYING OUT THE INVENTION

Figure 1:
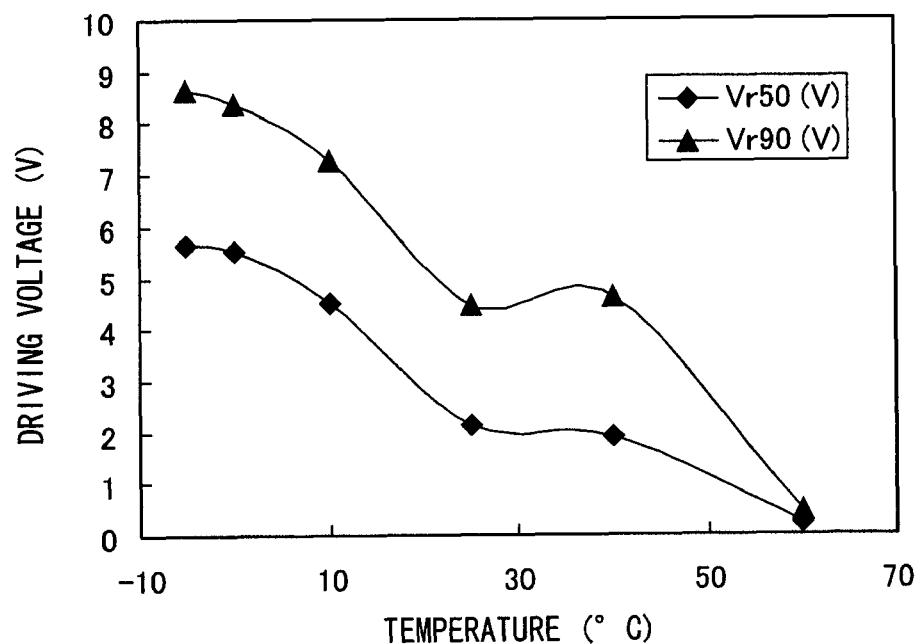
FIG. 1 is a graph illustrating the results shown in Table 1.

One example of the present invention will be explained below. The composition for a polymer-stabilized liquid crystal display device of the present invention is used so as to obtain a polymer-stabilized liquid crystal display device comprising a transparent polymer material and a liquid crystal composition by polymerizing a radical polymerizable compound contained therein by heat, or active energy rays such as ultraviolet rays, thereby causing phase separation with the liquid crystal composition, or a state of being dispersed in the liquid crystal composition. This device is a liquid crystal device comprising an alignment control film and a liquid crystal layer between substrates having a pair of electrode layers, wherein the liquid crystal layer contains a photocured medium of a photocurable composition containing at least a liquid crystalline polymer precursor and a non-liquid crystalline polymer precursor, as well as a ferroelectric liquid crystal material; a polymer stabilization procedure is taken in a way that an alignment direction of a mesogen group of a liquid crystalline polymer precursor in a state where a voltage is not applied between a pair of electrode layers, or a major axis direction of a polymer main chain of a non-liquid crystal polymer precursor, and an alignment direction of a ferroelectric liquid crystal material are uniformed to an alignment direction of the alignment control film, resulting in a uniaxial alignment; a photocured medium of a photocurable composition containing a liquid crystalline polymer precursor and a non-liquid crystalline polymer precursor is dispersed in the liquid crystal layer so as to realize an uniaxial alignment state where a major axis direction of a mesogen group of a liquid crystalline polymer precursor or a major axis direction of a non-liquid crystalline polymer precursor main chain is the same as the alignment direction in the alignment control film, and a long axis in a liquid crystal molecule of the ferroelectric liquid crystal material is aligned to exhibit the uniaxial alignment in a state where a voltage is not applied, thanks to an alignment stabilization effect of the ferroelectric liquid crystal material due to a polymer chain having a mesogen group; and such a property that an angle between an alignment direction in a liquid crystal molecule of the ferroelectric liquid crystal material and that of a mesogen group of the liquid crystalline polymer precursor changes continuously is provided by a voltage change, since when a voltage is applied, the alignment direction of long axis in the ferroelectric liquid crystal material is shifted from that of the mesogen group of the liquid crystalline polymer precursor due to driving force generated by spontaneous polarization of the ferroelectric liquid crystal. For example, it is possible to control the amount of transmitted light continuously by disposing the device between two crossed polarizing plates and changing a voltage to be applied, and thus enables a grayscale display such as v-shaped transmittance-voltage properties where the transmittance changes in proportion to an applied voltage without using a special means such as area coverage modulation performed for a ferroelectric liquid crystal monomer device. Aforementioned uniaxial alignment is obtained by polymerizing mesogen groups or polymer main chains on exposure to ultraviolet rays in a state where major axes thereof are uniformly aligned by a method using a polymer alignment film including polyimide subjected to a rubbing alignment treatment to obtain uniaxial alignment, a method using a photo-alignment film, a method using external fields such as electric field and magnetic field, or a method using an alignment film in combination with the external field.

Regarding the polymer-stabilized liquid crystal display device thus formed, the driving voltage and light scattering increase in proportion to the content of the polymer precursor added to the composition. When the content of the precursor is a trace amount, increment of the driving voltage decreases, but the obtained liquid crystal display device is inferior in thermal or mechanical stability. It is necessary to increase the content of the precursor so as to enhance reliability. At this time, there arise problems such as an increase in the driving voltage, deterioration of liquid crystal alignment properties, and exhibition of scattering properties. Regarding the increase in the driving voltage, as the description about the driving voltage of a polymer-dispersed liquid crystal display device, a relational equation shown below is disclosed in Japanese Unexamined Patent Application, First Publication No. Hei 6-222320. The idea for a driving voltage of a polymer-stabilized liquid crystal device is in the same way as a polymer-dispersed liquid crystal display device, as shown below:

$$Vth \propto \frac{d}{\langle r \rangle + {}^1Kii/A} \left(\frac{{}^2Kii}{\Delta\varepsilon}\right)^{\frac{1}{2}} \qquad [\text{Equation 1}]$$

(Vth denotes a threshold voltage, $^1Kii$ and $^2Kii$ denote an elastic constant, i denotes 1, 2, or 3, $\Delta\varepsilon$ denotes a dielectric constant anisotropy, $\langle r \rangle$ denotes an average cavity interval between transparent polymer material interfaces, A denotes anchoring energy of a transparent polymer material to a liquid crystal composition, and d denotes a distance between substrates having transparent electrodes.)

According to this relational equation, the driving voltage of a polymer-stabilized liquid crystal display device is determined by an average gap spacing of a transparent polymer material interface, a distance between substrates, elastic constant and dielectric constant anisotropy of a liquid crystal composition, and anchoring energy between a liquid crystal composition and a transparent polymer material. In a general liquid crystal display device, the driving voltage is determined by a cell thickness, dielectric constant anisotropy and elastic constant, but there is a factor that is peculiar to the polymer-stabilized liquid crystal display device, as with the polymer-dispersed liquid crystal. It is anchoring energy at an interface between the liquid crystal composition and the transparent polymer material. Accordingly, even in the polymer-stabilized liquid crystal display device, when an interface area between a polymer and a liquid crystal increases, anchoring energy of the system increased and the driving voltage increases. In other words, when the content of the liquid crystalline polymer precursor in the composition of the present invention increases, the driving voltage increases. This means that in order to maintain a low driving voltage by reducing increase of the driving voltage, anchoring energy of the polymer constituting the polymer-stabilized liquid crystal should be kept low. For example, an effect of the polymerizable polymer precursor lies in polymer stabilization of uniaxial alignment of the low-molecular liquid crystal. In contrast, the non-liquid crystalline polymer precursor plays a role of reducing increase of the driving voltage by a polymerizable polymer, in using a non-liquid crystalline polymer having a weak anchoring force against the low-molecular liquid crystal. Thus the driving voltage is reduced maintaining reliability of polymer stabilization, by adjusting the composition using the polymerizable liquid crystal polymer precursor and the non-liquid crystalline polymer precursor in combination.

In order to reduce the energy of the non-liquid crystalline polymer precursor, a difunctional monomer containing an alkyl side chain is used. The number of carbon atoms of the alkyl side chain is preferably from 5 to 15, and more preferably from 8 to 13. The anchoring energy increases when the alkyl side chain is short, whereas, it increases when the alkyl side chain is too long due to a strong influence of the side chain. When the side chain is composed of a mesogen group containing a benzene ring or others similar to the low-molecular liquid crystal, affinity with the low-molecular liquid crystal increases and anchoring energy increases unfavorably. Furthermore, a distance between alkyl side chains is also important, which is preferably from 6 to 18 in terms of a distance of the number of carbon atoms. Although it depends on a composition of the liquid crystal to be used, short distance between alkyl side chains causes vertical alignment of the low-molecular liquid crystal at a polymer interface unfavorably.

The anchoring energy is determined by a balance between intermolecular interaction that a side chain exerts on the low-molecular liquid crystal and intermolecular interaction that a main chain exerts on the low-molecular liquid crystal, and when both forces are equivalent, the anchoring energy is minimized. Furthermore, a crosslinkage distance of the polymer exerts an influence on thermal mobility of the polymer main chain. When the crosslinkage distance is short and thermal mobility is low, a strong molecule interaction is exerted on the low-molecular liquid crystal and therefore the anchoring energy increases. When the crosslinkage distance becomes longer, thermal mobility of the polymer main chain increases and fluctuation due to heat of the main chain increases. When the force of the fluctuation becomes larger than that of intermolecular interaction, the anchoring energy becomes small since the fluctuation acts as cancelling the intermolecular interaction. However, when the crosslinkage distance becomes longer, a polymerization rate of a polymer precursor decreases and compatibility with the liquid crystal decreases unfavorably. As an indicator which indicates thermal mobility of the polymer main chain, a polymer glass transition temperature is generally used.

In the present invention, it is preferred to use a polymer precursor for the purpose of decreasing anchoring, whose glass transition temperature is room temperature or lower. Furthermore, the glass transition temperature is more preferably from 0 to −100° C. Another meaning of reducing the glass transition temperature is improvement of mechanical stability. When the glass transition temperature is room temperature or higher, a polymer network structure capable of stabilizing alignment of a liquid crystal with a polymer is deformed or damaged by deformation or other external forces of the device, resulting in decline in action of the polymer alignment stabilization. When the glass transition temperature is low, even if the network structure is deformed, the network structure is recovered to the original state due to network resilience and the immobilized alignment is retained. Namely, by adjusting the composition of the liquid crystal used in the present invention and the main and side chain length of the polymer precursor, and using a polymer precursor whose glass transition temperature is room temperature or lower, a polymer-stabilized liquid crystal device having a low driving voltage and high reliability is obtained. However, in the polymer-stabilized liquid crystal, it is also an important object to stabilize initial alignment upon production of the liquid crystal display device.

Light scattering is observed when the average gap spacing falls within a wavelength range of visible rays, and becomes maximum at a wavelength of about 500 nm to 1,500 nm. In the case of the polymer-stabilized liquid crystal, it is important to form a network in the liquid crystal, with a mesh size out of the above range. Examples of a method for forming a mesh 500 nm or less include a method exploiting a phase separation process by spinodal decomposition, a method for producing the network at a higher UV polymerization rate (a method using a UV polymerization process, or a method by adjusting the composition of a polymer precursor), and a method of allowing polymerization hardly bringing phase separation in a state where compatibility with a low-molecular liquid crystal is attained, and it is preferred to form a light scattering-free fine network-shaped polymer effectively using these methods. The case where the polymer precursor is compatibilized with the low-molecular liquid crystal is more preferred, since a network-shaped polymer can be formed in a state of being dispersed in the low-molecular liquid crystal, and a finer structure on a molecular level is obtained. However, when polymerization microphase separation is locally generated by polymerizing the polymer precursor of the present invention in a liquid crystal phase, formation of a network-shaped polymer is observed along a liquid crystal molecule director with electron microscope, although the alignment order is not high. This is because the precursor main chain tends to align in a liquid crystal molecule director direction when a precursor main chain is contacted with the liquid crystal, and thus alignment of the liquid crystal is immobilized by polymerization of the precursor. However, when the concentration of the precursor increases, a phase separation structure is formed by spinodal decomposition or binodal decomposition caused by polymerization microphase separation ignoring alignment of the liquid crystal, thus making it impossible to immobilize alignment of the objective liquid crystal. The above method may disturb alignment of the low-molecular liquid crystal. In this case, in order to obtain the desired stabilizing alignment, the device can be produced by adjusting the external field so as to obtain the objective polymer-stabilized liquid crystal device by making use of an electric field, an alignment control force of an alignment film, an external magnetic field or the like. Furthermore, a periodic structure having regularity may be formed with a copolymer of a polymerizable liquid crystal polymer precursor and a non-liquid crystalline polymer precursor, applying a self-organization property of a mesogen group or based on a hydrogen-bonding group. If it is necessary for obtaining desired characteristics, a structure with a fine particle-shaped polymer dispersed in a low-molecular liquid crystal may be taken.

As described above, by using the polymer-stabilized liquid crystal composition composed of a liquid crystal polymer precursor and a non-liquid crystal polymer precursor, it is possible to obtain a liquid crystal display device which exhibits a low driving voltage, enables a grayscale display, gives high reliability in terms of polymer stabilization, generates no light scattering, and gives a large tilt angle and high contrast.

In order to immobilize a state in which liquid crystals are aligned by an alignment film without alignment defects, it is preferred to allow at least phase transition from a nematic phase to smectic phase by annealing, and it is more preferred that a liquid crystal cell to be used has a flat substrate surface. It is also necessary to polymerize the polymer precursor into a network or dispersed state in a liquid crystal phase such as a nematic and smectic phase. Furthermore, in order to avoid formation of the phase separation structure, it is preferred to reduce the polymer precursor content and adjust the composition of the precursor so as to form a network-shaped polymer between liquid crystal molecules in a state where liquid crystals are aligned. In the case of photopolymerization, it is preferred to prevent liquid crystal alignment defects by adjusting UV exposure time, UV exposure intensity and temperature to form a network-shaped polymer. In order to obtain desired liquid crystal alignment in the polymerization of a polymer precursor in the composition, it is possible to use a liquid crystal cell comprising an alignment film, which is subjected to a rubbing alignment treatment of vertical alignment, parallel alignment or anti-parallel alignment or a photoalignment treatment, or to use a liquid crystal cell in which upper and lower substrates are composed of a vertical alignment film, or a combination of the vertical alignment film and a parallel alignment. Furthermore, the objective polymer-stabilized liquid crystal display device can be obtained by forming twist alignment, bent alignment, spray alignment or parallel alignment applying light, heat, voltage, or external field such as magnetic field, or forming a liquid crystal alignment state which is not easily obtained by an alignment film alone, and immobilizing the alignment by polymerization of the precursor. For example, in the case of a smectic phase, the desired polymer-stabilized liquid crystal display device can also be obtained by polymer stabilization of an alignment state where directors are aligned in a fixed direction by an external field, or polymerizing and immobilizing a transitional alignment state by switching.

The polymer precursor used in the present invention was obtained as a result of searching a compound having larger improving effect as the above polymer precursor.

The polymer-stabilized liquid crystal composition of the present invention contains at least one kind of a polymerizable compound (I) represented by the general formula (I-a), at least one kind of a low-molecular liquid crystal compound (II) represented by the general formula (II-a) or (II-b), at least one kind of a polymerizable liquid crystal compound (III) selected from the group consisting of compounds represented by the general formulas (III-a), (III-b) and (III-c), and at least one kind of a chiral compound (IV) represented by the general formula (IV-a) or (IV-b).

It is possible to have the polymerizable compound (I) contain plural compounds represented by the general formula (I-a) each having a different main chain length or alkyl side chain length. Furthermore, a polymerizable liquid crystal compound may be used in combination, if necessary. A preferred amount thereof is 5% or less, since while the polymerizable liquid crystal compound enhances alignment properties of the low molecular liquid crystal, it has high affinity with the low-molecular liquid crystal and the driving voltage is likely to increase. Furthermore, it is possible to obtain a polymer-stabilized liquid crystal display device having a low driving voltage and high mechanical strength by enhancing alignment properties in combinational use of a polymerizable liquid crystal compound (III), and by the action of low anchoring energy due to the polymerizable compound (I) represented by the general formula (I-a) and the effect of a low glass transition temperature.

Two substrates of the liquid crystal cell can be made of a flexible transparent material such as glass and plastic, and one of the substrates can be made of an opaque material such as silicon. The transparent substrate comprising a transparent electrode layer is obtained, for example, by sputtering indium tin oxide (ITO) on a transparent substrate such as a glass plate.

The color filter is prepared, for example, by a pigment dispersion method, a printing method, an electrodeposition method, or a dyeing method. The procedure is explained by taking the pigment dispersion method as an example: a curable coloring composition for a color filter is applied on the transparent substrate, subjected to a patterning treatment and cured by heating or light irradiation; and the procedure is performed on each of 3 colors, red, green and blue, to prepare a pixel portion for a color filter. In addition, pixel electrodes equipped with an active device such as TFT, thin film diode and metallic insulator metal resistance device may be provided on the substrate.

The substrates are faced each other with the transparent electrode layers inside. A distance between the substrates may be adjusted via a spacer. At this time, the thickness of the obtained light control layer is preferably adjusted within a range from 1 to 100 μm, and more preferably from 1.5 to 10 μm. When a polarizing plate is used, product of refractive index anisotropy Δn and a cell thickness d of the liquid crystal is preferably adjusted so as to maximize contrast. When two polarizing plates are present, it is also possible to adjust a polarizing axis of each polarizing plate to have satisfactory viewing angle or contrast. It is also possible to use a phase difference film for extending the viewing angle. Examples of the spacer include glass particles, plastic particles, alumina particles, photoresist material and the like. Thereafter, a sealing agent such as an epoxy-based thermocurable composition is screen-printed on the substrates with a liquid crystal injection inlet, the substrates are laminated each other and the sealing material is thermally cured by heating.

As the method of interposing the polymer-stabilized liquid crystal composition between two substrates, a common vacuum injection method, or an ODF method can be used. At this time, the polymer-stabilized liquid crystal composition may be in a state where various liquid crystal compounds are compatibilized with the polymer precursor of the present invention, and is preferably in a uniform isotropic state or a nematic phase. In the case of a smectic phase, handling is difficult upon the production of the device.

The radical polymerizable compound is preferably polymerized by irradiation with ultraviolet rays. As a lamp for generation of ultraviolet rays, a metal halide lamp, a high-pressure mercury lamp, an ultrahigh-pressure mercury lamp or the like can be used. A preferred wavelength of ultraviolet rays to be irradiated is an absorption wavelength range of a photopolymerization initiator contained in a composition for a polymer-dispersed liquid crystal display device, at the same time as a wavelength range that is not an absorption wavelength range of the liquid crystal composition contained. Specifically, it is preferred to use ultraviolet rays after cutting out a wavelength of 330 nm or less, and more preferably 350 nm or less, using a metal halide lamp, a high-pressure mercury lamp, or an ultrahigh-pressure mercury lamp.

The intensity of ultraviolet rays to be used can be appropriately adjusted to obtain an intended light control layer, but is preferably from 10 to 10,000 mJ/cm$^2$, more preferably from 50 to 5,000 mJ/cm$^2$, although it varies depending on reactivity of a polymer precursor to be used. The irradiation time of ultraviolet rays is appropriately selected according to the intensity of ultraviolet rays, but is preferably from 10 to 600 seconds.

The temperature upon irradiation of ultraviolet rays is an important element for stabilizing desired initial liquid crystal alignment after determining characteristics of a light control layer. When an isotropic phase state is immobilized, the temperature is preferably slightly higher than an isotropic-nematic transition point of the composition for a polymer-stabilized liquid crystal display device. Specifically, the temperature is preferably from a transition point+0.1 to 10° C., and more preferably a transition point+0.1° C. to 3° C. The device can also be produced by adjusting the temperature at which a nematic phase, a smectic phase or a cholesteric phase is exhibited.

Examples of the alignment state of the liquid crystal to be polymer-stabilized include requisite alignment states such as bend alignment, twist alignment, and spray alignment observed in a smectic phase or a nematic phase, multi-domain obtained by combination of plural alignments, multi-domain in which mono-domain having a uniaxial alignment is arranged in plural directions and the like. These alignment states are preferably polymer-stabilized by ultraviolet exposure, after forming an intended alignment state in the liquid crystal by way of changing temperature, changing voltage by applying an external electric field, or treating a polyimide alignment film or photo-alignment film on a substrate interface to have it aligned in an or plural directions.

The polymer-stabilized liquid crystal display device the of present invention is that with a stabilized alignment state of a low-molecular liquid crystal by polymerizing a polymer-stabilized liquid crystal composition of the present invention to form a polymer chain in a liquid crystal phase. Such a polymer-stabilized liquid crystal display device is obtained by applying an external electric field to a polymer-stabilized liquid crystal composition or controlling alignment of a polymerizable liquid crystal using an alignment film, thus polymerizing the composition under ultraviolet exposure while maintaining a desired alignment state.

A specific one example of a compound used in the polymer-stabilized liquid crystal composition of the present invention is shown below.

<Polymerizable Compound (I)>

The polymerizable compound (I) used in the polymer-stabilized liquid crystal composition of the present invention is represented by the general formula (I-a) shown below:

[Chemical Formula 10]

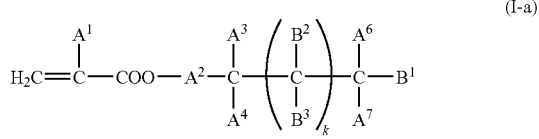

(in the formula (I-a), $A^1$ represents a hydrogen atom or a methyl group, $A^2$ represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group or an ethyl group), $A^3$ and $A^6$ each independently represents a hydrogen atom or an alkyl group of 1 to 18 carbon atoms (one, or two or more methylene group(s) existing in the alkyl group each independently may be substituted with an oxygen atom, —CO—, —COO—, or —OCO— in a manner that any oxygen atoms are not directly bonded to each other, one, or two or more hydrogen atom(s) existing in the alkyl group each independently may be substituted with a halogen atom or an alkyl group of 1 to 17 carbon atoms), $A^4$ and $A^7$ each independently represents a hydrogen atom or an alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other, and one, or two or more hydrogen atom(s) existing in the alkyl group each independently may be substituted with a halogen atom or an alkyl group of 1 to 9 carbon atoms), k represents 1 to 40, and $B^1$, $B^2$, and $B^3$ each independently represents a hydrogen atom, a linear or branched alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other), or a group represented by the general formula (I-b):

[Chemical Formula 11]

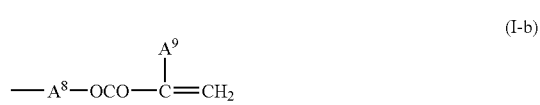

(in the formula (I-b), $A^9$ represents a hydrogen atom or a methyl group, and $A^8$ represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group)), provided that the number of groups represented by the general formula (I-b) among $B^1$, $B^2$ and $B^3$, a total number of which is 2k+1, is from 0 to 3), a glass transition temperature of a polymer formed by the polymerizable compound (I) being from −100° C. to 25° C.

In the present invention, the term "alkylene group" means a divalent group "—$(CH_2)_n$—" (in which n is an integer of 1 or more) in which each one hydrogen atom has been eliminated from carbon atoms of both ends of an aliphatic linear hydrocarbon) unless otherwise specified. When the hydrogen atom is substituted with a halogen atom or an alkyl group, or a methylene group is substituted with an oxygen atom, —CO—, —COO—, or —OCO—, the effect should be particularly specified. The term "alkylene chain length" refers to n in general formula "—$(CH_2)_n$—" of "alkylene group".

Examples of preferred structure of the polymerizable compound (I) represented by the general formula (I-a) include at least one or more compounds selected from the group consisting of a compound represented by general formula (I-c) shown below:

[Chemical Formula 12]

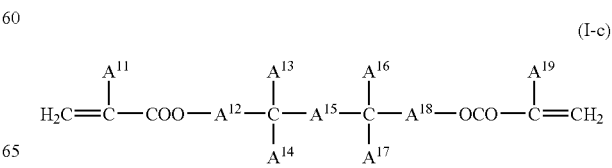

(in the formula (I-c), $A^{11}$ and $A^{19}$ each independently represents a hydrogen atom or a methyl group, $A^{12}$ and $A^{18}$ each independently represents a single bond or an alkylene group of 1 to 15 carbon atoms (one, or two or more methylene group(s) existing in the alkylene group each independently substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $A^{13}$ and $A^{16}$ each independently represents a linear alkyl group of 2 to 20 carbon atoms (one, or two or more methylene group(s) existing in the linear alkyl group each independently may be substituted with an oxygen atom, —CO—, —COO—, or —OCO in a manner that any oxygen atoms are not directly bonded to each other), $A^{14}$ and $A^{17}$ each independently represents a hydrogen atom or an alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other, and one, or two or more hydrogen atom(s) existing in the alkyl group each independently may be substituted with a halogen atom or an alkyl group of 1 to 9 carbon atoms), and $A^{15}$ represents an alkylene group of 9 to 16 carbon atoms (in at least one or more and five or less methylene group(s) existing in the alkylene group, one hydrogen atom in the methylene group each independently is substituted with a linear or branched alkyl group of 1 to 10 carbon atoms, and one, or two or more methylene group(s) existing in the alkylene group each independently may be substituted with an oxygen atom, —CO—, —COO—, or —OCO— in a manner that any oxygen atoms are not directly bonded to each other)), a compound represented by general formula (I-d):

[Chemical Formula 13]

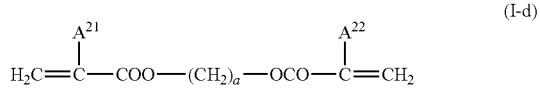

(I-d)

(in the formula (I-d), $A^{21}$ and $A^{22}$ each independently represents a hydrogen atom or a methyl group, and a represents an integer of 6 to 22), a compound represented by general formula (I-e):

[Chemical Formula 14]

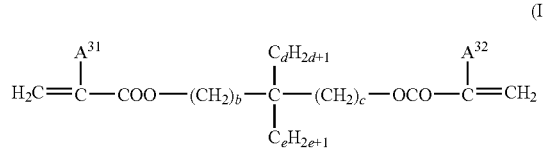

(I-e)

(in the formula (I-e), $A^{31}$ and $A^{32}$ each independently represents a hydrogen atom or a methyl group, b and c each independently represents an integer of 1 to 10, d represents an integer of 1 to 10, and e represents an integer of 0 to 6), and a compound represented by general formula (I-f):

[Chemical Formula 15]

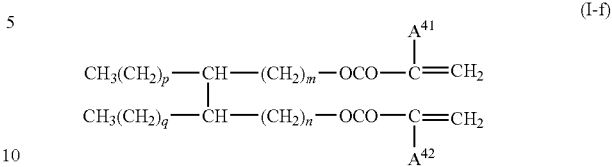

(I-f)

(in the formula (I-f), $A^{41}$ and $A^{42}$ each independently represents a hydrogen atom or a methyl group, and m, n, p, and q each independently represents an integer of 1 to 10). It is preferred to include a compound represented by the formula (I-c) among these compounds.

Preferred structure of the polymerizable compound represented by the general formula (I-c) is that both $A^{11}$ and $A^{19}$ are hydrogen atoms. Although the effects of the present invention is exerted in the compound in which these substituents $A^{11}$ and $A^{19}$ are methyl groups, a compound in which these substituents are hydrogen atoms are advantageous in view of more increased polymerization rate.

It is preferred that $A^{12}$ and $A^{18}$ each independently represents a single bond or an alkylene group of 1 to 3 carbon atoms. A distance between two polymerizable functional groups can be adjusted by varying the number of carbon atoms of $A^{12}$ and $A^{18}$, and $A^{15}$, independently. The feature of the compound represented by the general formula (I-c) is a long distance between polymerizable functional groups (a distance between crosslinking points). When this distance is too long, the polymerization rate extremely decreases and an adverse influence in exerted on phase separation, and therefore there is an upper limit in the distance between polymerizable functional groups. Also, a distance between two side chains of $A^{13}$ and $A^{16}$ exerts an influence on mobility of a main chain. In other words, when the distance between $A^{13}$ and $A^{16}$ is short, side chains $A^{13}$ and $A^{16}$ interfere with each other, resulting in decreased mobility. Therefore, in general compound represented by the formula (I-c), the distance between polymerizable functional groups is decided by the sum of $A^{12}$, $A^{18}$, and $A^{15}$. It is preferred to increase the length of $A^{15}$ when compared with the case of increasing the lengths of $A^{12}$ and $A^{18}$.

In contrast, in $A^{13}$, $A^{14}$, $A^{16}$, and $A^{17}$ as the side chain, the length of the side chain of them preferably has aspects shown below.

In the general formula (I-c), $A^{13}$ and $A^{14}$ are bonded to the same carbon atom of the main chain. When each length is different, the longer side chain is called $A^{13}$ (when the length of $A^{13}$ is the same as that of $A^{14}$, any one is called $A^{13}$). Similarly, when the length of $A^{16}$ is different from that of $A^{17}$, the longer side chain is called $A^{16}$ (when the length of $A^{16}$ is the same as that of $A^{17}$, nay one is called $A^{16}$).

In the present invention, $A^{13}$ and $A^{16}$ each independently represents a linear alkyl group of 2 to 20 carbon atoms (one, or two or more methylene group(s) existing in the linear alkyl group each independently may be substituted with an oxygen atom, —CO—, —COO—, or —OCO— in a manner that any oxygen atoms are not directly bonded to each other), preferably each independently represents a linear alkyl group of 2 to 18 carbon atoms (one, or two or more methylene group(s) existing in the linear alkyl group each independently may be substituted with an oxygen atom, —CO—, —COO—, or —OCO— in a manner that any oxygen atoms are not directly bonded to each other, and more preferably each independently represents a linear alkyl of 3 to 5 carbon atoms (one, or two or more methylene group(s) existing in the linear alkyl group each independently may be substituted with an oxygen atom, —CO—, —COO—, or —OCO— in a manner that any oxygen atoms are not directly bonded to each other).

Although the side chain has higher mobility than that of the main chain and the existence contributes to an improvement in mobility of a polymer chain at a low temperature, mobility decreases to the contrary in a state where spacial interference occurs between two side chains, as described above. In order to prevent spacial interference between side chains, it is effective to increase the distance between side chains and to decrease the side chain length within a requisite range.

In the present invention, $A^{14}$ and $A^{17}$ each independently represents hydrogen atom or an alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other, and one, or two or more hydrogen atom(s) existing in the alkyl group each independently may be substituted with a halogen atom or an alkyl group of 1 to 9 carbon atoms), preferably each independently represents a hydrogen atom or an alkyl group of 1 to 7 carbon atoms (one, or two or more methylene group(s) existing in the alkyl group each independently may be substituted with an oxygen atom, —CO—, —COO—, or —OCO— in a manner that any oxygen atoms are not directly bonded to each other), more preferably each independently represents a hydrogen atom or an alkyl group of 1 to 5 carbon atoms (one, or two or more methylene group(s) existing in the alkyl group each independently may be substituted with an oxygen atom, —CO—, —COO—, or —OCO— in a manner that any oxygen atoms are not directly bonded to each other), and still more preferably each independently represents a hydrogen atom or an alkyl group of 1 to 3 carbon atoms (one, or two or more methylene group(s) existing in the alkyl group each independently may be substituted with an oxygen atom, —CO—, —COO—, or —OCO— in a manner that any oxygen atoms are not directly bonded to each other).

With respect to $A^{14}$ and $A^{17}$, too long length is not preferred since spacial interference between side chains occurs. It is considered that an alkyl chain in which $A^{14}$ and $A^{17}$ have a short length can be a side chain having high mobility can be obtained and has the function of suppressing approach of adjacent main chains, and also the action of preventing interference between polymer main chains enhances mobility of the main chain. Therefore, an increase in anchoring energy at a low temperature can be suppressed, and thus it is effective to improve display characteristics in a low temperature range of a polymer-stabilized liquid crystal display device.

The longer, $A^{15}$ located between two side chains becomes, the better in order to vary the distance between side chains and to decrease a glass transition temperature by widening the distance between crosslinking points. However, when $A^{15}$ is too long, the molecular weight of a compound represented by the general formula (I-c) excessively increases and compatibility with a liquid crystal composition excessively deteriorates, and thus the polymerization rate excessively decreases and an adverse influence is exerted on phase separation, resulting in setting of the upper limit.

Therefore, in the present invention, $A^{15}$ is preferably an alkylene group of 9 to 16 carbon atoms (in at least one or more and five or less methylene group(s) existing in the alkylene group, one of hydrogen atoms in the methylene group each independently be substituted with a linear or branched alkyl group of 1 to 10 carbon atom, and one, or two or more methylene group(s) existing in the alkylene group each independently may be substituted with an oxygen atom, —CO—, —COO—, or —OCO— in a manner that any oxygen atoms are not directly bonded to each other).

In other words, in the present invention, the alkylene chain length of $A^{15}$ is preferably 9 to 16 carbon atoms. $A^{15}$ has, as a structural feature, a structure in which hydrogen atoms in an alkylene group are substituted with an alkyl group of 1 to 10 carbon atoms. The substitution number of the alkyl group is 1 or more and 5 or less, preferably from 1 to 3, and more preferably 2 or 3. The number of carbon atoms of the alkyl group for substitution is preferably from 1 to 5, and more preferably from 1 to 3.

The compound represented by the general formula (I-a) can be synthesized by known methods described in Tetrahedron Letters, Vol. 30, pp. 4985; Tetrahedron Letters, Vol. 23, No. 6, pp. 681-684; and Journal of Polymer Science: Part A: Polymer Chemistry, Vol. 34, pp. 217-225.

For example, a compound of the general formula (I-c) in which $A^{14}$ and $A^{17}$ are hydrogens can be obtained by reacting a compound containing plural epoxy groups with a polymerizable compound containing active hydrogen capable of reacting with an epoxy group, such as acrylic acid, methacrylic acid or the like to synthesize a polymerizable compound containing a hydroxyl group, and reacting the polymerizable compound containing a hydroxyl group with a saturated fatty acid.

Furthermore, the compound can be obtained by reacting a compound containing plural epoxy groups with a saturated fatty acid to synthesize a compound containing a hydroxyl group, and reacting the compound containing a hydroxyl group with a polymerizable compound containing a group capable of reacting with a hydroxyl group, such as acrylate.

When a radical polymerizable compound is a compound of the general formula (I-c) in which $A^{14}$ and $A^{17}$ are alkyl groups and $A^{12}$ and $A^{18}$ are methylene groups having 1 carbon atom, the compound can be obtained by a method of reacting a compound containing plural oxetane groups with a fatty acid chloride or fatty acid capable of reacting with the oxetane group, and reacting the reaction product with a polymerizable compound containing active hydrogen, such as acrylic acid, a meted of reacting a compound having one oxetane group with a polyhydric fatty acid chloride or fatty acid capable of reacting with the oxetane group, and reacting the reaction product with a polymerizable compound containing active hydrogen, such as acrylic acid.

Also, a compound of the general formula (I-c) in which $A^{12}$ and $A^{18}$ are alkylene group of 3 carbon atoms (propylene group; —CH$_2$CH$_2$CH$_2$—) can be obtained by using a compound containing plural furan groups in place of the oxetane group. Furthermore, a compound of the general formula (I-c) in which $A^{12}$ and $A^{18}$ are alkylene groups of 4 carbon atoms (butylene group; —CH$_2$CH$_2$CH$_2$CH$_2$—) can be obtained by using a compound containing pyran groups in place of the oxetane group.

Among the compound of the general formula (I-c) thus obtained, particularly preferred compound has a structure shown below:

[Chemical Formula 16]

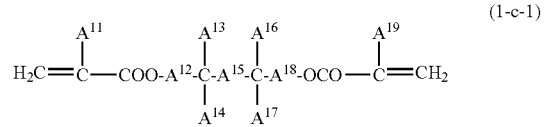

(1-c-1)

(in the formula (I-c-1), $A^{11}$ and $A^{19}$ each independently represents a hydrogen atom or a methyl group, $A^{12}$ and $A^{18}$ each represents a methylene group, $A^{13}$ and $A^{16}$ each independently represents a linear alkyl group of 2 to 20 carbon atoms (one, or two or more methylene group(s) existing in the linear alkyl group each independently may be substituted with an oxygen atom, —CO—, —COO—, or —OCO— in a manner that any oxygen atoms are not directly bonded to each other), $A^{14}$ and $A^{17}$ each independently represents an alkyl group of 1 to 10 carbon atoms, and $A^{15}$ represents an alkylene group of 9 to 16 carbon atoms (at least one or more and five or less methylene groups existing in the alkylene group, one of hydrogen atoms in the methylene group may be substituted with a linear or branched alkyl group of 1 to 10 carbon atoms, and one, or two or more methylene group(s) existing in the alkylene group each independently may be substituted with an oxygen atom, —CO—, —COO—, or —OCO— in a manner that any oxygen atoms are not directly bonded to each other)). Among the compound represented by (1-c-1), particularly preferred is a compound in which each number of —COO— or —OCO— groups contained in $A^{15}$ is 2 or less and each number of —COO— or —OCO— groups contained in $A^{13}$ and $A^{16}$ is 1 or less, and specific examples thereof include compounds of (I-1) to (I-9).

[Chemical Formula 17]

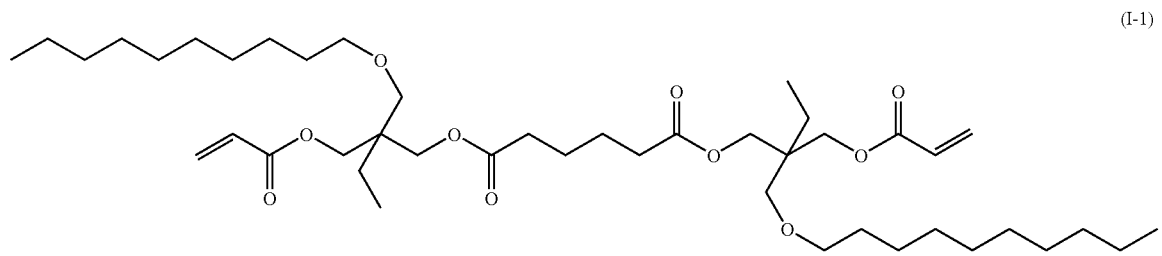

(I-1)

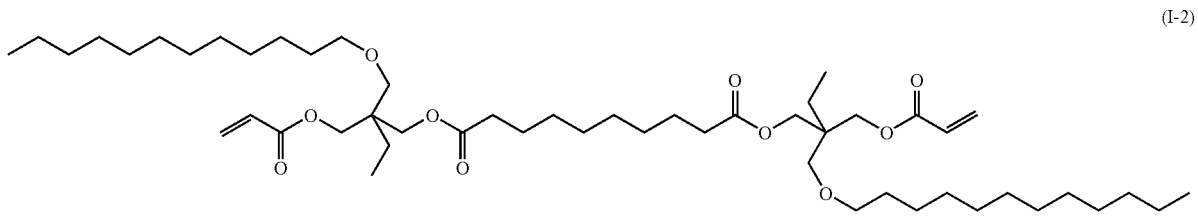

(I-2)

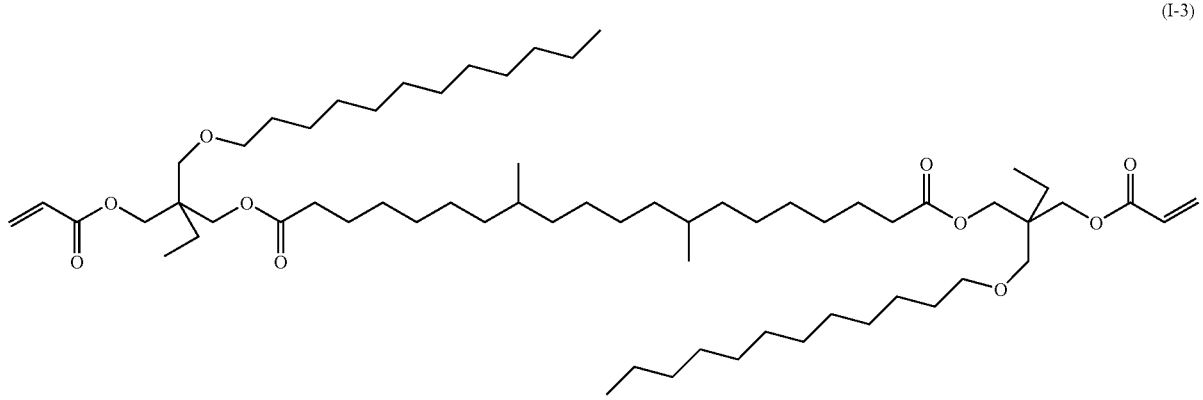

(I-3)

-continued
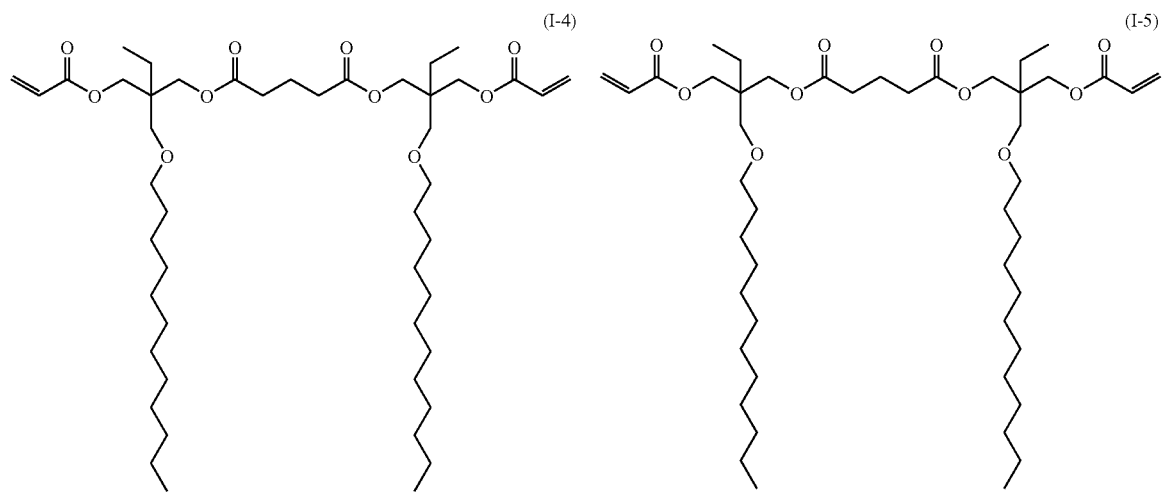
(I-4)
(I-5)
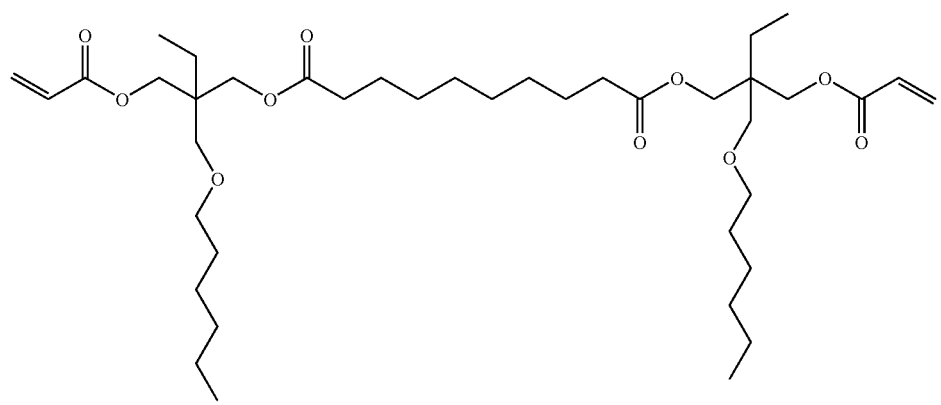
(I-6)
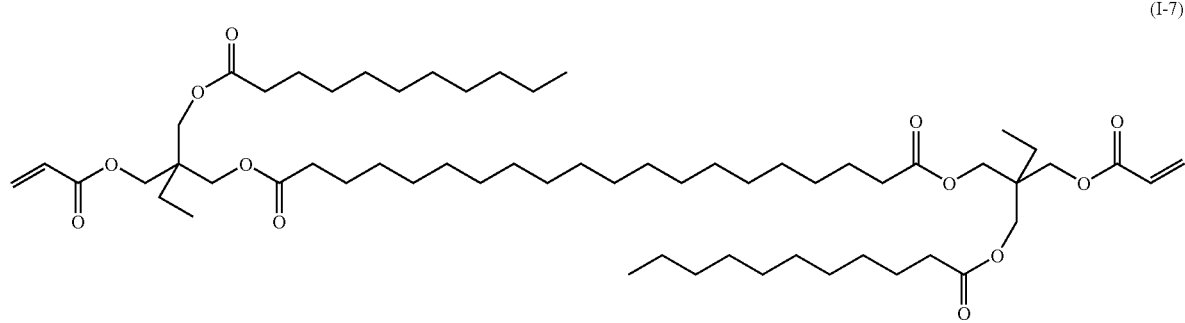
(I-7)
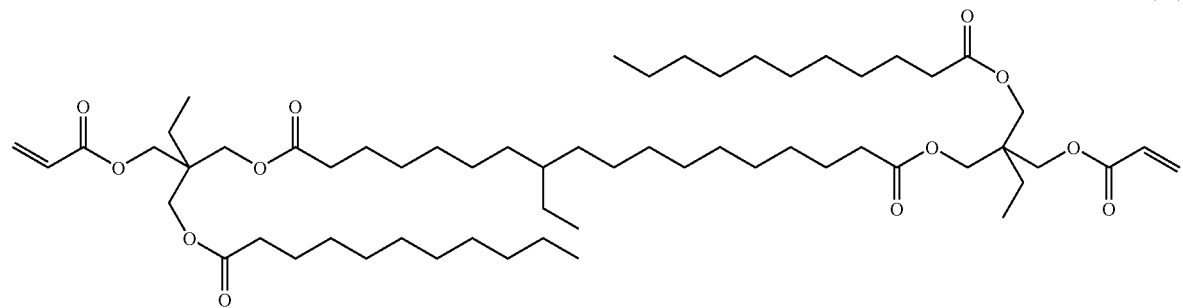
(I-8)

[Chemical Formula 18]

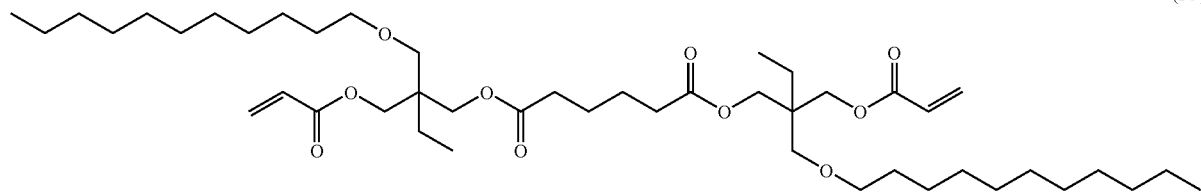

(I-9)

<Low-Molecular Liquid Crystal Compound (II)>

The low-molecular liquid crystal compound (II) used in the polymer-stabilized liquid crystal composition of the present invention is represented by the general formula (II-a) or (II-b) shown below:

[Chemical Formula 19]

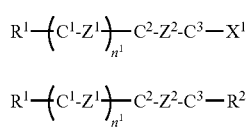

(in the formulas (II-a) and (II-b), $R^1$ and $R^2$ each independently represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other), $C^1$ represents a 1,4-phenylene group, a 1,4-cyclohexylene group, or a 1,3-dioxane-2,5-diyl group (the 1,4-phenylene group among these groups is unsubstituted, or can contain one, or two or more fluorine atom(s), chlorine atom(s), methyl group(s), trifluoromethyl group(s), or trifluoromethoxy group(s) as substituent(s)), $C^2$ and $C^3$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, 1,3,4-thiadiazole-2,5-diyl group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $Z^1$ and $Z^2$ each independently represents a single bond, —$CH_2CH_2$—, —$CH_2O$—, —$OCH_2$—, —$CH_2CH_2O$—, —$OCH_2CH_2$—, —$CH_2CH_2CH_2O$—, —$OCH_2CH_2CH_2$—, —CH=CH—, —C≡C—, —$CF_2O$—, —$OCF_2$—, —COO—, or —OCO—, $X^1$ represents a fluorine atom, a chlorine atom, a trifluoromethyl group, a trifluoromethoxy group, a difluoromethyl group, an isocyanate group, or a cyano group, and $n^1$ represents 0, 1, or 2, provided that plural $C^1$ and $Z^1$ may be the same or different when $n^1$ represents 2).

Alternatively, the low-molecular liquid crystal compound (II) used in the polymer-stabilized liquid crystal composition of the present invention is represented by the general formula (VIII-a), general formula (IX-a), or general formula (X).

Specifically, the compound represented by the general formula (II-a) or (II-b) is preferably a compound represented by the general formula (V-a), general formula (VI-a), general formula (VI-b), general formula (VII-a), or general formula (VII-b) shown below in view of a wide liquid crystal temperature range, liquid crystal phase stability and compatibility in a low temperature range, a high dielectric constant, and a high specific resistance value.

<Compound Represented by General Formula (V-a)>

[Chemical Formula 20]

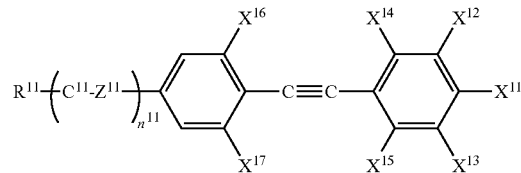

(V-a)

(in the formula (V-a), $R^{11}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^{11}$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s), or trifluoromethoxy group(s) as substituent(s)), $Z^{11}$ represents a single bond or —$CH_2CH_2$—, $X^{11}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), a fluorine atom, a chlorine atom, an isocyanate group, a trifluoromethyl group, a trifluoromethoxy group, a difluoromethoxy group, or a group represented by general formula (V-b) shown below, $X^{12}$ to $X^{17}$ each independently represents a hydrogen atom, a fluorine atom, a chlorine atom, a trifluoromethyl group, a trifluoromethoxy group, a methyl group, methoxy group, or an ethyl group, and $n^{11}$ represents 0 or 1).

Herein, the general formula (V-b) is formula shown below:

[Chemical Formula 21]

(V-b)

(in the formula (V-b), $C^{12}$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s), or trifluoromethoxy group(s) as substituents(s)), $X^{18}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), a fluorine atom, a chlorine atom, an isocyanate group, a trifluoromethyl group, a trifluoromethoxy group, or a difluoromethoxy group)).

In the general formula (V-a), $R^{11}$ is preferably an alkyl group of 1 to 18 carbon atoms or an alkenyl group of 2 to 18 carbon atoms (one, or two or more methylene group(s) existing in the alkyl group or an alkenyl group may be substituted with an oxygen atom as a substituted in a manner that any oxygen atoms are not directly bonded to each other), and more preferably an alkyl group of 1 to 12 carbon atoms or an alkoxy group of 1 to 12 carbon atoms.

$Z^{11}$ is preferably a single bond. $X^{11}$ is preferably an alkyl group of 1 to 18 carbon atoms, an alkoxy group of 1 to 18 carbon atoms, or a fluorine atom. $X^{12}$ to $X^{17}$ are preferably hydrogen atoms, fluorine atoms, or methyl groups, and one or more and three or less substituents among $X^{12}$ to $X^{17}$ are more preferably fluorine atoms or methyl groups.

Specifically, preferred compounds are those represented by general formula (V-1) to general formula (V-7):

[Chemical Formula 22]

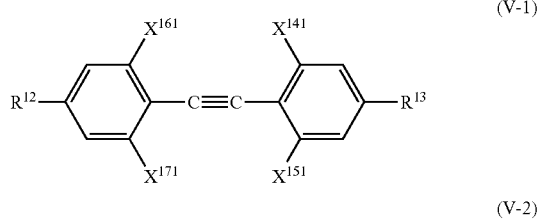
(V-1)

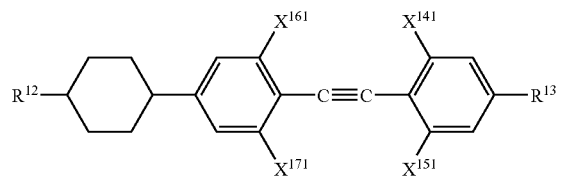
(V-2)

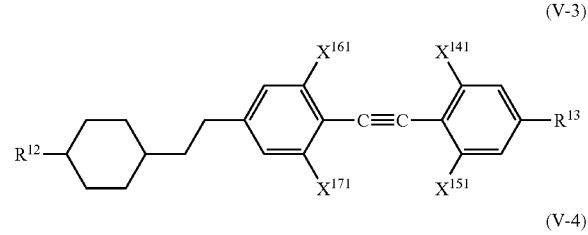
(V-3)

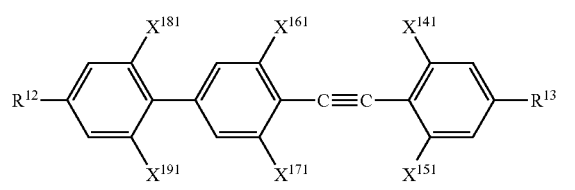
(V-4)

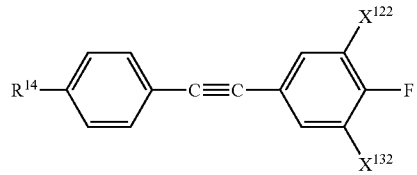
(V-5)

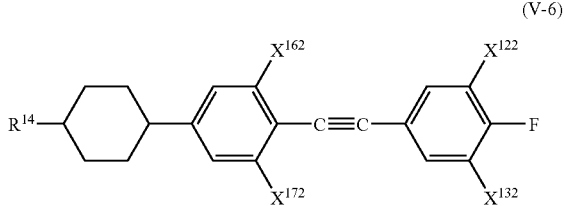
(V-6)

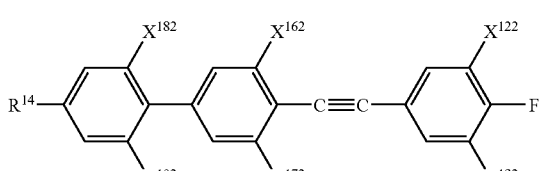
(V-7)

(wherein $R^{12}$, $R^{13}$, and $R^{14}$ each independently represents an alkyl group of 1 to 18 carbon atoms or an alkoxy group of 1 to 18 carbon atoms, $X^{141}$, $X^{151}$, $X^{161}$, $X^{171}$, $X^{181}$, and $X^{191}$ each independently represents a hydrogen atom, a fluorine atom, or a methyl group, and $X^{122}$, $X^{132}$, $X^{162}$, $X^{172}$, $X^{182}$, and $X^{192}$ each independently represents a hydrogen atom or a fluorine atom). Among these compounds, preferred compounds are those in which at least one or more and three or less of substituents among $X^{141}$, $X^{151}$, $X^{161}$, $X^{171}$, $X^{181}$, and $X^{191}$ are fluorine atoms or methyl groups in the general formula (V-1) to the general formula (V-4), and those in which at least one or more and three or less of substituents among $X^{122}$, $X^{132}$, $X^{162}$, $X^{172}$, $X^{182}$, and $X^{192}$ are fluorine atoms in the general formula (V-5) to the general formula (V-7). Specifically, more preferred compounds are those represented by general formula (V-8) to general formula (V-16):

[Chemical Formula 23]

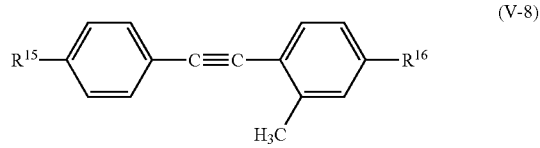
(V-8)

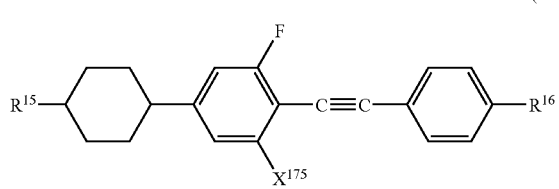
(V-9)

-continued

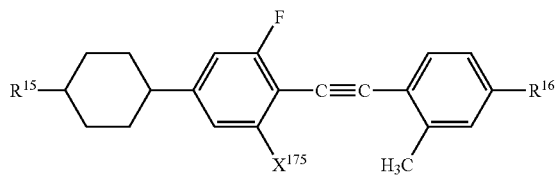
(V-10)

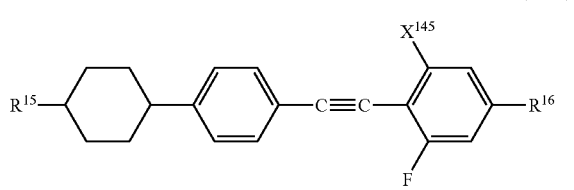
(V-11)

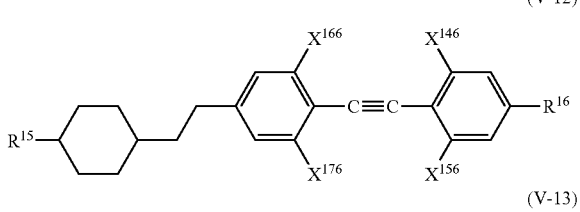
(V-12)

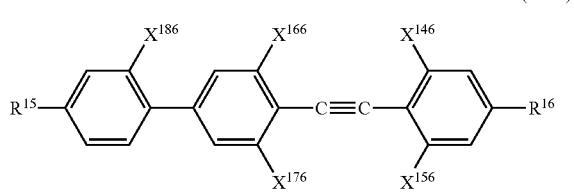
(V-13)

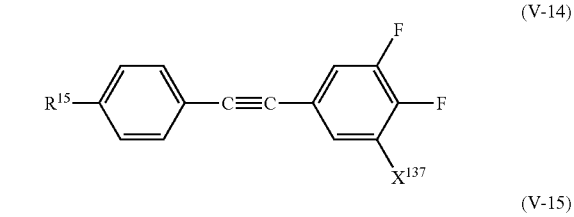
(V-14)

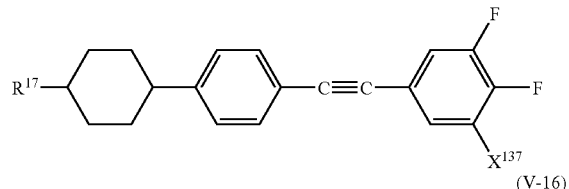
(V-15)

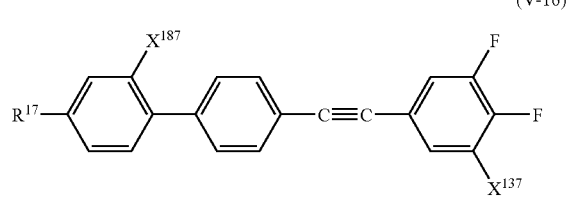
(V-16)

(wherein $R^{15}$, $R^{16}$, and $R^{17}$ each independently represents an alkyl group of 1 to 18 carbon atoms or an alkoxy group of 1 to 18 carbon atoms, $X^{145}$, $X^{175}$, $X^{166}$, $X^{176}$, and $X^{186}$ each independently represents a hydrogen atom or a fluorine atom, $X^{146}$ and $X^{156}$ each independently represents a hydrogen atom, a fluorine atom, or a methyl group, and $X^{137}$ and $X^{187}$ each independently represents a hydrogen atom or a fluorine atom).

<Compounds Represented by General Formula (VI-a) and General Formula (VI-B)>

[Chemical Formula 24]

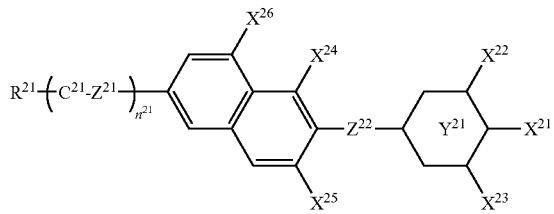
(VI-a)

(in the formula (VI-a), $R^{21}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^{21}$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s) or trifluoromethoxy group(s) as substituent(s)), 6-membered ring $Y^{21}$ represents a benzene ring or a cyclohexane ring, $X^{21}$ represents a fluorine atom, a chlorine atom, an isocyanate group, a trifluoromethyl group, a trifluoromethoxy group, or a difluoromethoxy group, $X^{22}$ to $X^{26}$ each independently represents a hydrogen atom, a fluorine atom, a chlorine atom, a trifluoromethyl group, or a trifluoromethoxy group, $Z^{21}$ represents a single bond or —$CH_2CH_2$—, $Z^{22}$ represents a single bond, —$CH_2CH_2$—, or —$CF_2O$—, $n^{21}$ represents 0 or 1).

[Chemical Formula 25]

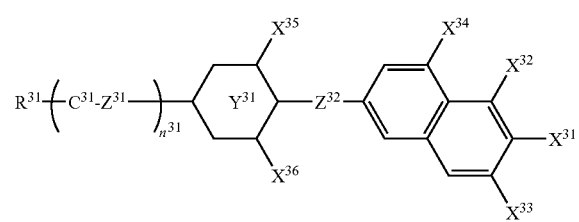
(VI-b)

(in the formula (VI-b), $R^{31}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^{31}$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s) or trifluoromethoxy group(s) as substituent(s)), 6-membered ring $Y^{31}$ represents a benzene ring or a cyclohexane ring, $X^{31}$ represents a fluorine atom, a chlorine atom, an isocyanate group, a trifluoromethyl group, a trifluoromethoxy group, or a difluoromethoxy group, $X^{32}$ to $X^{36}$ each independently represents a hydrogen atom, a fluorine atom, a chlorine atom, a trifluoromethyl group or a trifluoromethoxy group, $Z^{31}$ represents a single bond or —CH$_2$CH$_2$—, $Z^{32}$ represents a single bond, —CH$_2$CH$_2$—, or —CF$_2$O—, and $n^{31}$ represents 0 or 1).

In the general formula (VI-a) and general formula (VI-b), $R^{21}$ and $R^{31}$ are preferably alkyl groups of 1 to 18 carbon atoms or alkenyl groups of 2 to 18 carbon atoms (one, or two or more methylene group(s) existing in the alkyl group or an alkenyl group may be substituted with an oxygen atom in a manner that any oxygen atoms are not directly bonded to each other), and the alkyl group or alkenyl group is more preferably an alkenyl group represented by formula (VI-c) or an alkyl group of 1 to 18 carbon atoms:

[Chemical Formula 26]

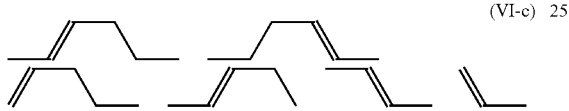

(VI-c)

(the respective structural formulas in the formula (VI-c) are directly connected to the ring at right end, or connected to the ring via an oxygen atom).

$C^{21}$ and $C^{31}$ are preferably 1,4-cyclohexylene groups.

$Z^{21}$ and $Z^{31}$ are preferably single bonds.

$X^{21}$ and $X^{31}$ are preferably fluorine atoms or trifluoromethoxy groups, and more preferably fluorine atoms.

Specifically, preferred compounds are those represented by general formula (VI-1) to general formula (VI-33):

[Chemical Formula 27]

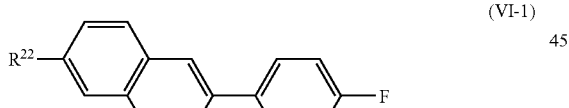

(VI-1)

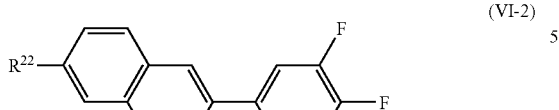

(VI-2)

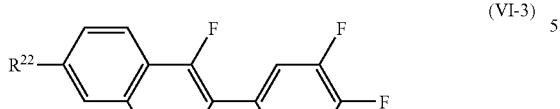

(VI-3)

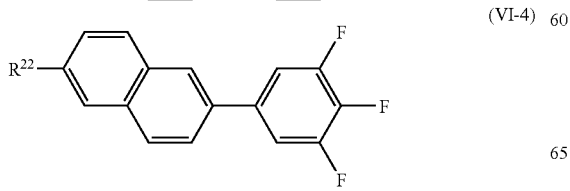

(VI-4)

-continued

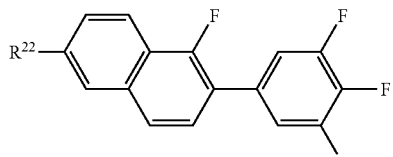

(VI-5)

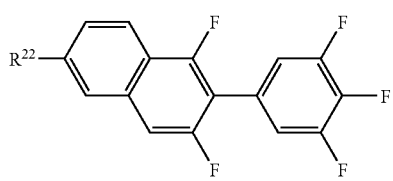

(VI-6)

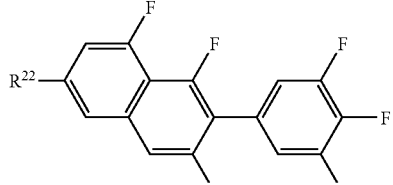

(VI-7)

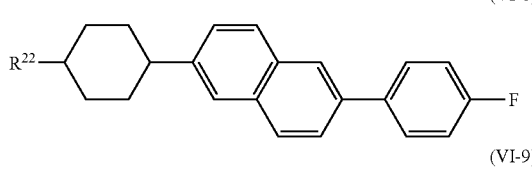

(VI-8)

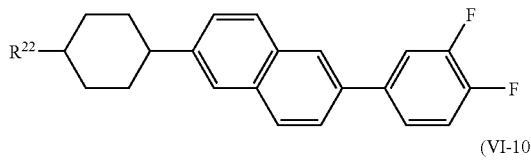

(VI-9)

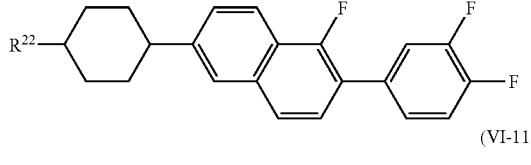

(VI-10)

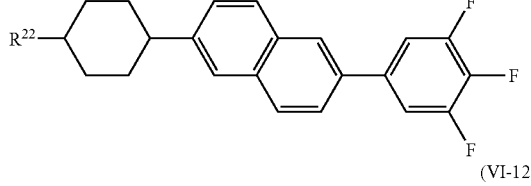

(VI-11)

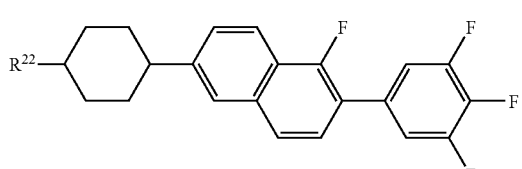

(VI-12)

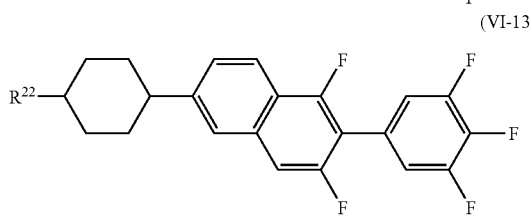

(VI-13)

(VI-14)
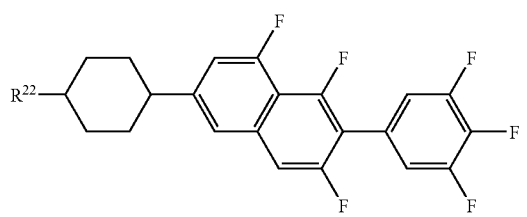
[Chemical Formula 28]
(VI-15)
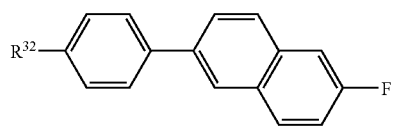
(VI-16)
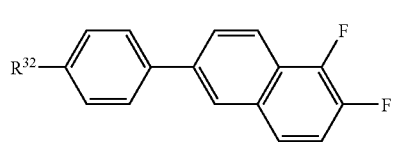
(VI-17)
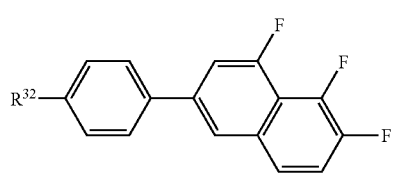
(VI-18)
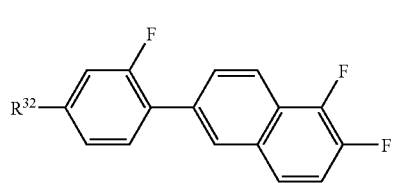
(VI-19)
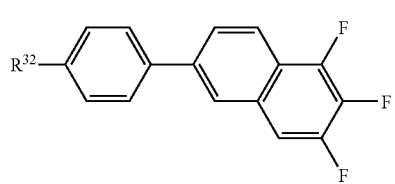
(VI-20)
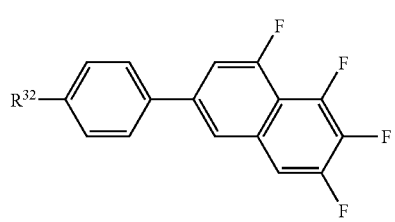
(VI-21)
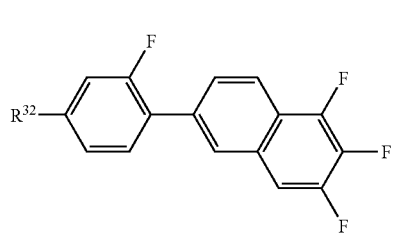
(VI-22)
(VI-23)
(VI-24)
(VI-25)
(VI-26)
(VI-27)
(VI-28)
(VI-29)

-continued

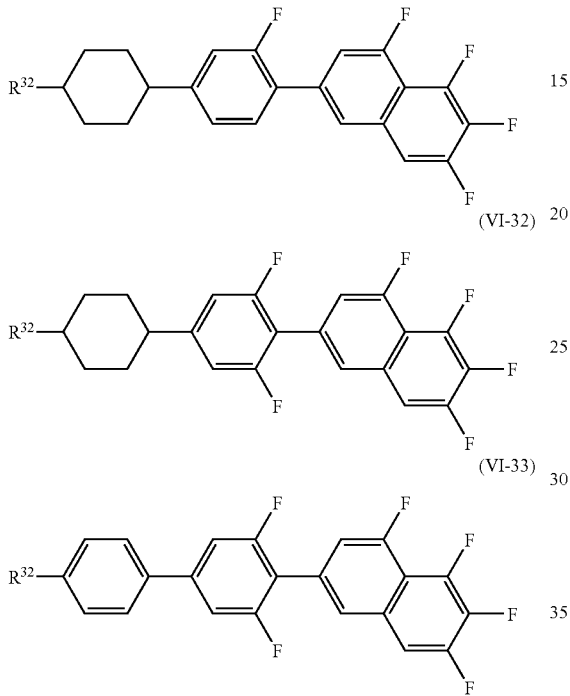

(VI-30)
(VI-31)
(VI-32)
(VI-33)

($R^{22}$ and $R^{32}$ represent an alkyl group of 1 to 18 carbon atoms.)

<Compounds Represented by General Formula (VII-a) and General Formula (VII-B)>

[Chemical Formula 29]

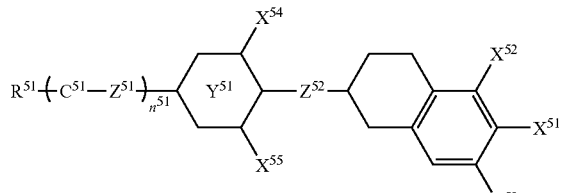

(VII-a)

(in the formula (VII-a), $R^{41}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^{41}$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s), or trifluoromethoxy group(s) as substituent(s)), 6-membered ring $Y^{41}$ represents a benzene ring or a cyclohexane ring, $X^{41}$ represents a fluorine atom, a chlorine atom, an isocyanate group, a trifluoromethyl group, a trifluoromethoxy group, or a difluoromethoxy group, $X^{42}$ to $X^{45}$ each independently represents a hydrogen atom, a fluorine atom, a chlorine atom, a trifluoromethyl group, or a trifluoromethoxy group, $Z^{41}$ represents a single bond or —CH$_2$CH$_2$—, $Z^{42}$ represents a single bond, —CH$_2$CH$_2$—, or —CF$_2$O—, and $n^{41}$ represents 0 or 1).

[Chemical Formula 30]

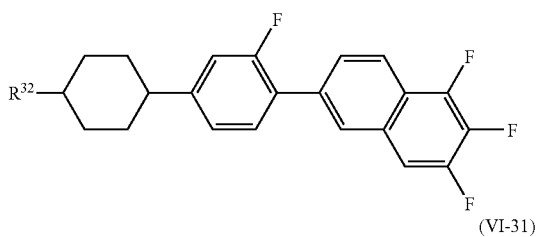

(VII-b)

(in the formula (VII-b), $R^{51}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^5$ represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s), or trifluoromethoxy group(s) as substituent(s)), 6-membered ring $Y^{51}$ represents a benzene ring or a cyclohexane ring, $X^{51}$ represents a fluorine atom, a chlorine atom, an isocyanate group, a trifluoromethyl group, a trifluoromethoxy group, or a difluoromethoxy group, $X^{52}$ to $X^{55}$ each independently represents a hydrogen atom, a fluorine atom, a chlorine atom, a trifluoromethyl group, or a trifluoromethoxy group, $Z^{51}$ represents a single bond or —CH$_2$CH$_2$—, $Z^{52}$ represents a single bond, —CH$_2$CH$_2$—, or —CF$_2$O—, and $n^{51}$ represents 0 or 1).

In the general formula (VII-a) and general formula (VII-b), $R^{41}$ and $R^{51}$ are preferably an alkyl group of 1 to 18 carbon atoms or an alkenyl group of 2 to 6 carbon atoms (one, or two or more methylene group(s) existing in the alkyl group or an alkenyl group may be substituted with an oxygen atom in a manner that any oxygen atoms are not directly bonded to each other), and the alkyl group or an alkenyl group is more preferably an alkenyl group represented by formula (VII-c) or an alkyl group of 1 to 5 carbon atoms:

[Chemical Formula 31]

(VII-c)

-continued

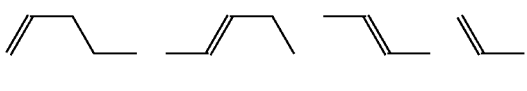

(the respective structural formulas in formula (VII-c) are directly connected to the ring at right end, or connected to the ring via an oxygen atom).

$C^{41}$ and $C^{51}$ are preferably 1,4-cyclohexylene groups.

$Z^{41}$ and $Z^{51}$ are preferably single bonds.

$X^{41}$ and $X^{51}$ are preferably fluorine atoms or trifluoromethoxy groups, and more preferably fluorine atoms.

Specifically, preferred compounds are those represented by general formula (VII-1) to general formula (VII-42):

[Chemical Formula 32]

(VII-1)
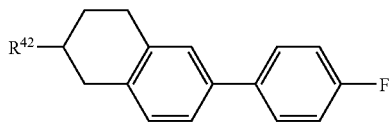

(VII-2)
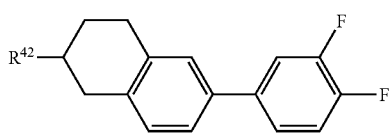

(VII-3)
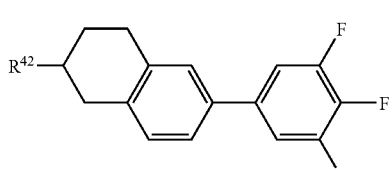

(VII-4)
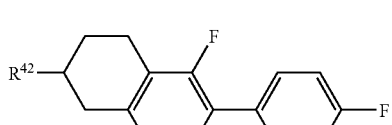

(VII-5)
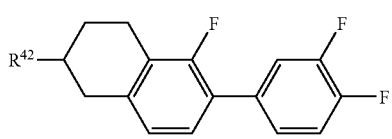

(VII-6)
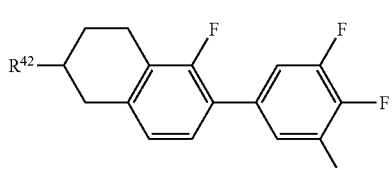

(VII-7)
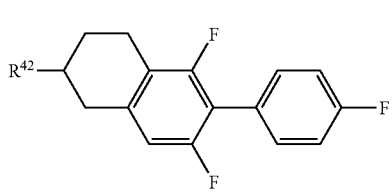

-continued (VII-8)
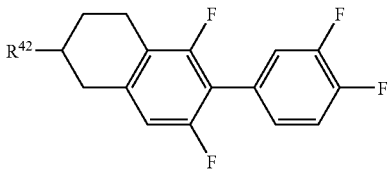

(VII-9)
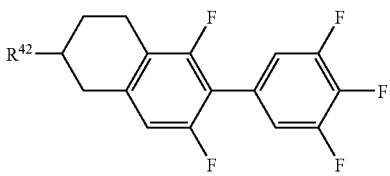

(VII-10)
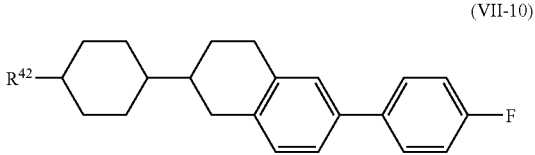

(VII-11)
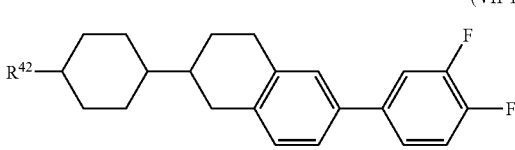

(VII-12)
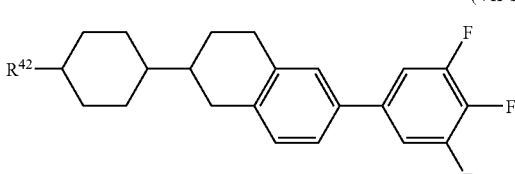

(VII-13)
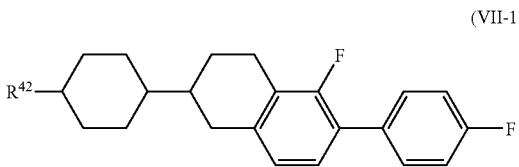

(VII-14)
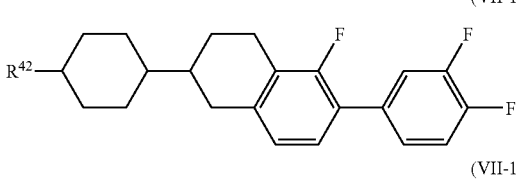

(VII-15)
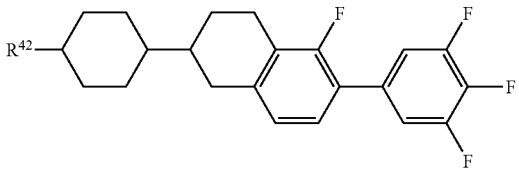

(VII-16)
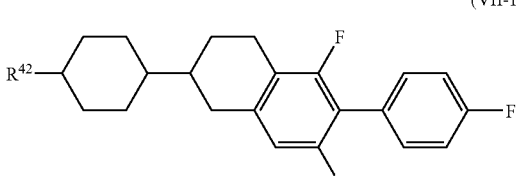

(VII-17)
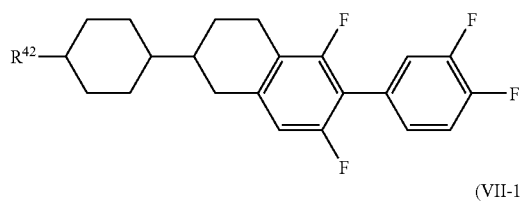
(VII-18)
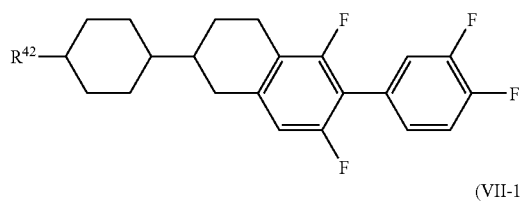
[Chemical Formula 33]
(VII-19)
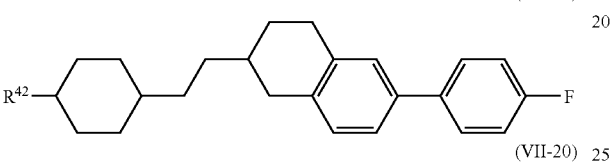
(VII-20)
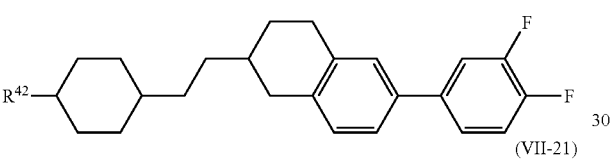
(VII-21)
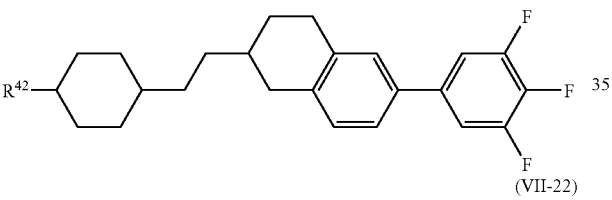
(VII-22)
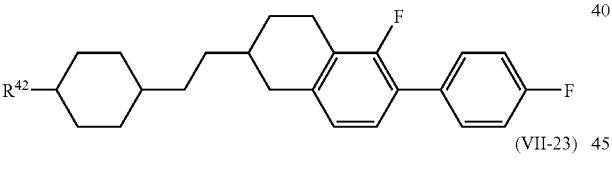
(VII-23)
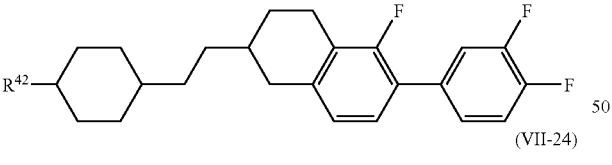
(VII-24)
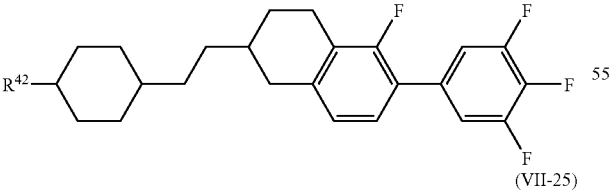
(VII-25)
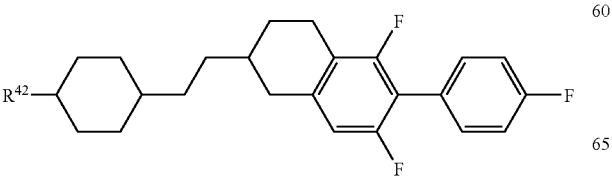
(VII-26)
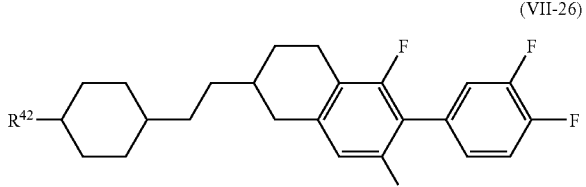
(VII-27)
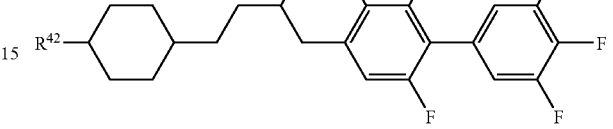
[Chemical Formula 34]
(VII-28)
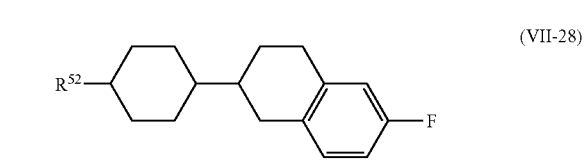
(VII-29)
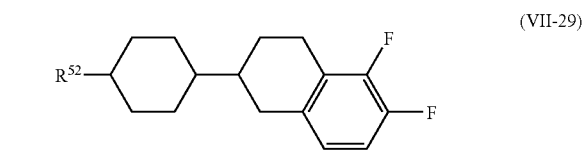
(VII-30)
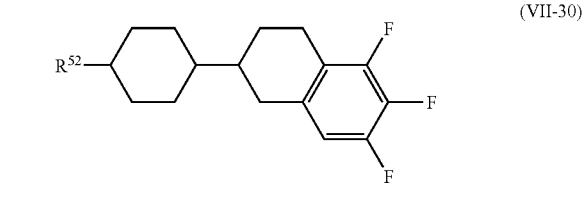
(VII-31)
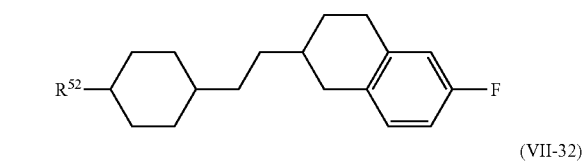
(VII-32)
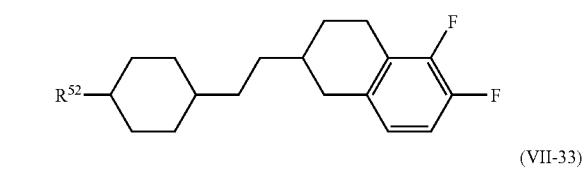
(VII-33)
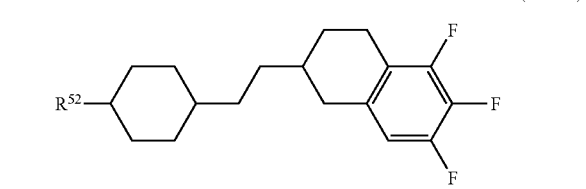
(VII-34)
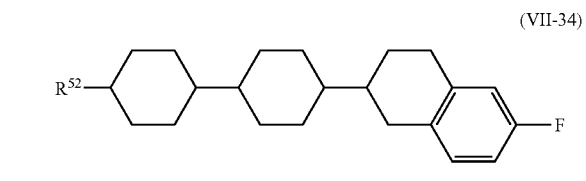

-continued

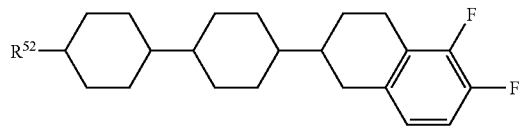
(VII-35)

(VII-36)

[Chemical Formula 35]

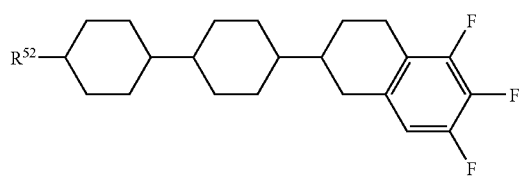
(VII-37)

(VII-38)

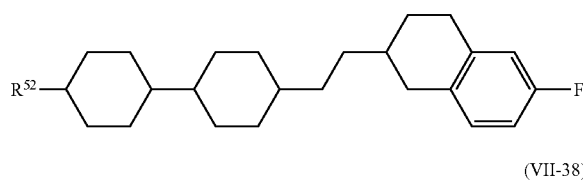
(VII-39)

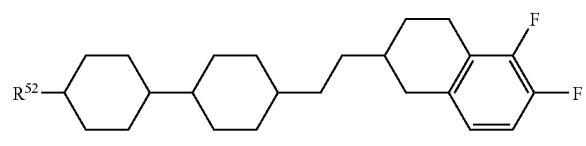
(VII-40)

(VII-41)

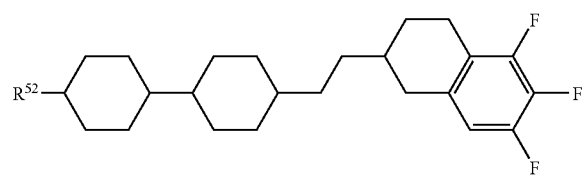
(VII-42)

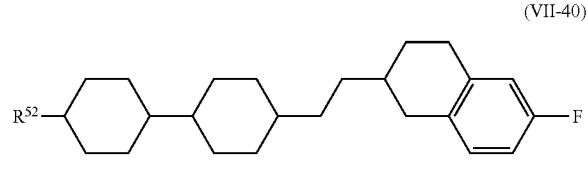

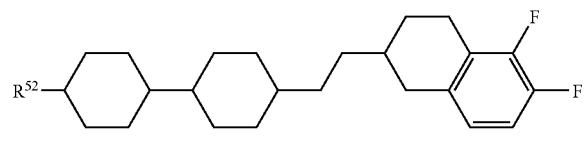

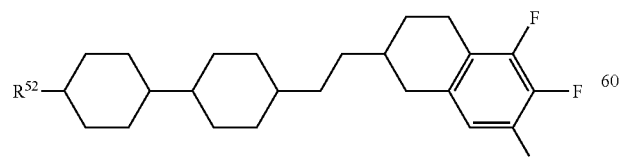

(wherein $R^{42}$ and $R^{52}$ represent an alkyl group of 1 to 18 carbon atoms).

<Compound Represented by General Formula (VIII-a)>

[Chemical Formula 36]

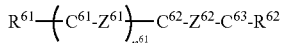
(VIII-a)

(in the formula (VIII-a), $R^{61}$ and $R^{62}$ each independently represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other),
$C^{61}$, $C^{62}$ and $C^{63}$ each independently represents a 1,4-phenylene group or a 1,4-cyclohexylene group (the 1,4-phenylene group is unsubstituted, or can contain one, or two or more of fluorine atom(s), chlorine atom(s), methyl group(s), trifluoromethyl group(s), or trifluoromethoxy group(s) as substituent(s)),
$Z^{61}$ and $Z^{62}$ each independently represents a single bond or —$CH_2CH_2$—, and
$n^{61}$ represents 0, 1, or 2, provided that plural $C^{61}$ and $Z^{61}$ may be the same or different when $n^{61}$ is 2).

In the general formula (VIII-a), $R^{61}$ and $R^{62}$ are preferably alkyl groups of 1 to 18 carbon atoms or alkenyl groups of 2 to 18 carbon atoms (one, or two or more methylene group(s) existing in the alkyl group or an alkenyl group may be substituted with an oxygen atom in a manner that any oxygen atoms are not directly bonded to each other), and more preferably alkenyl groups represented by the formula (VI-c), alkenyloxy groups (in which the alkenyl group is represented by the formula (VI-c)), or alkyl or an alkoxy groups of 1 to 5 carbon atoms.

When particularly low viscosity is desired, it is preferred that $n^{61}$ is 0, $C^{62}$ and $C^{63}$ are 1,4-cyclohexylene groups, and $Z^{62}$ is a single bond.

In order to expand a liquid crystal temperature range, it is preferred that $n^{61}$ is 0 or 1, $C^{61}$ and $C^{62}$ are 1,4-cyclohexylene groups, $C^{63}$ is a 1,4-phenylene group (the 1,4-phenylene group is unsubstituted, or can contain one, or two or more fluorine atom(s) or methyl group(s) as substituent(s)), $Z^{61}$ is a single bond or —$CH_2CH_2$—, and $Z^{62}$ is a single bond.

In order to obtain a particularly high refractive index, it is preferred that $n^{61}$ is 1, $C^{61}$ is a 1,4-cyclohexylene group or a 1,4-phenylene group (the 1,4-phenylene group is unsubstituted, or can contain one, or two or more fluorine atom(s) or methyl group(s) as substituent(s)), and $C^{62}$ and $C^{63}$ are 1,4-phenylene groups (the 1,4-phenylene group is unsubstituted, or can contain one, or two or more fluorine atom(s) or methyl group(s) as substituent(s)).

Specifically, preferred compounds are those represented by general formula (VIII-1) to general formula (VIII-5):

[Chemical Formula 37]

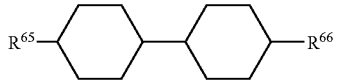
(VIII-1)

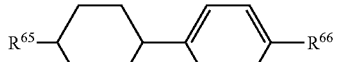
(VIII-2)

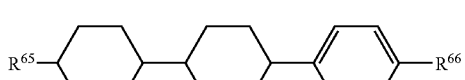
(VIII-3)

-continued (VIII-4)

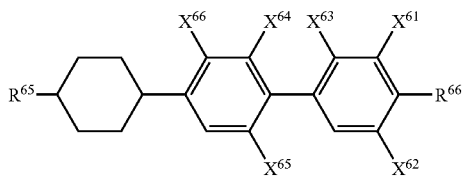

(VIII-5)

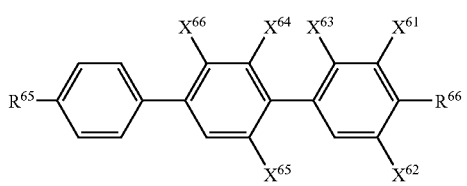

(wherein $R^{65}$ and $R^{66}$ each independently represents an alkyl group of 1 to 18 carbon atoms (one, or two or more methylene group(s) existing in the alkyl group may be substituted with an oxygen atom in a manner that any oxygen atoms are not directly bonded to each other), and $X^{61}$ to $X^{66}$ each independently represents a hydrogen atom, a fluorine atom, or a methyl group).

<Compound Represented by General Formula (Ix-a)>

[Chemical Formula 38]

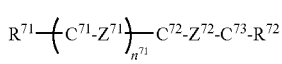

(IX-a)

(in the formula (IX-a), $R^{71}$ represents an alkyl group of 1 to 18 carbon atoms or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $C^{71}$, $C^{72}$, and $C^{73}$ each independently represents a 1,4-phenylene group, a 1,4-cyclohexylene group, or an indan-2,5-diyl group (the 1,4-phenylene group and the indan-2,5-diyl group are unsubstituted, or can contain one, or two or more of fluorine atom(s), chlorine atom(s), methyl group(s), trifluoromethyl group(s), or trifluoromethoxy group(s) as substituent(s)), $Z^{71}$ and $Z^{72}$ each independently represents a single bond, —$CH^2CH^2$—, or —$CF_2O$—, $X^{71}$ represents a fluorine atom, a chlorine atom, a trifluoromethyl group, a trifluoromethoxy group, a difluoromethyl group, or an isocyanate group, and $n^{71}$ represents 0, 1, or 2, provided that plural $C^{71}$ and $Z^{71}$ may be the same or different when $n^{71}$ is 2).

$R^{71}$ in the general formula (IX-a) is preferably an alkyl group of 1 to 18 carbon atoms or an alkenyl group of 2 to 6 carbon atoms (one, or two or more methylene group(s) existing in the alkyl group or an alkenyl group may be substituted with an oxygen atom in a manner that any oxygen atoms are not directly bonded to each other), and the alkenyl group is preferably represented by the formula (V-c), and more preferably an alkyl group of 1 to 18 carbon atoms or an alkoxy group of 1 to 18 carbon atoms.

$X^{71}$ is preferably a fluorine atom or a trifluoromethoxy group, and more preferably a fluorine atom.

When it is desired to obtain particularly high dielectric constant, it is preferred that $n^{71}$ is 0 or 1, $C^{71}$ is a 1,4-cyclohexylene group, $C^{72}$ is a 1,4-cyclohexylene group or a 1,4-phenylene group (the 1,4-phenylene group is unsubstituted, or can contain one, or two or more fluorine atom(s) or methyl group(s) as substituent(s)), $C^{73}$ is a 2-fluoro-1,4-phenylene group, a 3-fluoro-1,4-phenylene group, a 2,6-difluoro-1,4-phenylene group, or a 3,5-difluoro-1,4-phenylene group, and $Z^{71}$ and $Z^{72}$ are single bonds.

In order to expand a liquid crystal temperature range, it is preferred that $n^{71}$ is 2, $C^{71}$ is a 1,4-cyclohexylene group, $C^{72}$ is a 1,4-cyclohexylene group or a 1,4-phenylene group, $C^{73}$ is a 2-fluoro-1,4-phenylene group, a 3-fluoro-1,4-phenylene group, a 2,6-difluoro-1,4-phenylene group, or a 3,5-difluoro-1,4-phenylene group, and $Z^{71}$ and $Z^{72}$ are single bonds or —$CH_2CH_2$—.

Specifically, preferred compounds are those represented by general formula (IX-1) to general formula (IX-4):

[Chemical Formula 39]

(IX-1)

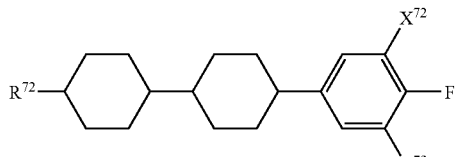

(IX-2)

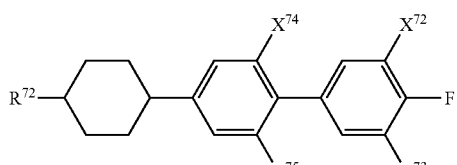

(IX-3)

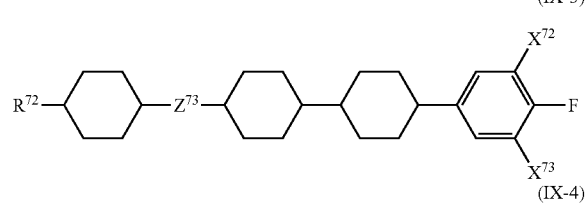

(IX-4)

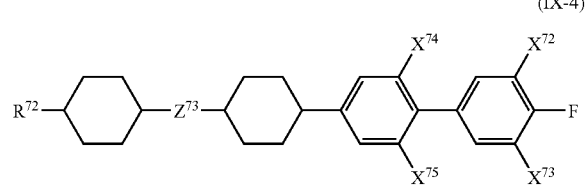

(wherein $R^{72}$ represents an alkyl group of 1 to 18 carbon atoms or an alkoxy group, $X^{72}$ to $X^{75}$ each independently represents a hydrogen atom or a fluorine atom, and $Z^{73}$ represents a single bond or —$CH_2CH_2$—).

Among these compounds of the general formula (IX-1) to the general formula (IX-4), more preferred compounds are those represented by general formula (IX-5) to general formula (IX-7):

[Chemical Formula 40]

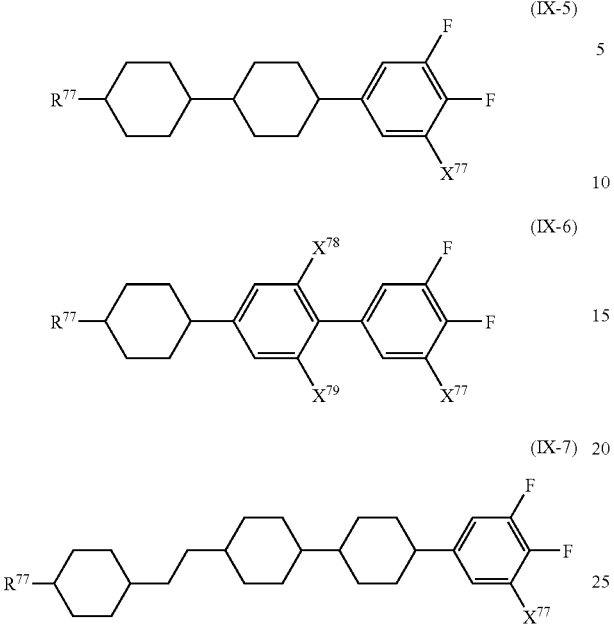

(IX-5)

(IX-6)

(IX-7)

(wherein $R^{77}$ represents an alkyl group of 1 to 18 carbon atoms, and $X^{77}$ to $X^{79}$ each independently represents a hydrogen atom or a fluorine atom).

<Compound Represented by General Formula (X)>

[Chemical Formula 41]

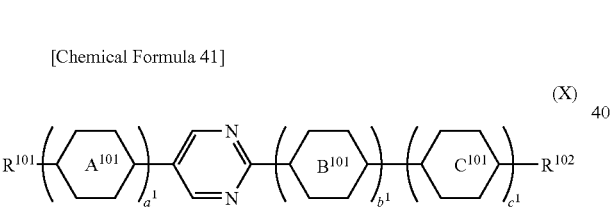

(X)

(wherein $R^{101}$ and $R^{102}$ each independently represents a linear or branched alkyl group of 1 to 18 carbon atoms, provided that one or two non-adjacent —$CH_2$— group(s) may be substituted with —O—, —S—, —CO—, —CO—O—, —O—CO—, —CO—S—, —S—CO—, —O—CO—O—, —CH=CH—, —C≡C—, cyclopropylene group, or a —$Si(CH_3)_2$—, and one or more hydrogen atom(s) of the alkyl group may be substituted with a fluorine atom or a CN group, $A^{101}$ represents 1,4-phenylene group, $B^{101}$ and $C^{101}$ each independently represents a 1,4-phenylene group in which one or two hydrogen atom(s) may be substituted with a fluorine atom, a $CF_3$ group, a $OCF_3$ group, or a CN group, or plural groups thereof, and $a^1$, $b^1$, and $c^1$ represent an integer of 0 or 1 and ($a^1+b^1+c^1$)=1 or 2).

Specifically, the compound represented by the general formula (X) is represented by general formula (X-a) to general formula (X-f):

[Chemical Formula 42]

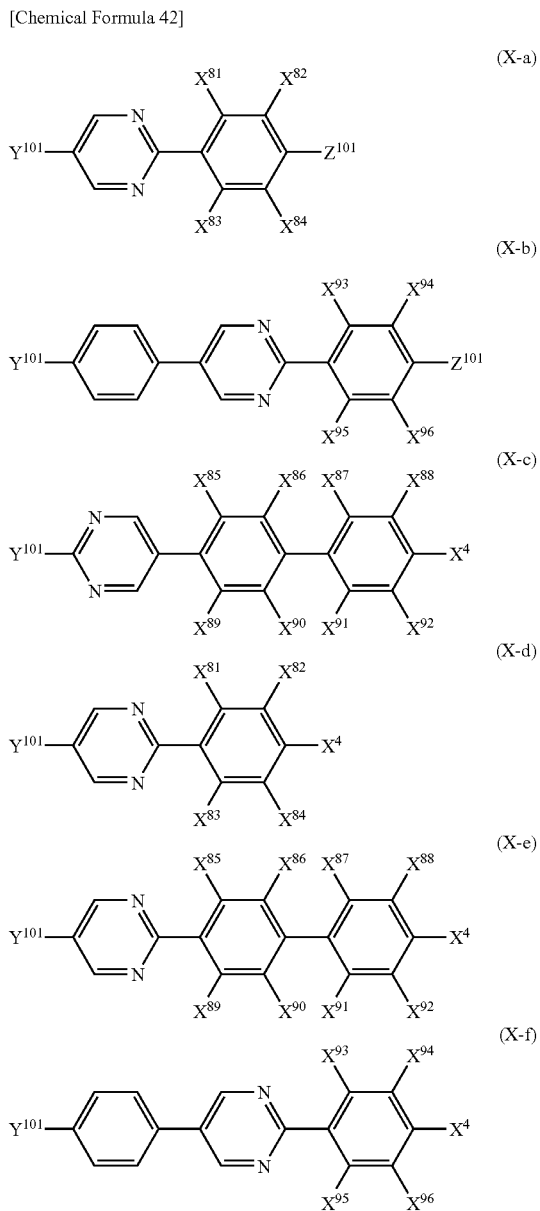

(X-a)

(X-b)

(X-c)

(X-d)

(X-e)

(X-f)

(wherein $Y^{101}$, and $X^4$ each independently represents an alkyl group of 1 to 18 carbon atoms, or an alkoxy group, or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $Z^{101}$ represents an alkyl group of 1 to 18 carbon atoms, or an alkoxy group, or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), or independently represents a fluorine atom, a chlorine atom, a trifluoromethyl group or a trifluoromethoxy group, a difluoromethyl group, or an isocyanate group, and $X^{81}$ to $X^{96}$ each independently represents a hydrogen atom, a fluorine atom, or a methyl group).

Specific examples of the compound represented by the general formula (X-a) to general formula (X-f) include compounds (X-1) to (X-17) shown below:

[Chemical Formula 43]

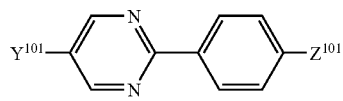 (X-1)

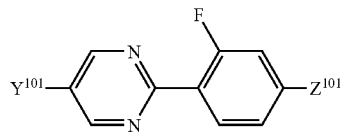 (X-2)

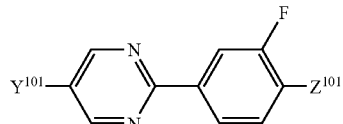 (X-3)

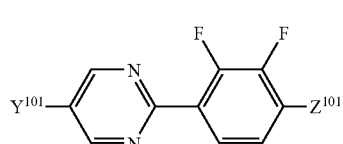 (X-4)

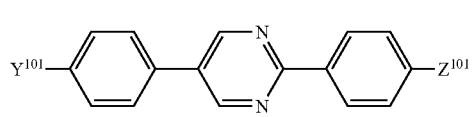 (X-5)

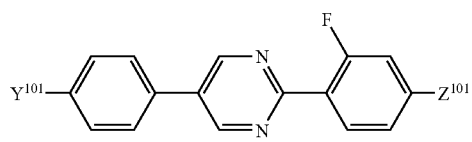 (X-6)

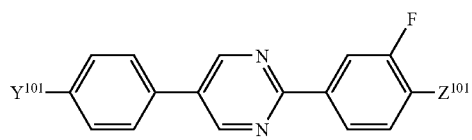 (X-7)

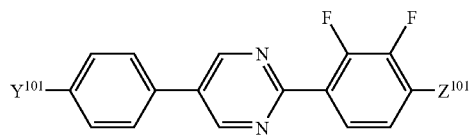 (X-8)

[Chemical Formula 44]

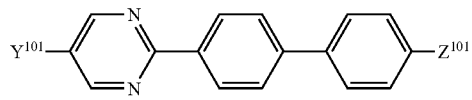 (X-9)

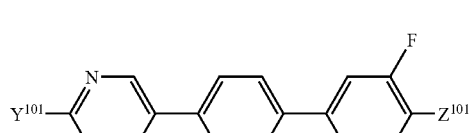 (X-10)

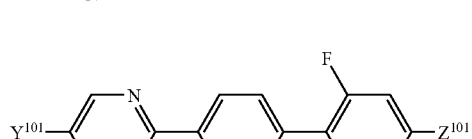 (X-11)

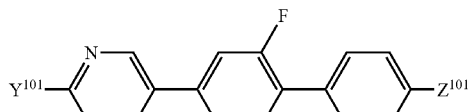 (X-12)

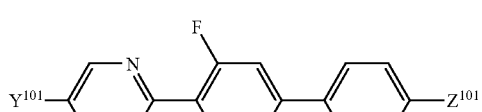 (X-13)

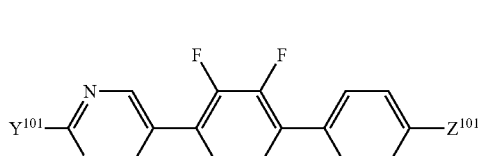 (X-14)

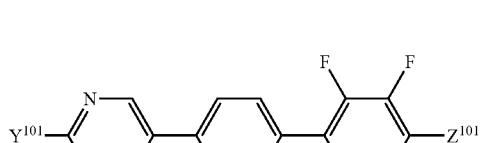 (X-15)

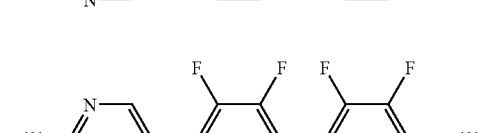 (X-16)

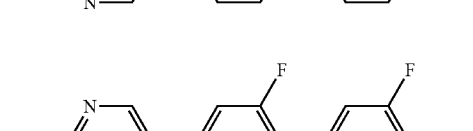 (X-17)

(wherein $Y^{101}$ represents an alkyl group of 1 to 18 carbon atoms, or an alkoxy group, or an alkenyl group of 2 to 18 carbon atoms (one, or two or more methylene group(s) existing in the alkyl group or an alkenyl group may be substituted with an oxygen atom in a manner that any oxygen atoms are not directly bonded to each other), $Z^{101}$ represents an alkyl group of 1 to 18 carbon atoms, or an alkoxy group, or an alkenyl group of 2 to 18 carbon atoms (one, or two or more methylene group(s) existing in the alkyl group or an alkenyl group may be substituted with an oxygen atom in a manner that any oxygen atoms are not directly bonded to each), or independently represents a fluorine atom, a chlorine atom, a trifluoromethyl group or a trifluoromethoxy group, a difluoromethyl group, or an isocyanate group).

It is desired to use, as the compound of general formula (II), a compound represented by general formula (VIII-a) or general formula (X) so as to stably obtain a desired liquid crystal phase and also to respond at a high speed. When a particularly high specific resistance value is required for operation using an active device such as a thin film transistor device, a metal-insulator-metal device or a thin film diode device, it is desired to use a compound of general formula (VIII-a). When the active device is not used or a particularly high specific resistance value is not required, a compound of general formula (X) is also preferably used, similarly to a compound of general formula (VIII-a). The compound of general formula (VIII-a) or general formula (X) may be used alone, or plural compounds can be used by mixing them. It is preferred to mix two or more kinds of different compounds in view of improvement in stability of a liquid crystal phase and control of physical properties.

In order to obtain a display device having a high transmittance, birefringence (Δn) must be adjusted depending on a cell thickness. In view of the production of the display device, the more the cell thickness increases, the better. In that case, it is necessary to use a liquid crystal having small Δn. In that case, a ring structure of general formula (II) is preferably a cyclohexyl or 1,3,4-thiadiazole-2,5-diyl structure. One or two cyclohexyl structure(s) preferably exist(s) in one molecule, and one 1,3,4-thiadiazole-2,5-diyl structure preferably exists in one molecule.

<Polymerizable Liquid Crystal Compound (III)>

The polymerizable liquid crystal compound (III) used in the polymer-stabilized liquid crystal composition of the present invention is at least one kind of a polymerizable compound (III) selected from the group consisting of compounds represented by the general formula (III-a) shown below:

[Chemical Formula 45]

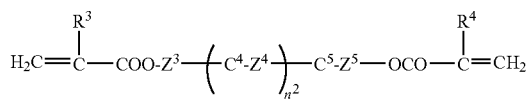

(III-a)

(in the formula (III-a), $R^3$ and $R^4$ each independently represents a hydrogen atom or a methyl group, $C^4$ and $C^5$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s) or trifluoromethoxy group(s) as substituent(s)), $Z^3$ and $Z^5$ each independently represents a single bond or an alkylene group of 1 to 15 carbon atoms (one, or two or more methylene group(s) existing in the alkylene group each independently may be substituted with oxygen atom(s), —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^4$ represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH═CH—, —C≡C—, —CF$_2$O—, —OCF$_2$—, —COO—, or —OCO—, and $n^2$ represents 0, 1, or 2, and plural $C^4$ and $Z^4$ may be the same or different when $n^2$ represents 2), the general formula (III-b):

[Chemical Formula 46]

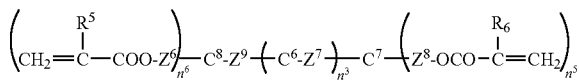

(III-b)

(in the formula (III-b), $R^5$ and $R^6$ each independently represents a hydrogen atom or a methyl group, $C^6$ represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $C^7$ and $C^8$ each independently represents a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group, $Z^6$ and $Z^8$ each independently represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^7$ and $Z^9$ each independently represents a single bond, —CH$_2$CH$_2$—, —CH$_2$O—, —OCH$_2$—, —CH$_2$CH$_2$O—, —OCH$_2$CH$_2$—, —CH$_2$CH$_2$CH$_2$O—, —OCH$_2$CH$_2$CH$_2$—, —CH$_2$CH$_2$OCO—, —COOCH$_2$CH$_2$—, —CH$_2$CH$_2$COO—, —OCOCH$_2$CH$_2$—, —CH═CH—, —C≡C—, —CF$_2$O—, —OCF$_2$—, —COO—, or —OCO—, $n^3$ represents 0, 1, or 2, and plural $C^6$ and $Z^7$ may be the same or different when $n^3$ represents 2, and $n^5$ and $n^6$ each independently represents 1, 2, or 3, and the general formula (III-c):

[Chemical Formula 47]

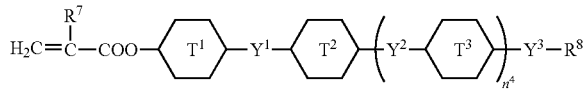

(III-c)

(in formula (III-c), R⁷ represents a hydrogen atom or a methyl group, 6-membered rings T¹, T² and T³ each independently represents any one of:

[Chemical Formula 48]

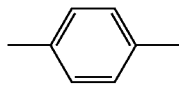
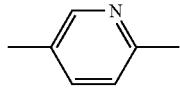

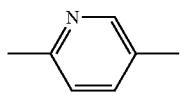
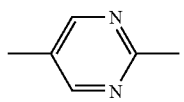

-continued

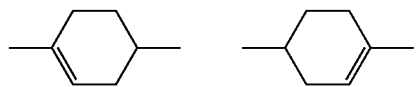

(in which m represents an integer of 1 to 4),
n⁴ represents an integer of 0 or 1,
Y¹ and Y² each independently represents a single bond, —CH₂CH₂—, —CH₂O—, —OCH₂—, —COO—, —OCO—, —C≡C—, —CH=CH—, —CF=CF—, —(CH₂)₄—, —CH₂CH₂CH₂O—, —OCH₂CH₂CH₂—, —CH₂=CHCH₂CH₂—, or —CH₂CH₂CH=CH—,
Y³ represents a single bond, —COO—, or —OCO—, and R⁸ represents a hydrocarbon group of 1 to 18 carbon atoms).

More specifically, it is preferred to use a compound represented by either general formula (III-d) or (III-e):

[Chemical Formula 49]

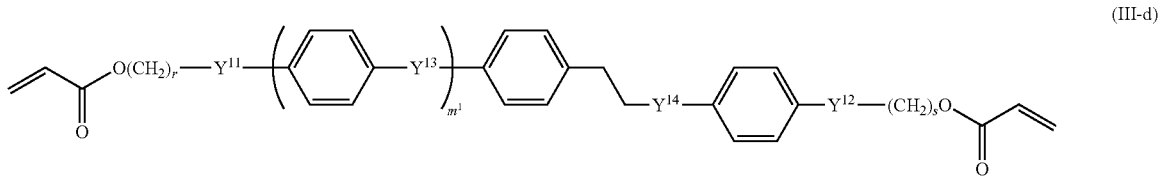

(III-d)

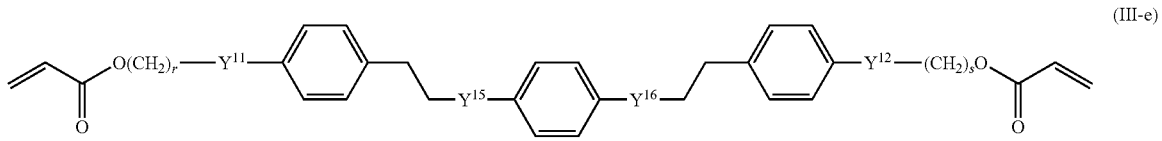

(III-e)

-continued

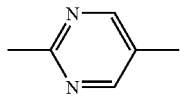
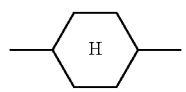

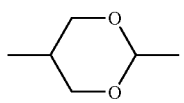
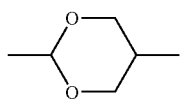

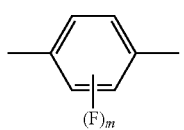
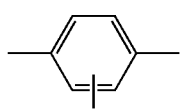

(wherein, in the formula (III-d) and (III-e), m¹ represents 0 or 1,

Y¹¹ and Y¹² each independently represents a single bond, —O—, —OCO—, or —OCO—,

Y¹³ and Y¹⁴ each independently represents —OCO— or —OCO—,

Y¹⁵ and Y¹⁶ each independently represents —OCO— or —OCO—, r and s each independently represents an integer of 2 to 14, and a 1,4-phenylene group existing in formula is unsubstituted, or can contain one, or two or more fluorine atom(s), chlorine atom(s), methyl group(s), trifluoromethyl group(s), or trifluoromethoxy group(s) as substituent(s)), since an optically anisotropic body having excellent mechanical strength and heat resistance is obtained.

Specific examples of the compound represented by the general formula (III-a) include compounds (III-1) to (III-10) shown below:

[Chemical Formula 50]
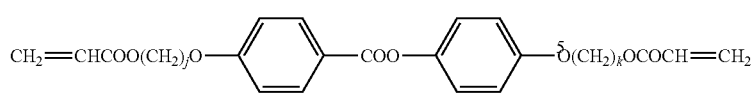 (III-1)
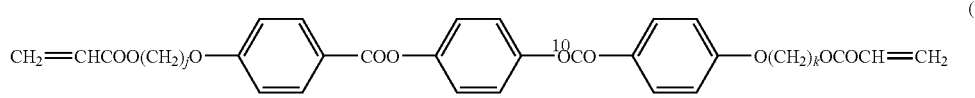 (III-2)
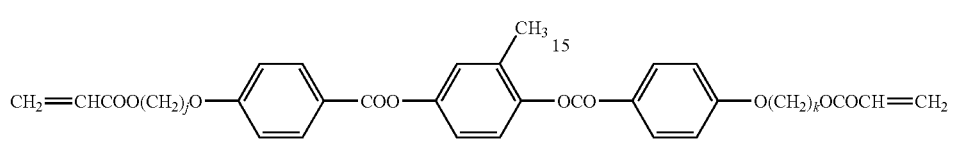 (III-3)
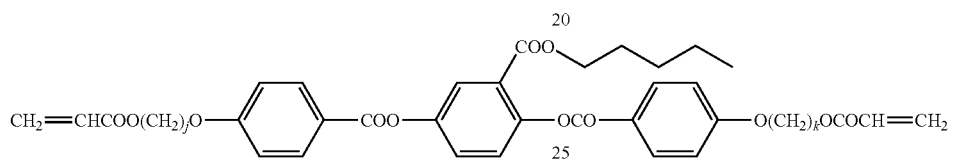 (III-4)
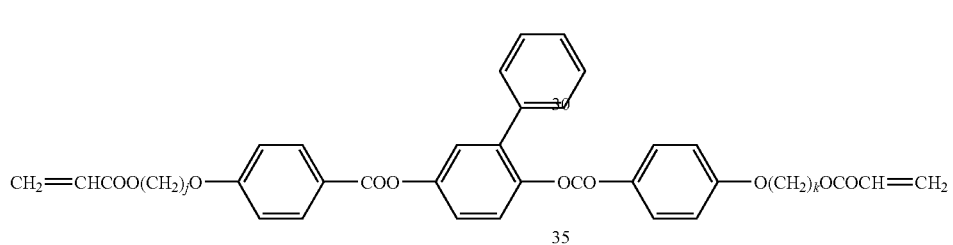 (III-5)
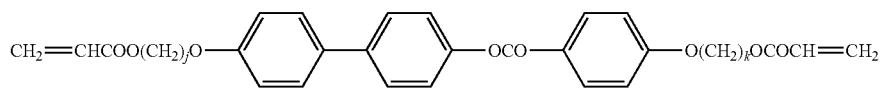 (III-6)
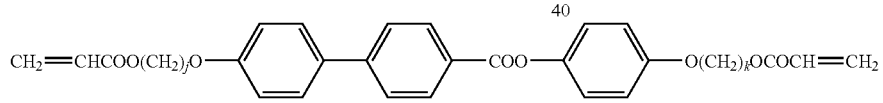 (III-7)
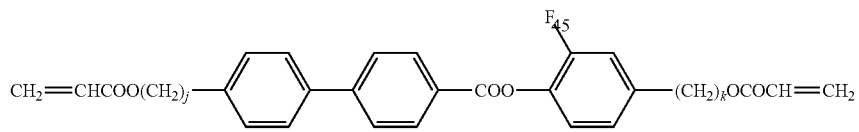 (III-8)
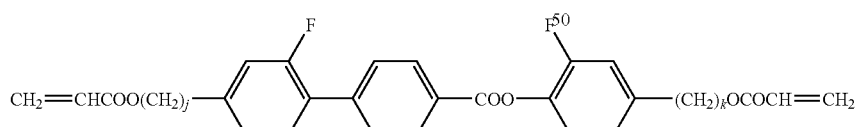 (III-9)
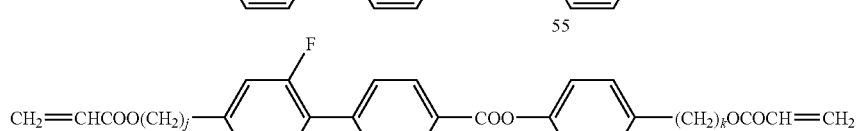 (III-10)
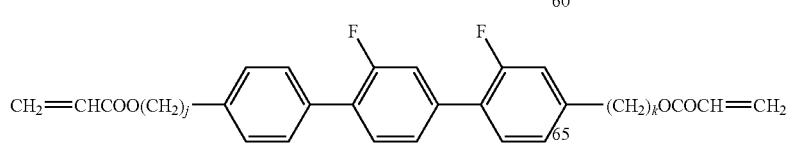 (III-11)

(wherein j and k each independently represents an integer of 2 to 14).
Specific examples of the compound represented by either general formula (III-d) or (III-e) include compounds (III-12) to (III-21) shown below:
[Chemical Formula 51]
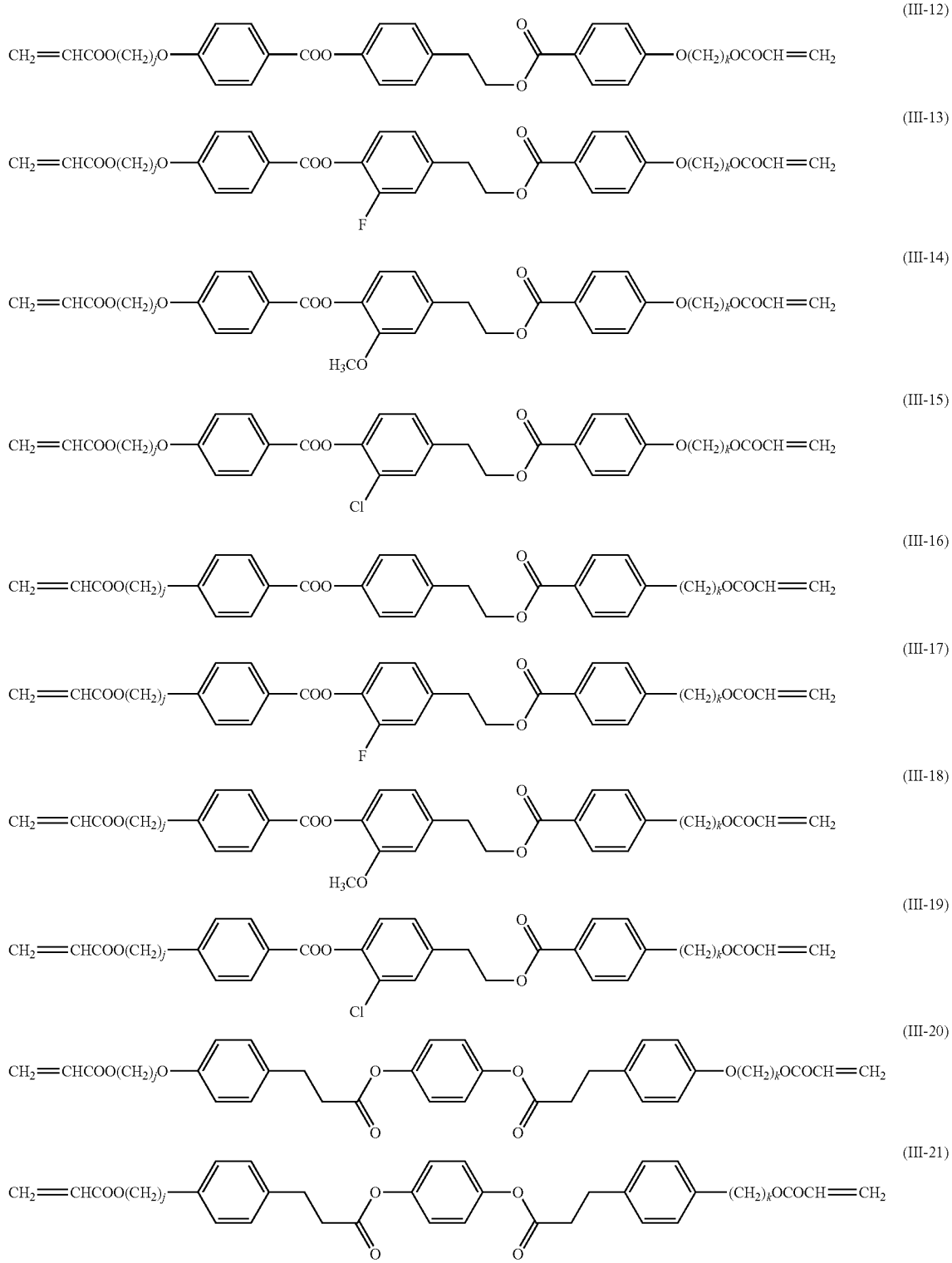

(wherein j and k each independently represents an integer of 2 to 14).
Specific examples of the compound represented by the general formula (III-a) include compounds (III-22) to (III-30) shown below:
[Chemical Formula 52]
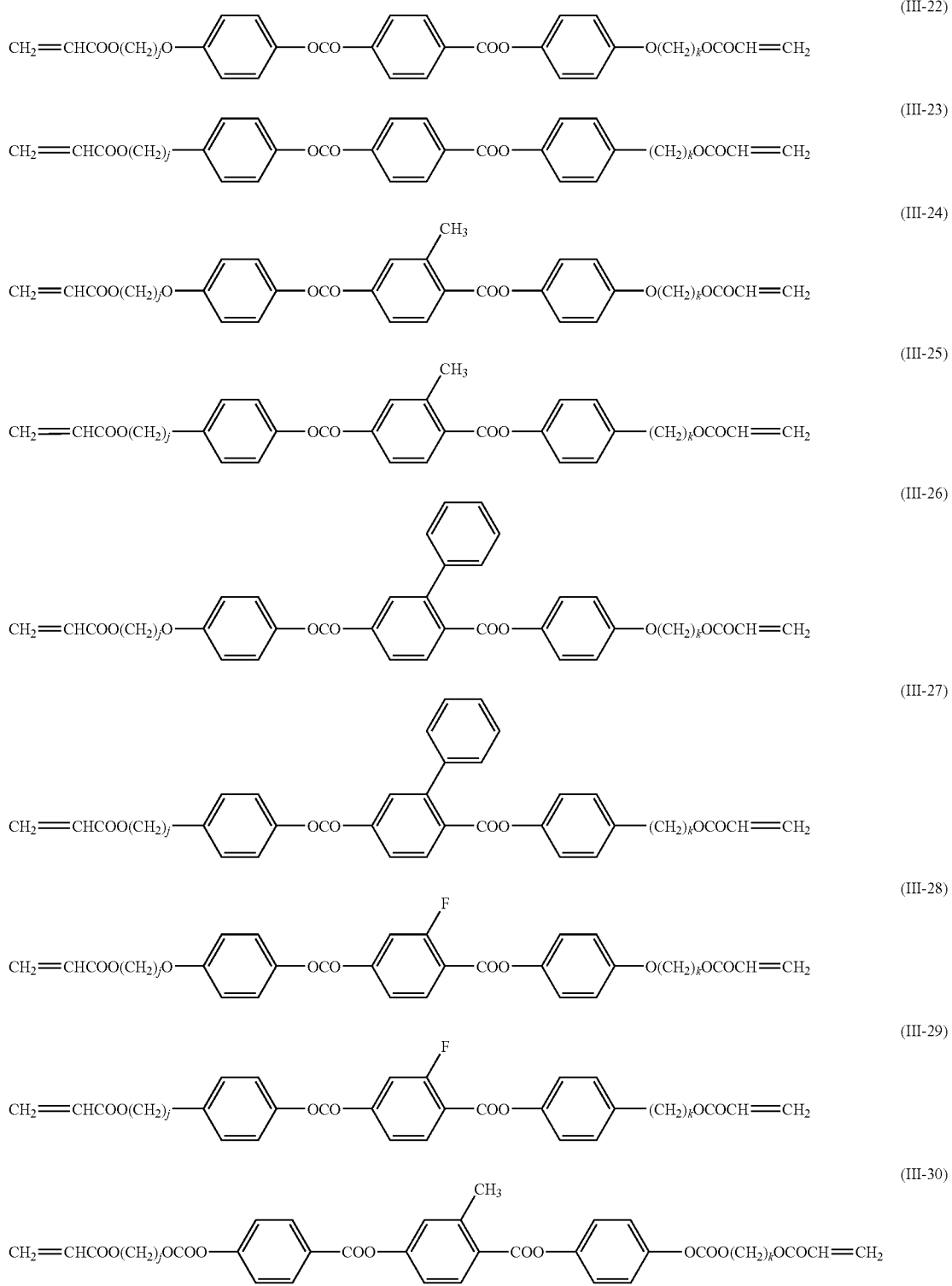

(wherein j and k each independently represents an integer of 2 to 14).

Specific examples of the compound represented by the general formula (III-b) include compounds (III-31) and (III-32) shown below.

[Chemical Formula 53]

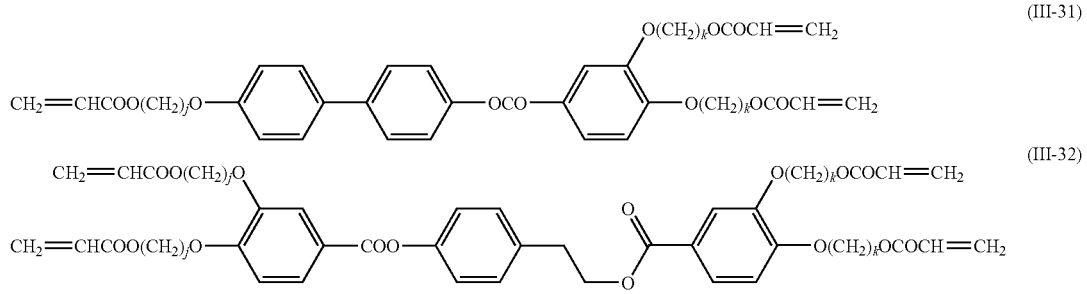

(III-31)

(III-32)

(wherein j and k each independently represents an integer of 2 to 14).

<Chiral Compound (IV)>

The chiral compound (IV) used in the polymer-stabilized liquid crystal composition of the present invention is a chiral compound (IV) represented by the general formula (IV-a) or (IV-b):

[Chemical Formula 54]

$$R^9-(C^8-Z^9)_{n^5}-C^9-Y^4-X^4 \quad \text{(IV-a)}$$

$$X^5-Y^5-(C^8-Z^9)_{n^5}-C^9-Y^4-X^4 \quad \text{(IV-b)}$$

(in the formula (IV-a) and (IV-b), $R^9$ represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other), $C^8$ and $C^9$ each independently represents a 1,4-phenylene group, a 1,4-cyclohexylene group, or a pyrimidine-2,5-diyl group (the 1,4-phenylene group or the 1,4-cyclohexylene group among these groups are unsubstituted, or can contain one, or two or more fluorine atom(s), chlorine atom(s), methyl group(s), cyano group(s), trifluoromethyl group(s), or trifluoromethoxy group(s) as substituent(s)), $Z^9$ represents a single bond, —$CH_2CH_2$—, —C≡C—, —$CF_2O$—, —COO—, or —OCO—, $Y^4$ and $Y^5$ each independently represents a single bond, an oxygen atom, an alkylene group of 1 to 14 carbon atoms, —$OCH_2$—, —COO—, —OCO—, —$OCH_2CH_2$—, or —$OCOCH_2$—, $n^5$ represents 0, 1, or 2, provided that plural $C^8$ and $Z^9$ may be the same or different when $n^5$ represents 2, and $X^4$ and $X^5$ each independently represents a group represented by any one of general formulas (IV-c) to (IV-h):

[Chemical Formula 55]

(IV-c)

(IV-d)

(IV-e)

(IV-f)

(IV-g)

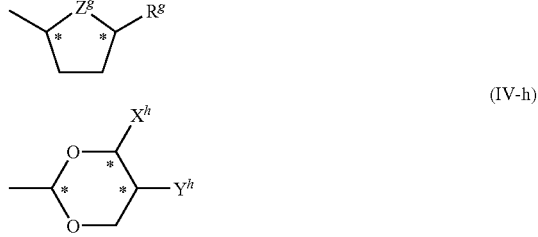

(IV-h)

(provided that the symbol * represents that a carbon atom is an asymmetric carbon in formulas (IV-c) to (IV-h), $R^c$, $R^d$, $R^e$, $R^f$, and $R^g$ each independently represents an alkyl group of 2 to 20 carbon atoms (one, or two or more methylene group(s) existing in the alkyl group each independently may be substituted with an oxygen atom, —CO—, —COO—, or —OCO— in a manner that any oxygen atoms are not directly bonded to each other), $X^c$, $X^d$, and $Y^d$ each independently represents a fluorine atom, a chlorine atom, a methyl group, or a cyano group, $X^e$ and $Y^e$ each independently represents a hydrogen atom, a fluorine atom, a chlorine atom, a methyl group, or a cyano group, $X^h$ and $Y^h$ each independently represents a fluorine atom, a chlorine atom, a methyl group, or a cyano group, $Z^d$ represents a single bond or a methylene group, $Z^e$ represents an oxygen atom or a group represented by —OC($R^{e1}$)($R^{e2}$)O— (in which $R^{e1}$ and $R^{e2}$ each independently represents a hydrogen atom or an alkyl group of 1 to 18 carbon atoms), $Z^f$ represents a carbonyl group or a group represented by —CH($R^{f1}$)— (in which $R^{f1}$ represents a hydrogen atom or an alkyl group of 1 to 18 carbon atoms), and $Z^g$ represents OCO—, —COO—, —CH$_2$O—, or —OCH$_2$—)).

When $Y^4$ and $Y^5$ are alkylene groups, a methylene group is particularly preferred among alkylene groups so as to obtain a short spiral pitch for canceling large spontaneous polarization or twist. $X^4$ and $X^5$ are preferably (IV-c) or (IV-e) so as to exhibit large spontaneous polarization to obtain satisfactory alignment, and thus a stable liquid crystal phase is exhibited. Among these, particularly preferred (IV-c) or (IV-e) is that with $X^c$ of a fluorine atom or a methyl group, or $Z^e$ of an oxygen atom. The chiral molecule may be a single kind, or plural kinds. It is necessary to increase a pitch of a cholesteric phase and a chiral smectic phase as long as possible so as to obtain satisfactory alignment. For achieving the purpose, it is preferred to extend the pitch by canceling it in combining plural chiral compounds with different chirality of the pitch. In that case, it is preferred to select chiral compounds having an identical sign so as not to cancel spontaneous polarization, or combining that with large spontaneous polarization and that with small spontaneous polarization even if the signs of the spontaneous polarization are reverse so as to obtain sufficient spontaneous polarization on balance. It is also important to select a chiral material which gives satisfactory alignment without canceling a pitch. For the purpose thereof, a compound in which $X^c$ is a fluorine atom is preferred.

<Composition Ratio of Polymer-Stabilized Liquid Crystal Composition>

The polymer-stabilized liquid crystal composition of the present invention is composed of a non-polymerizable low-molecular liquid crystal compound represented by a compound (II), a chiral compound (IV), and polymerizable compounds represented by a polymerizable compound (I) and a polymerizable compound (III). Regarding a composition ratio of the total of the non-polymerizable low-molecular liquid crystal compound and the chiral compound to the polymerizable compound, there is an optimum composition ratio, since when the proportion of the polymerizable compound is too high, characteristics as a polymer-stabilized liquid crystal composition is damaged. Specifically, the total of the non-polymerizable low-molecular liquid crystal compound and the chiral compound is preferably from 92% to 99.9%, more preferably from 92% to 99%, and particularly preferably from 94% to 98%.

The polymer-stabilized liquid crystal composition of the present invention preferably contains 92 to 99.9% by mass of a liquid crystal composition containing, as the low-molecular liquid crystal compound represented by the general formula (II-a) or (II-b), at least one kind of the compounds represented by the general formula (V-a), general formula (VI-a), general formula (VI-b), general formula (VII-a), general formula (VII-b), general formula (VIII-a), general formula (IX-a) and general formula (X), and 0.1 to 8% of a polymerizable composition containing compounds represented by the general formulas (I-a) and (III-a), more preferably contains 92 to 99% of the liquid crystal composition and 1 to 8% by mass of the polymerizable composition, and particularly preferably contains 94 to 98% of the liquid crystal composition and 2 to 6% by mass of the polymerizable composition.

The liquid crystal composition preferably contains 5 to 90% of a compound represented by the general formula (VIII-a) or general formula (X). The compound represented by the general formula (X) preferably contains 50 to 99% of a group of compounds represented by the general formula (X-a), general formula (X-b), and general formula (X-c). It is preferred to use a group of compounds represented by the general formula (V-a), general formula (VI-a), general formula (VI-b), general formula (VII-a), and general formula (VII-b), and that represented by the general formula (VIII-a) and general formula (IX-a) so as to obtain basic physical properties of the objective liquid crystal composition. Since it is necessary to adjust the basic physical properties such as refractive index anisotropy, dielectric anisotropy, elastic constant, phase series of a liquid crystal phase, temperature range of a liquid crystal phase, spontaneous polarization and the like for practical use, compounds are used after selecting according to the purposes.

The polymer-stabilized liquid crystal composition of the present invention preferably exhibits a smectic phase at room temperature. The smectic phase is more preferably a chiral smectic C phase, and the chiral smectic C phase is particularly preferably a ferroelectric liquid crystal phase.

In the polymer-stabilized liquid crystal composition of the present invention, it is preferred that the content of the polymerizable compound (III) is from 0.05% to 7%, and a composition ratio (III):(I) of the polymerizable compound (III) to the polymerizable compound (I) is from 1:1 to 49:1.

In the present invention, in addition to the polymerizable liquid crystal compound (III), a polyfunctional liquid crystalline monomer can be added. Examples of a polymerizable functional group of the polyfunctional liquid crystalline monomer include an acryloyloxy group, a methacryloyloxy group, an acrylamide group, a methacrylamide group, an epoxy group, a vinyl group, a vinyloxy group, an ethynyl group, a mercapto group, a maleimide group, ClCH=CHCONH—, CH$_2$=CCl—, CHCl=CH—, and RCH=CHCOO— (in which R is chlorine, fluorine, or a hydrocarbon group of 1 to 18 carbon atoms). Among these polymerizable functional groups, an acryloyloxy group, a methacryloyloxy group, an epoxy group, a mercapto group, and a vinyloxy group are preferred, a methacryloyloxy group or an acryloyloxy group are particularly preferred, and an acryloyloxy group is most preferred.

A molecular structure of the polyfunctional liquid crystalline monomer preferably possesses a liquid crystal skeleton having two or more ring structures, a polymerizable functional group, and at least two flexibility groups capable of connecting a liquid crystal skeleton with a polymerizable functional group. The structure with three flexibility groups is more preferred. Examples of the flexibility group include an alkylene spacer group represented by —(CH$_2$)$_n$— (in which n represents an integer) and a siloxane spacer group represented by —(Si(CH$_3$)$_2$—O)$_n$—(in which n represents an integer). Among these groups, an alkylene spacer group is preferred. A bond such as O—, —COO— or —CO— may exist at a bonded portion of the flexibility group and the liquid crystal skeleton or the polymerizable functional group.

The liquid crystal skeleton can be used without any limitation as long as it is usually recognized as a liquid crystal skeleton (mesogen) in this technical field, and preferably has at least two or more ring structures. Examples of the ring used as the ring structure include benzene, pyridine, pyrazine, pyridazine, pyrimidine, 1,2,4-triazine, 1,3,5-triazine, tetrazine, dihydrooxazine, cyclohexane, cyclohexene, cyclohexadiene, cyclohexanone, piperidine, piperazine, tetrahydropyran, dioxane, tetrahydrothiopyran, dithian, oxathian, dioxaborinane, naphthalene, dioxanaphthalene, tetrahydronaphthalene, quinoline, cumarin, quinoxaline, decahydronaphthalene, indan, benzooxazole, benzothiazole, phenanthrene, dihydrophenanthrene, perhydrophenanthrene, dioxaperhydrophenanthrene, fluorene, fluorenone, cycloheptane, cycloheptatrienone, cholestene, bicyclo[2.2.2]octane or bicyclo[2.2.2]octene, 1,5-dioxaspiro(5.5)undecane, 1,5-dithiaspiro(5.5)undecane, triphenylene, truxene, porphyrin, and phthalocyanine. Among these, benzene, cyclohexane, phenanthrene, naphthalene, tetrahydronaphthalene, and decahydronaphthalene are preferred. These rings may be substituted with one or more groups of an alkyl group of 1 to 7 carbon atoms, an alkoxy group, an alkanoyl group, a cyano group, or a halogen atom. The alkyl group is preferably a methyl group, an ethyl group, an n-propyl group, or an n-butyl group, and particularly preferably a methyl group or an ethyl group. The alkoxy group is preferably a methoxy group, an ethoxy group, a propoxy group, or a butoxy group, the alkanoyl group is preferably an acetyl group, a propionyl group or a butyroyl group, and the halogen atom is preferably a fluorine atom, a bromine atom, or a chlorine atom, particularly preferably a fluorine atom or a chlorine atom. In addition to the polyfunctional liquid crystalline monomer, a monofunctional liquid crystalline monomer may be added.

These liquid crystal compositions may be subjected to a purification treatment with silica, alumina or the like for the purpose of removing impurities, or further increasing a specific resistance value. The specific resistance value is preferably $10^{12}$ Ω·cm or more, and more preferably $10^{13}$ Ω·cm or more. Furthermore, a dopant such as a chiral compound and a dye can be added in the liquid crystal composition according to the purposes.

If necessary, antioxidants, ultraviolet absorbers, non-reactive oligomers, inorganic fillers, organic fillers, polymerization inhibitors, defoamers, leveling agents, plasticizers, and silane coupling agents may be appropriately added.

The polymer-stabilized liquid crystal composition of the present invention is composed of a non-polymerizable low-molecular liquid crystal compound represented by a compound (II), a chiral compound (IV), and polymerizable compounds represented by a polymerizable compound (I) and a polymerizable compound (III). When the polymer-stabilized liquid crystal composition is polymerized, it preferably contains a polymerization initiator. When the polymerization initiator is contained, it is preferred that the polymer-stabilized liquid crystal composition contains 98 to 99.9% of materials other than the polymerization initiator, and also contains 0.1 to 2% of the polymerization initiator.

<Polymerization Method of Polymer-Stabilized Liquid Crystal Composition>

As the method for polymerizing a composition for a polymer-stabilized liquid crystal display device of the present invention, a radical polymerization method, an anionic polymerization method, a cationic polymerization method or the like can be applied, but polymerization is preferably conducted by a radical polymerization method.

As the radical polymerization initiator, a thermopolymerization initiator and a photopolymerization initiator can be used, but the photopolymerization initiator is preferred. Specifically, preferred compounds are as follows:

acetophenone-based photopolymerization initiators such as diethoxyacetophenone, 2-hydroxy-2-methyl-1-phenyl-propan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, and 2-benzyl-2-dimethylamino-1-(4-morpholinophenyl)-butanone;

benzoin-based photopolymerization initiators such as benzoin, benzoin isopropyl ether, and benzoin isobutyl ether;

acylphosphine oxide-based photopolymerization initiators such as 2,4,6-trimethylbenzoyldiphenylphosphine oxide;

benzyl- and methylphenylglyoxy ester-based photopolymerization initiators;

benzophenone-based photopolymerization initiators such as benzophenone, methyl o-benzoylbenzoate, 4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone, 3,3'-dimethyl-4-methoxybenzophenone;

thioxanthone-based photopolymerization initiators such as 2-isopropylthioxanthone, 2,4-dimethylthioxanthone, 2,4-diethylthioxanthone, and 2,4-dichlorothioxanthone;

aminobenzophenone-based photopolymerization initiators such as Michler ketone, and 4,4'-diethylaminobenzophenone; and 10-butyl-2-chloroacridone, 2-ethylanthraquinone, 9,10-phenanthrenequinone, and camphorquinone. Among these photopolymerization initiators, benzyl dimethyl ketal is most preferred.

<Liquid Crystal Display Device>

The liquid crystal display device of the present invention is either a polymer-stabilized liquid crystal display device in which a low-molecular liquid crystal is immobilized by dispersing polymers in a liquid crystal in the form of nanoparticles, or a polymer-stabilized liquid crystal display device in which a three-dimensional network of polymer chains is formed in a liquid crystal, wherein a low-molecular liquid crystal-dispersed structure in the polymers is obtained by subjecting the polymer-stabilized liquid crystal composition to ultraviolet exposure so as to polymer-stabilize alignment of the low-molecular liquid crystal.

When the polymer-stabilized liquid crystal composition is subjected to ultraviolet exposure, it is preferred to perform ultraviolet exposure while applying an alternating current to the polymer-stabilized liquid crystal composition.

It is also preferred to perform ultraviolet exposure at a temperature at which a liquid crystal phase of a low-molecular liquid crystal exhibits a chiral smectic C phase while applying an alternating current. The alternating current to be applied is preferably an alternating current having a frequency of 500 Hz to 10 kHz, and more preferably a square wave having a frequency of 1 kHz to 10 kHz.

More preferably, ultraviolet exposure is conducted at a temperature at which a liquid crystal phase of a low-molecular liquid crystal exhibits a chiral smectic C phase while applying a square wave of a frequency of 1 kHz to 10 kHz at a voltage of ±15 V or less.

More preferably, ultraviolet exposure is conducted at a temperature of (T−40)° C. or higher and (T+5)° C. or lower, and 35° C. or higher, where T (° C.) denotes a phase transition temperature between a smectic A phase and a chiral smectic C phase of the polymer-stabilized liquid crystal composition, while applying an alternating current to the polymer-stabilized liquid crystal composition.

In the ultraviolet exposure, it is desired to irradiate the composition with ultraviolet rays of 1,000 mJ/cm$^2$ or more.

The liquid crystal display device of the present invention can be applied to a liquid crystal display device which is operated by an active device such as a thin film transistor device, a metal-insulator-metal device and a thin film diode device. Particularly, when a storage capacity is connected in parallel between the active device and a liquid crystal pixel electrode, Cs/Cflc is preferably 0.1 or more and 3 or less, where Cflc denotes an electrostatic capacity of a liquid crystal pixel electrode and Cs denotes a storage capacity.

The liquid crystal display device of the present invention has a feature such as a high response speed and is therefore suited for a liquid crystal display device by a field sequential system capable of realizing high luminance and high resolution without using a color filter, as well as enabled to apply for a stereoscopic display or other purposes. Furthermore, the liquid crystal display device of the present invention can be suitably used for a portable equipment, an on-vehicle equipment or the like.

EXAMPLES

The present invention will be specifically explained by Examples, but the present invention is not limited only to these Examples. Unless otherwise specified, "%" is "% by mass".
(Production of Polymer-Stabilized Liquid Crystal Display Device and Evaluation Method)

The polymer-stabilized liquid crystal display device in Examples was produced by the following method.

A polymer-stabilized liquid crystal composition was injected by a vacuum injection method by heating it at a nematic phase transition temperature or higher. As for a cell, an alignment cell of a parallel rubbing with ITO, which is coated with a polyimide alignment film having a cell gap of 2 μm, was used so as to obtain uniaxial alignment (homogeneous alignment) of a liquid crystal.

A light control layer-forming material comprising a liquid crystal composition, a radical polymerizable composition, a photopolymerization initiator and a trace amount of polymerization inhibitor was injected into a glass cell by a vacuum injection method. The degree of vacuum was set at 2 pascals. After injection, the glass cell was taken out and an injection inlet was sealed with a sealing agent 3026E (manufactured by ThreeBond Co., Ltd.). After confirming uniaxial alignment using a polarizing microscope of a cross-Nichols, a square wave of 5 V was applied on and off at a frequency 2 KHz and ultraviolet rays were introduced to a liquid crystal cell installed on a microscope stage using an optical fiber of quartz glass through an ultraviolet ray cut filter L-37 (manufactured by HOYA CANDEO OPTRONICS CO., LTD.), thus exposing the liquid crystal cell to ultraviolet rays. The polymer-stabilized liquid crystal composition was irradiated with a metal halide lamp for 300 seconds, whose irradiation intensity was adjusted to 5 mW/cm$^2$ on a surface of a cell sample so as to polymerize the polymerizable compound in the composition, thus obtaining a polymer-stabilized liquid crystal display device.

After turning off the voltage applied, it was examined whether or not bent alignment obtained by application of the voltage is maintained under zero electric field as a result of polymer stabilization by observing an alignment state after ultraviolet exposure using a polarizing microscope. Furthermore, 8 V was applied to a cell which was polymer-stabilized by disposing it on a microscope stage so that a rubbing direction of the liquid crystal cell was adjusted at an angle of 45 degrees to a polarized light direction on a light incidence side, and then a transmittance was compared. The transmittance was defined as 0% when two polarizing plates were intersected at right angles, whereas, 100% when placed in parallel.
(Preparation of Polymer-Stabilized Liquid Crystal Composition)

A polymer-stabilized liquid crystal composition was prepared by mixing a liquid crystal composition FLC-1 containing a chiral liquid crystal compound with a photopolymerizable acrylate composition containing at least one kind of compound selected from groups of compounds (I) and (III), respectively.

Structures and compositions of the respective components of a low-molecular liquid crystal composition FLC-1 are shown below.

[Chemical Formula 56]

(FLC-1)

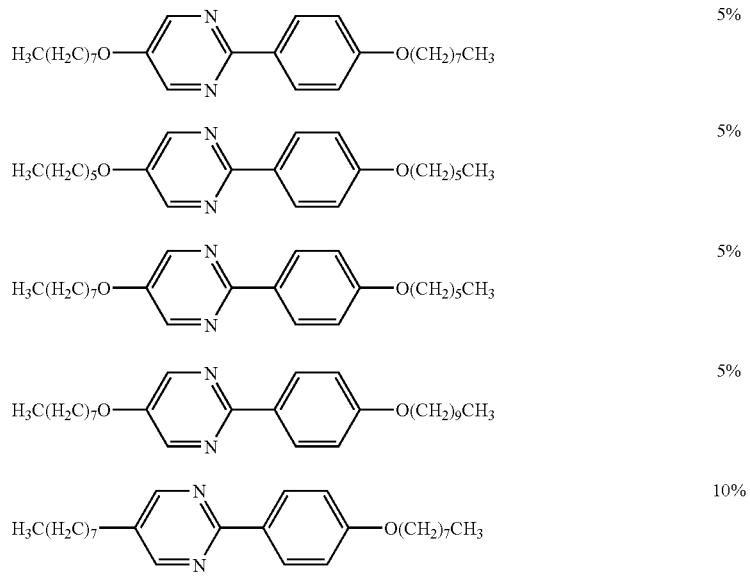

[Chemical Formula 56]
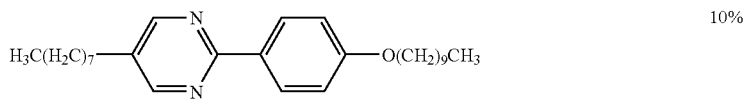 10%
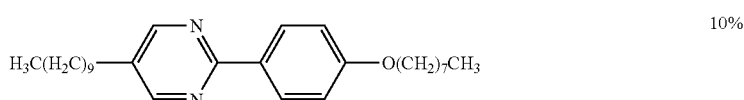 10%
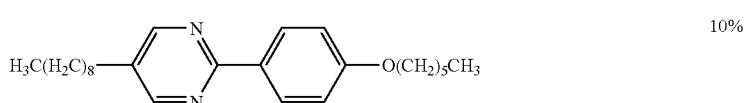 10%
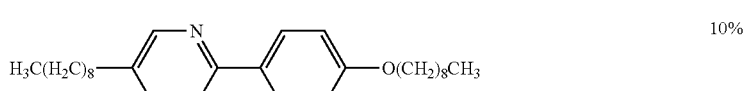 10%
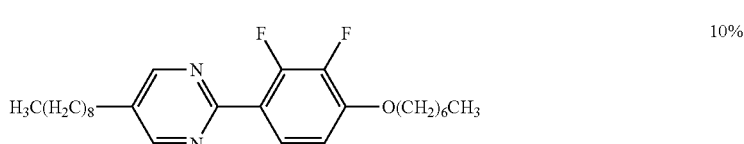 10%
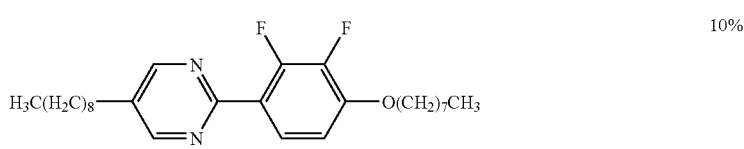 10%
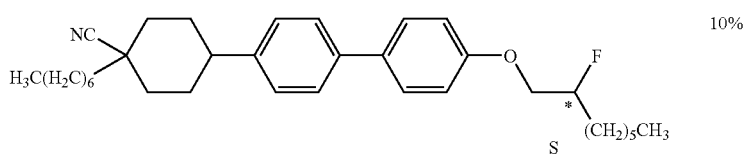 10%
Structures and compositions of an acrylate compound (I-1), and mixtures of the acrylate compounds (III-AA) and (III-BB) are shown below.
[Chemical Formula 57]
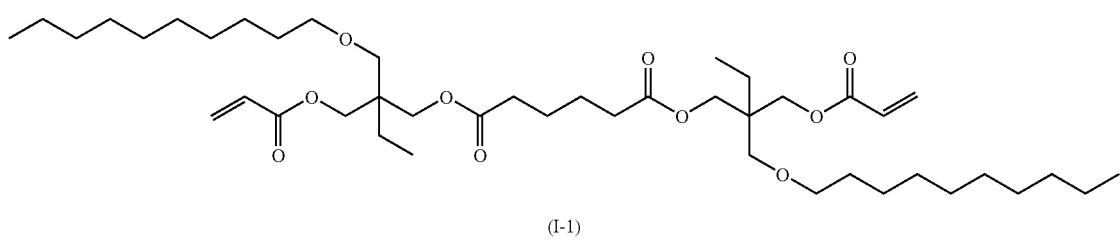 [SMILES: C=CC(=O)OCC(CC)(COCCCCCCCCCC)COC(=O)CCCCC(=O)OCC(CC)(COCCCCCCCCCC)COC(=O)C=C ; "(I-1)"]
(I-1)

[Chemical Formula 58]

(III-AA)

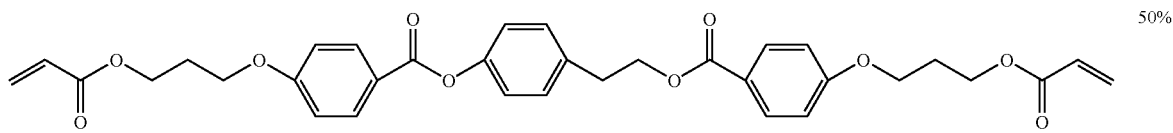
50%

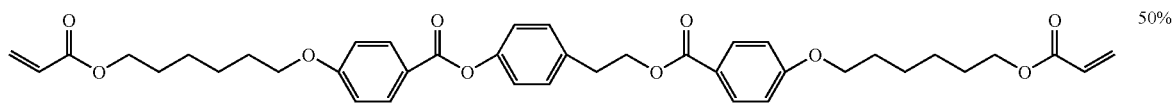
50%

[Chemical Formula 59]

(III-BB)

50%

50%

Comparative Example 1

A polymer-stabilized liquid crystal composition was prepared by mixing 94% of a liquid crystal composition FLC-1 and 6% of a compound (III-AA), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at a temperature within a range from −5 to 60° C. The results are shown in Table 1.

TABLE 1

| (Comparative Example 1) | | |
|---|---|---|
| Temperature (° C.) | Vr50 (V) | Vr90 (V) |
| −5 | 5.66 | 8.65 |
| 0 | 5.51 | 8.36 |
| 10 | 4.52 | 7.29 |
| 25 | 2.13 | 4.46 |
| 40 | 1.90 | 4.62 |
| 60 | 0.25 | 0.45 |
| ΔV | 3.76 | 4.03 |

ΔV is Vr (−5° C.) − Vr (40° C.)

Example 1

A polymer-stabilized liquid crystal composition was prepared by mixing 94% of a liquid crystal composition FLC-1, 5.4% of a compound (III-AA) and 0.6% of a compound (I-1), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at a temperature within a range from −5 to 50° C. The results are shown in Table 2.

TABLE 2

| (Example 1) | | |
|---|---|---|
| Temperature (° C.) | Vr50 (V) | Vr90 (V) |
| −5 | 3.06 | 6.60 |
| 0 | 2.99 | 6.67 |
| 10 | 2.67 | 6.67 |
| 25 | 2.75 | 6.77 |
| 50 | 2.48 | 6.75 |
| ΔV | 0.58 | −0.15 |

ΔV is Vr (−5° C.) − Vr (50° C.)

Figure 2:
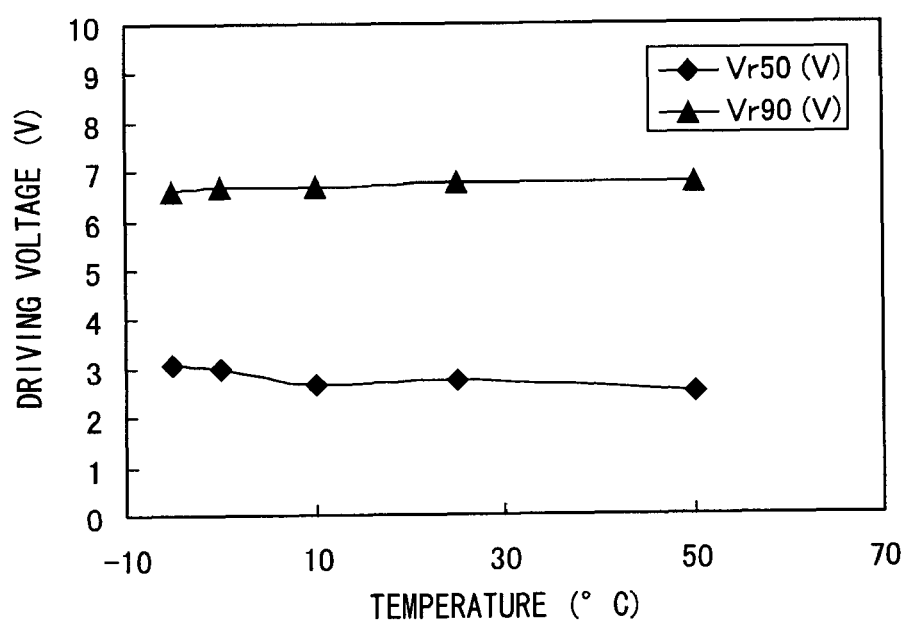
FIG. 2 is a graph illustrating the results shown in Table 2.

As is apparent from a comparison between Table 1 and Table 2, the polymer-stabilized liquid crystal composition, which does not contain a compound of the formula (I-1) as a compound represented by the general formula (I-a), of Comparative Example 1 is excellent in Vr at a high temperature, but Vr drastically increases at a low temperature which is an issue in outdoor use. Furthermore, as is apparent from a comparison between FIG. 1 and FIG. 2, the polymer-stabilized liquid crystal composition of Example 1 has stable Vr in a wide temperature range.

Example 2

A polymer-stabilized liquid crystal composition was prepared by mixing 97% of a liquid crystal composition FLC-1, 0.49% of a compound (III-AA), 2.205% of a compound (I-1) and 0.305% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at a temperature within a range from −5 to 50° C. The results are shown in Table 3.

TABLE 3

(Example 2)

| Temperature (° C.) | Vr50 (V) | Vr90 (V) |
|---|---|---|
| −5 | 2.11 | 5.54 |
| 0 | 2.36 | 6.16 |
| 10 | 1.83 | 4.25 |
| 25 | 1.65 | 3.35 |
| 40 | 1.53 | 3.13 |
| 50 | 1.62 | 2.70 |
| ΔV | 0.49 | 2.84 |

ΔV is Vr (−5° C.) − Vr (50° C.)

Figure 3:
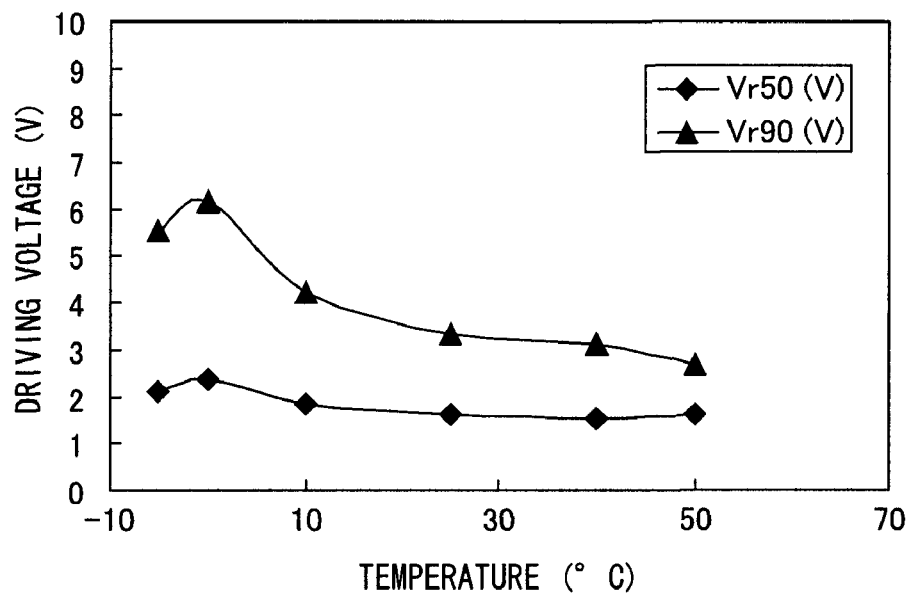
FIG. 3 is a graph illustrating the results shown in Table 3.

As is apparent from a comparison between Table 1 and Table 3, the polymer-stabilized liquid crystal composition containing a compound of the formula (I-1) as a compound represented by the general formula (I-a) of Example 2 has low Vr at a low temperature. As is apparent from a comparison between FIG. 1 and FIG. 3, the polymer-stabilized liquid crystal composition of Example 2 has stable Vr in a wide temperature range.

Example 3

A polymer-stabilized liquid crystal composition was prepared by mixing 94% of a liquid crystal composition FLC-1, 4.41% of a compound (III-AA), 1.47% of a compound (I-1) and 0.12% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at room temperature. As a result, Vr50 was 1.5 V and Vr90 was 5.3 V.

Example 4

A polymer-stabilized liquid crystal composition was prepared by mixing 94% of a liquid crystal composition FLC-1, 5.29% of a compound (III-AA), 0.59% of a compound (I-1) and 0.12% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at room temperature. As a result, Vr50 was 3.4 V and Vr90 was 7.7 V.

Comparative Example 2

A polymer-stabilized liquid crystal composition was prepared by mixing 94% of a liquid crystal composition FLC-1, 5.88% of a compound (III-AA) and 0.12% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at room temperature. As a result, Vr50 was 5.1 V and Vr90 was 8.7 V.

Comparative Example 3

A polymer-stabilized liquid crystal composition was prepared by mixing 94% of a liquid crystal composition FLC-1, 5.88% of a compound (III-BB) and 0.12% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at room temperature. As a result, Vr50 was 5.2 V and Vr90 was 15.9 V.

Figure 4:
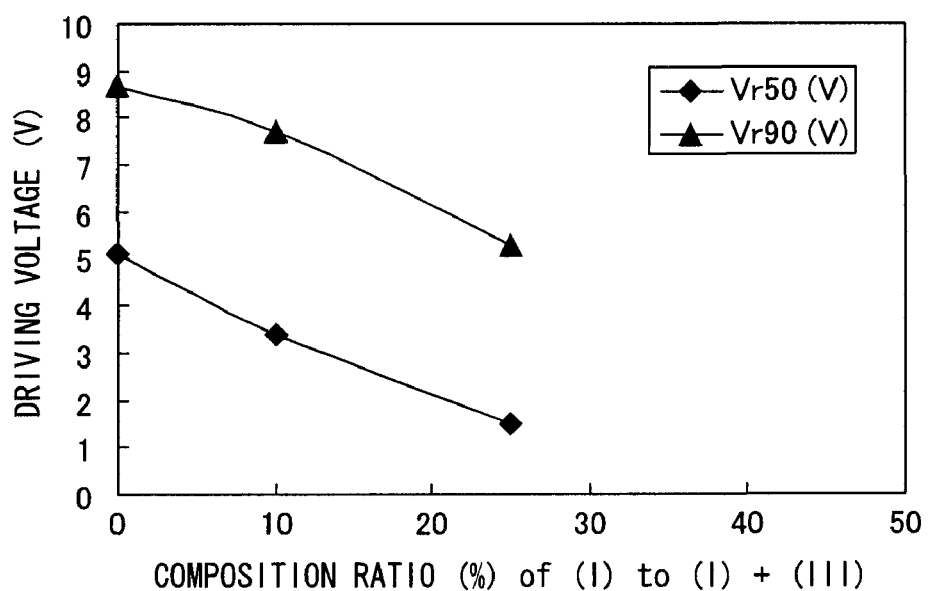
FIG. 4 is a graph illustrating the results shown in Table 4.

The results of Example 3, Example 4, Comparative Example 2 and Comparative Example 3 are shown in Table 4 and FIG. 4.

TABLE 4

| | Liquid crystal (concentration) | Compound (III) (concentration) | compound (I) (concentration) | PI (concentration) | (III):(I) composition ratio | Vr50 (V) | Vr90 (V) |
|---|---|---|---|---|---|---|---|
| Example 3 | FLC-1 (94%) | (III-AA) (4.41%) | (I-1) (1.47%) | Irg651 (0.12%) | 75:25 | 1.5 | 5.3 |
| Example 4 | FLC-1 (94%) | (III-AA) (5.29%) | (I-1) (0.59%) | Irg651 (0.12%) | 90:10 | 3.4 | 7.7 |
| Comparative Example 2 | FLC-1 (94%) | (III-AA) (5.88%) | None (0%) | Irg651 (0.12%) | 100:0 | 5.1 | 8.7 |
| Comparative Example 3 | FLC-1 (94%) | (III-BB) (5.88%) | None (0%) | Irg651 (0.12%) | 100:0 | 5.2 | 15.9 |

As shown in Table 4 and FIG. 4, Vr was large in Comparative Example 2 and 3 in which polymerization was conducted without mixing the compound (I-1), whereas, Vr could be decreased in Examples 3 and 4 in which polymerization was conducted after mixing the compound (I-1).

Figure 5:
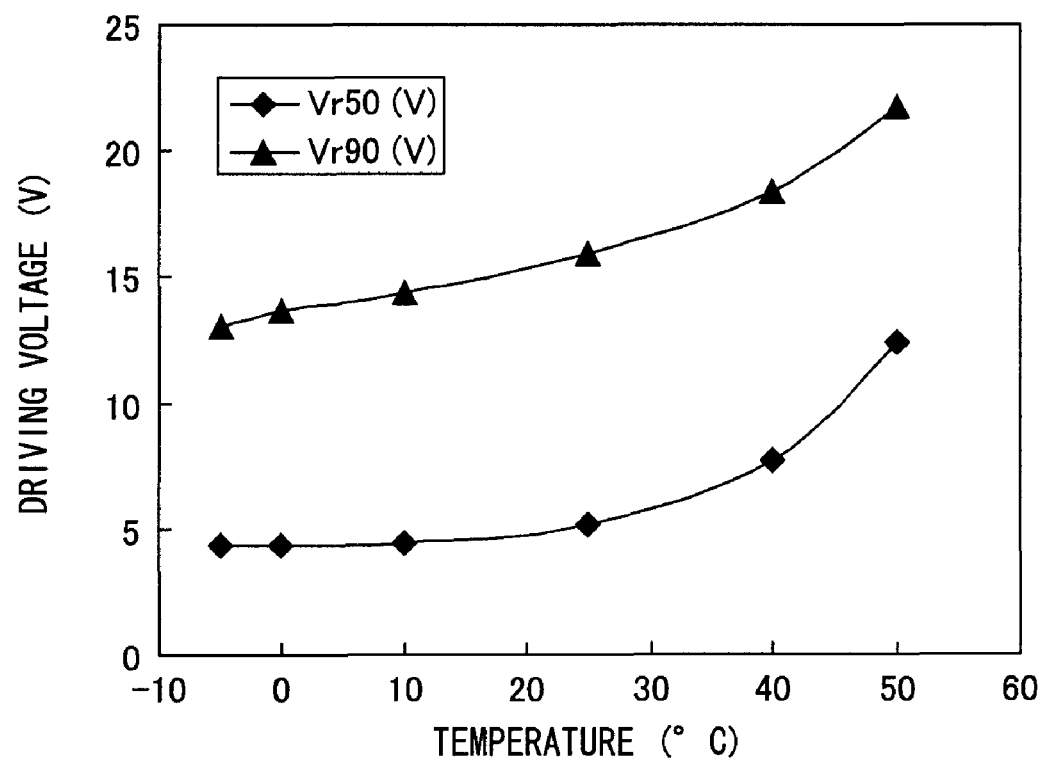
FIG. 5 is a graph illustrating the results shown in Table 5.

Temperature changes of Vr90 and Vr50 of Comparative Example 3 are shown in Table 5 and FIG. 5.

TABLE 5

| Temperature (° C.) | Vr50 (V) | Vr90 (V) |
|---|---|---|
| −5 | 4.33 | 13.02 |
| 0 | 4.31 | 13.65 |
| 10 | 4.44 | 14.40 |
| 25 | 5.20 | 15.91 |
| 40 | 7.69 | 18.41 |
| 50 | 12.41 | 21.71 |
| ΔV | 8.07 | 8.69 |

ΔV is Vr (−5° C.) − Vr (50° C.)

Example 5

A polymer-stabilized liquid crystal composition was prepared by mixing 98% of a liquid crystal composition FLC-1, 0.98% of a compound (III-CC), 0.98% of a compound (I-3) and 0.04% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50%, an applied voltage Vr90 at a transmittance of 90% and a tilt angle were measured at room temperature. The results are shown in Table 6.

[Chemical Formula 60]

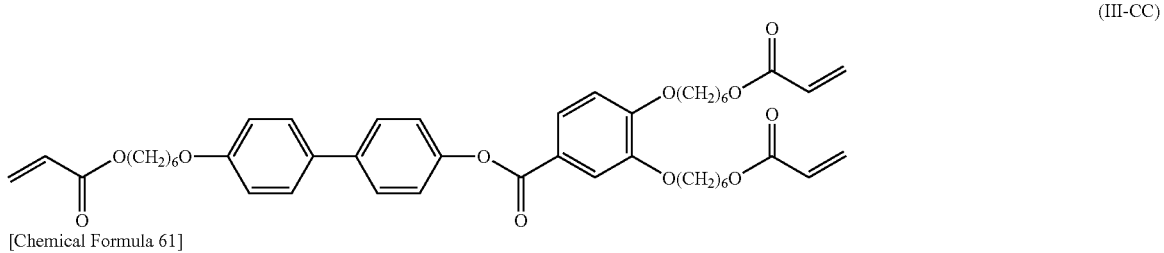

(III-CC)

[Chemical Formula 61]

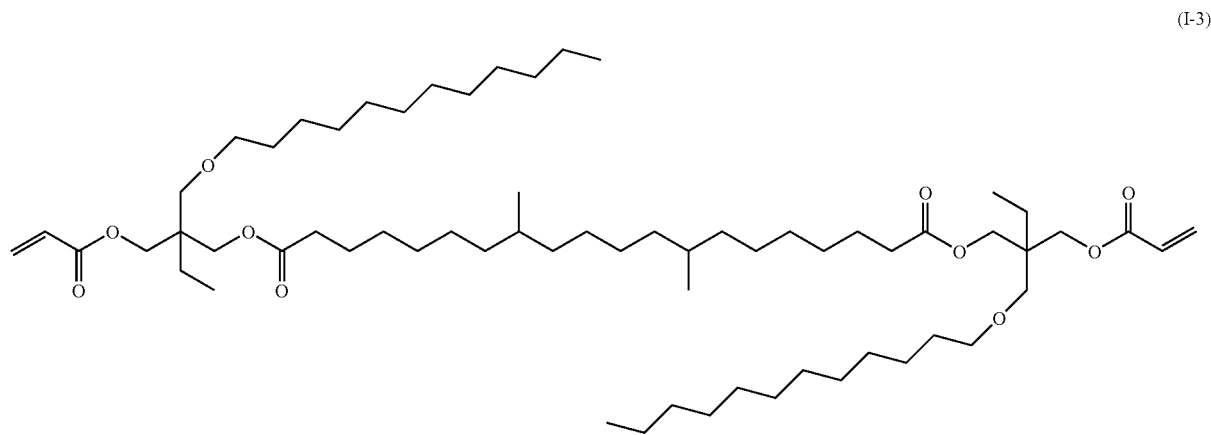

(I-3)

Comparative Example 4

A polymer-stabilized liquid crystal composition was prepared by mixing 98% of a liquid crystal composition FLC-1, 1.96% of a compound (III-CC) and 0.04% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50%, an applied voltage Vr90 at a transmittance of 90% and a tilt angle were measured at room temperature. The results are shown in Table 6.

Example 6

A polymer-stabilized liquid crystal composition was prepared by mixing 97% of a liquid crystal composition FLC-1, 2.42% of a compound (III-AA), 0.52% of a compound (I-1) and 0.06% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr90 at a transmittance of 90% and an applied voltage Vr95 at a transmittance of 95% were measured at room temperature.

Example 7

A polymer-stabilized liquid crystal composition was prepared by mixing 97% of a liquid crystal composition FLC-1, 2.42% of a compound (III-AA), 0.52% of a compound (I-2) and 0.06% of Irgacure 651 (Irg651), and a liquid crystal display device was produced by polymerize an acrylate compound in the polymer-stabilized liquid crystal composition by

TABLE 6

| | Liquid crystal (concentration) | Compound (III) (concentration) | Compound (I) (concentration) | Irgacure 651 | Vr50 (V) | Vr90 (V) | Tilt angle (°) |
|---|---|---|---|---|---|---|---|
| Example 5 | FLC-1 (98%) | (III-CC) (0.98%) | (I-3) (0.98%) | 0.04% | 2.3 | 6.7 | 22.4 |
| Comparative Example 4 | FLC-1 (98%) | (III-CC) (2%) | None (0%) | 0.04% | 3.0 | 7.6 | 15.4 |

In Comparative Example in which the compound (I-3) is not used, Vr remarkably increases when compared with Example 5, and also the tilt angle remarkably decreases.

the above method for producing a polymer-stabilized liquid crystal display device. An applied voltage Vr90 at a transmittance of 90% and an applied voltage Vr95 at a transmittance of 95% were measured at room temperature.

[Chemical Formula 62]

(I-2)

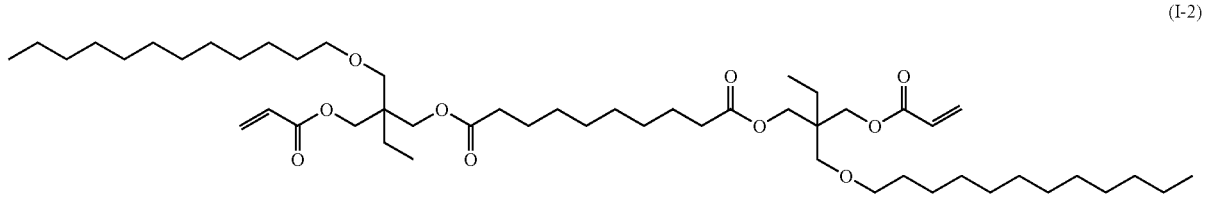

Example 8

A polymer-stabilized liquid crystal composition was prepared by mixing 97% of a liquid crystal composition FLC-1, 2.42% of a compound (III-AA), 0.52% of a compound (I-3) and 0.06% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr90 at a transmittance of 90% and an applied voltage Vr95 at a transmittance of 95% were measured at room temperature.

Comparative Example 5

A polymer-stabilized liquid crystal composition was prepared by mixing 97% of a liquid crystal composition FLC-1, 2.94% of a compound (III-AA) and 0.06% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr90 at a transmittance of 90% and an applied voltage Vr95 at a transmittance of 95% were measured at room temperature.

The results of Example 6, Example 7, Example 8 and Comparative Example 5 are shown in Table 7.

In Comparative Example 5 in which the compound corresponding to the general formula (I) is not used, Vr increased in comparison with Examples 6 to 8.

Example 9

A polymer-stabilized liquid crystal composition was prepared by mixing 97% of a liquid crystal composition FLC-1, 2.42% of a compound (III-AA), 0.52% of a compound (I-9) and 0.06% of Irgacure 651 (Irg651), and a liquid crystal display device was produced by polymerize an acrylate compound in the polymer-stabilized liquid crystal composition by the above method for producing a polymer-stabilized liquid crystal display device. An applied voltage Vr50 at a transmittance of 50% and an applied voltage Vr90 at a transmittance of 90% were measured at room temperature. As a result, Vr50 was 2.4 V and Vr90 was 6.1 V.

TABLE 7

| | Liquid crystal (concentration) | Compound (III) (concentration) | Compound (I) (concentration) | PI (concentration) | Vr90 (V) | Vr95 (V) |
| --- | --- | --- | --- | --- | --- | --- |
| Example 6 | FLC-1 (97%) | (III-AA) (2.42%) | (I-1) (0.52%) | Irg651 (0.06%) | 4.7 | 6.1 |
| Example 7 | FLC-1 (97%) | (III-AA) (2.42%) | (I-2) (0.52%) | Irg651 (0.06%) | 5.8 | 7.3 |
| Example 8 | FLC-1 (97%) | (III-AA) (2.42%) | (I-3) (0.52%) | Irg651 (0.06%) | 5.3 | 6.9 |
| Comparative Example 5 | FLC-1 (97%) | (III-AA) (2.94%) | None (0%) | Irg651 (0.06%) | 6.4 | 7.8 |

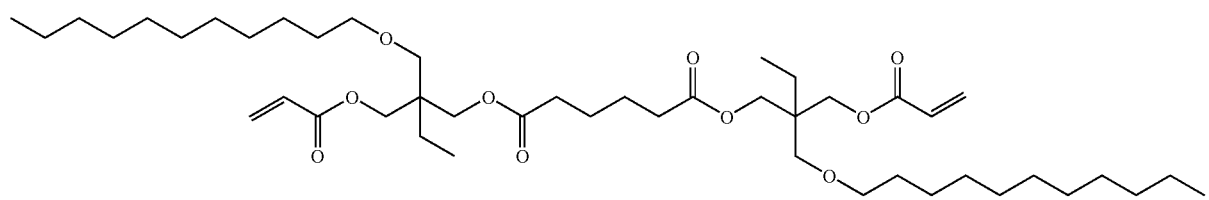

(I-9)

Example 10

Preparation of Polymer-Stabilized Ferroelectric Liquid Crystal Composition

A polymer-stabilized ferroelectric liquid crystal composition was prepared by mixing a ferroelectric liquid crystal composition and at least one kind of monomer component selected from groups of compounds (I) and (III), respectively. Structures and proportions of the respective components of the ferroelectric liquid crystal composition (FLC-2) are as follows.

[Chemical Formula 64]

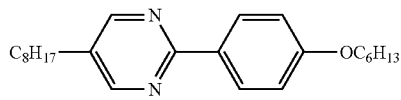 (II-A) 15 parts

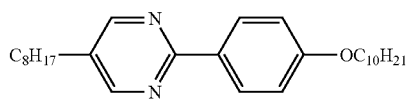 (II-B) 13 parts

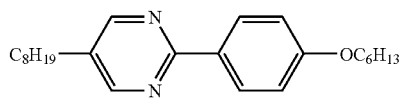 (II-C) 5 parts

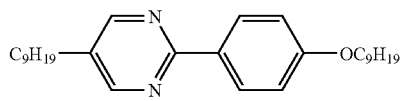 (II-D) 18 parts

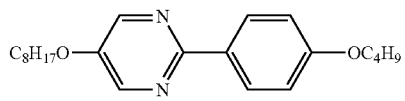 (II-E) 3 parts

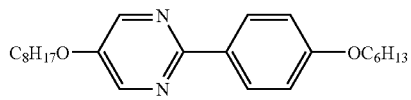 (II-F) 9 parts

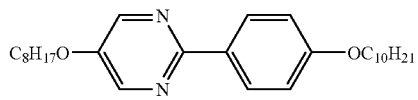 (II-G) 5 parts

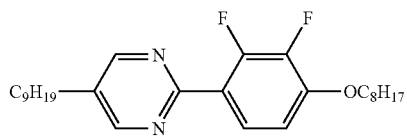 (II-H) 17 parts

[Chemical Formula 64]

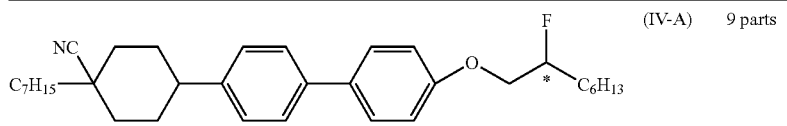

(IV-A) 9 parts

A polymer-stabilized ferroelectric liquid crystal composition (MFLC-1) was prepared by mixing a ferroelectric liquid crystal composition (FLC-2) and at least one kind of compound selected from groups of compounds (I) and (III), respectively. Structures and proportions of the respective components of the polymer-stabilized ferroelectric liquid crystal composition (MFLC-1) are as follows.

| | | |
|---|---|---|
| FLC-2 | 94 | parts |
| Compound (I-1) | 1.2 | parts |
| Compound (III-AA) | 4.8 | parts |
| Irgacure 651 | 0.12 | part |

Herein, a compound (I-AA) is a non-liquid crystalline monomer selected from the general formula (I), and (III-AA) is a liquid crystalline monomer selected from the general formula (III).

With respect to the polymer-stabilized ferroelectric liquid crystal composition (MFLC-1) thus obtained, a liquid crystal display device was produced by polymerizing an acrylate compound in the polymer-stabilized ferroelectric liquid crystal composition according to the above method for producing a polymer-stabilized liquid crystal display device. The display device thus obtained exhibited stable V type switching behavior at room temperature, and an applied voltage (Vr50) at a transmittance of 50% measured at 0° C. was as low as 5V.

Comparative Example 6

In the same manner as in Examples, except that the compound represented by the general formula (I) is not contained as a monomer composition, a ferroelectric liquid crystal composition (FLC-2), a compound (III-AA) and Irgacure 651 were mixed in a ratio shown below to prepare a comparative polymer-stabilized ferroelectric liquid crystal composition (MFLC-C1).

| | | |
|---|---|---|
| FLC-2 | 94 | parts |
| Compound (III-AA) | 6 | parts |
| Irgacure 651 | 0.12 | part |

In the same manner as in Example 10, an acrylate compound in a polymer-stabilized ferroelectric liquid crystal composition was polymerized to produce a liquid crystal display device. An applied voltage (Vr50) at a transmittance of 50% measured at 0° C. was 7 V, a higher voltage than that in Example 10.

Examples 11 to 14

In the same manner as in Example 10, polymer-stabilized ferroelectric liquid crystal compositions (MFLC-2) to (MFLC-5) were prepared, and an applied voltage (Vr50) at a transmittance of 50% measured was measured. Structures of the compounds used for the preparation of the polymer-stabilized ferroelectric liquid crystal composition are shown below.

[Chemical Formula 65]

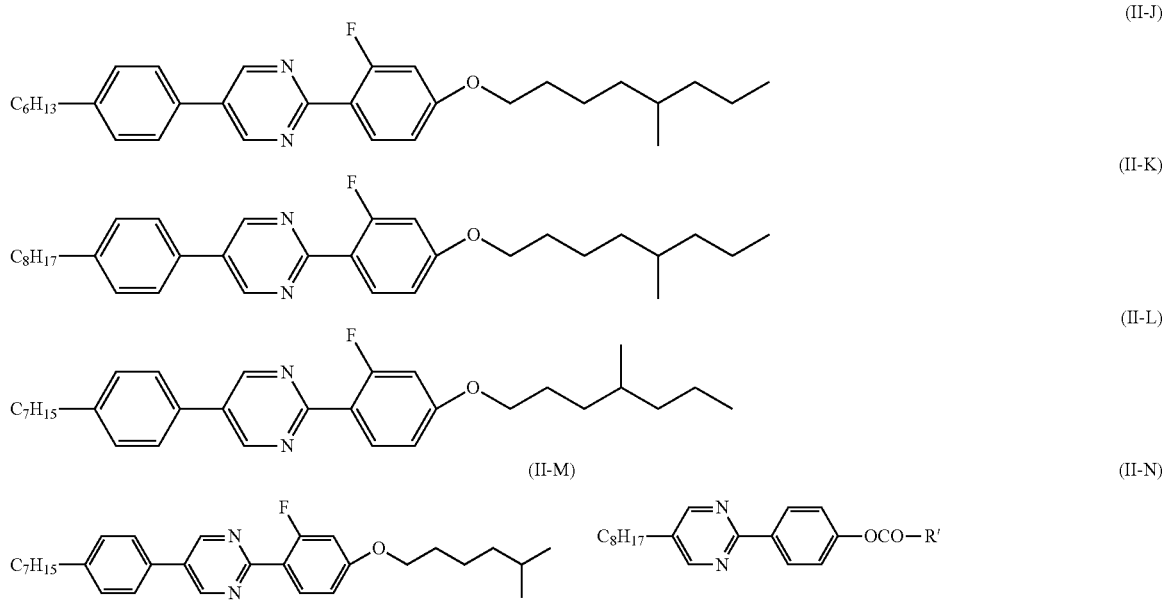

-continued

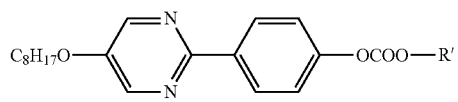 (II-P)

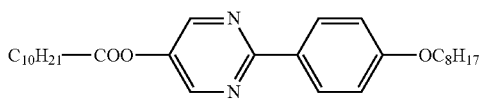 (II-Q)

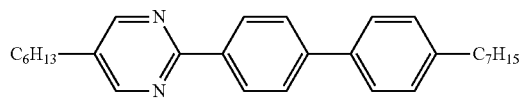 (II-R)

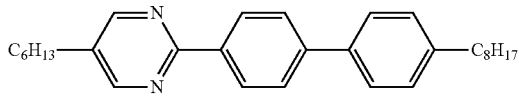 (II-S)

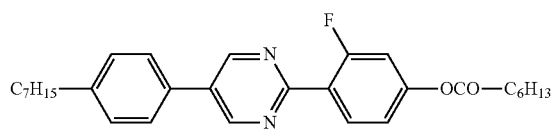 (II-T)

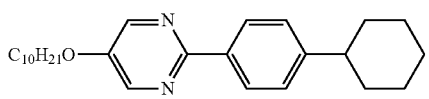 (XI-A)

(IV-B)

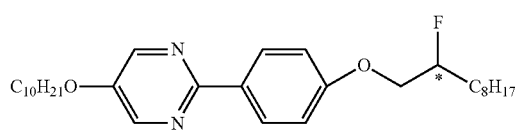 (IV-C)

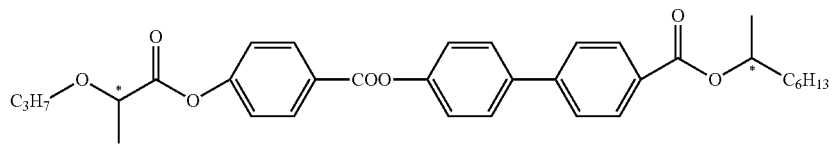

Mixing ratios of those compounds and values of an applied voltage (Vr50) at a transmittance of 50% are shown in Table 8.

TABLE 8

|  | Example 10 MFLC-1 | Example 11 MFLC-2 | Example 12 MFLC-3 | Example 13 MFLC-4 | Example 14 MFLC-5 |
|---|---|---|---|---|---|
| II-A | 15 | 15 | 16 | 11 | 16 |
| II-B | 13 | 13 | 14 | 10 | 13 |
| II-C | 5 | 5 | 5 | 4 | 5 |
| II-D | 18 | 18 | 19 | 13 | 19 |
| II-E | 3 | | | | |
| II-F | 9 | | | | |
| II-G | 5 | | | | |
| II-H | 17 | | | | |
| II-J | | 22 | | 16 | |
| II-K | | 7 | | 6 | |
| II-L | | 5 | | | |
| II-M | | | | 4 | |
| II-N | | | 13 | 6 | 5 |
| II-P | | | 9 | | |
| II-Q | | | 7 | | 5 |
| II-R | | | | | 3 |
| II-S | | | | | 5 |
| II-T | | | | | 14 |
| III-AA | 4.8 | 4.8 | 4.8 | 4.8 | 4.8 |
| I-1 | 1.2 | 1.2 | 1.2 | 1.2 | 1.2 |
| XI-A | | | 9 | 8 | |
| IV-A | 9 | 9 | 9 | | |
| IV-B | 9 | | | 9 | |
| IV-C | | | | | 9 |
| Irgacure 651 | 0.12 | 0.12 | 0.12 | 0.12 | 0.12 |
| Vr50 (V) | 5 | 5 | 4 | 6 | 5 |
| Measuring temperature (° C.) | 20 | 20 | 40 | 20 | 20 |

Comparative Examples 7 to 11

In the same manner as in Comparative Example 7, comparative polymer-stabilized ferroelectric liquid crystal compositions (MFLC-C2) to (MFLC-05), each containing no compound represented by the general formula (I), were prepared and an applied voltage (Vr50) at a transmittance of 50% was measured. The compounds contained in the comparative polymer-stabilized ferroelectric liquid crystal composition, quantitative ratios thereof (parts by weight) and Vr50 are shown in Table 9. All Comparative Examples exhibited higher Vr50 than the corresponding Examples did.

TABLE 9

|  | Comparative Example 7 MFLC-C1 | Comparative Example 8 MFLC-C2 | Comparative Example 9 MFLC-C3 | Comparative Example 10 MFLC-C4 | Comparative Example 11 MFLC-C5 |
|---|---|---|---|---|---|
| II-A | 15 | 15 | 16 | 11 | 16 |
| II-B | 13 | 13 | 14 | 10 | 13 |
| II-C | 5 | 5 | 5 | 4 | 5 |
| II-D | 18 | 18 | 19 | 13 | 19 |
| II-E | 3 | | | | |
| II-F | 9 | | | | |
| II-G | 5 | | | | |
| II-H | 17 | | | | |
| II-J | | | | 16 | |
| II-K | | | | 6 | |
| II-L | | | | | |
| II-M | | | | 4 | |
| II-N | | | 13 | 6 | 5 |
| II-P | | | 9 | | |
| II-Q | | | | 7 | 5 |
| II-R | | | | | 3 |
| II-S | | | | | 5 |
| II-T | | | | | 14 |

TABLE 9-continued

|  | Comparative Example 7 MFLC-C1 | Comparative Example 8 MFLC-C2 | Comparative Example 9 MFLC-C3 | Comparative Example 10 MFLC-C4 | Comparative Example 11 MFLC-C5 |
|---|---|---|---|---|---|
| III-AA | 6 | 6 | 6 | 6 | 6 |
| I-A |  |  |  |  |  |
| XI-A |  |  | 9 | 8 |  |
| IV-A |  | 9 | 9 |  |  |
| IV-B | 9 |  |  | 9 |  |
| IV-C |  |  |  |  | 9 |
| Irgacure 651 | 0.12 | 0.12 | 0.12 | 0.12 | 0.12 |
| Vr50 (V) | 7 | 7 | 9 | 8 | 6 |
| Measuring temperature (° C.) | 20 | 20 | 40 | 20 | 20 |

Example 15

Preparation of Polymer-Stabilized Ferroelectric Liquid Crystal Composition

A polymer-stabilized ferroelectric liquid crystal composition was prepared by mixing at least one kind of monomer component selected from groups of compounds (I) and (III), respectively, in a ferroelectric liquid crystal composition. Structures and proportions of the respective components of the ferroelectric liquid crystal composition (FLC-3) are as follows.

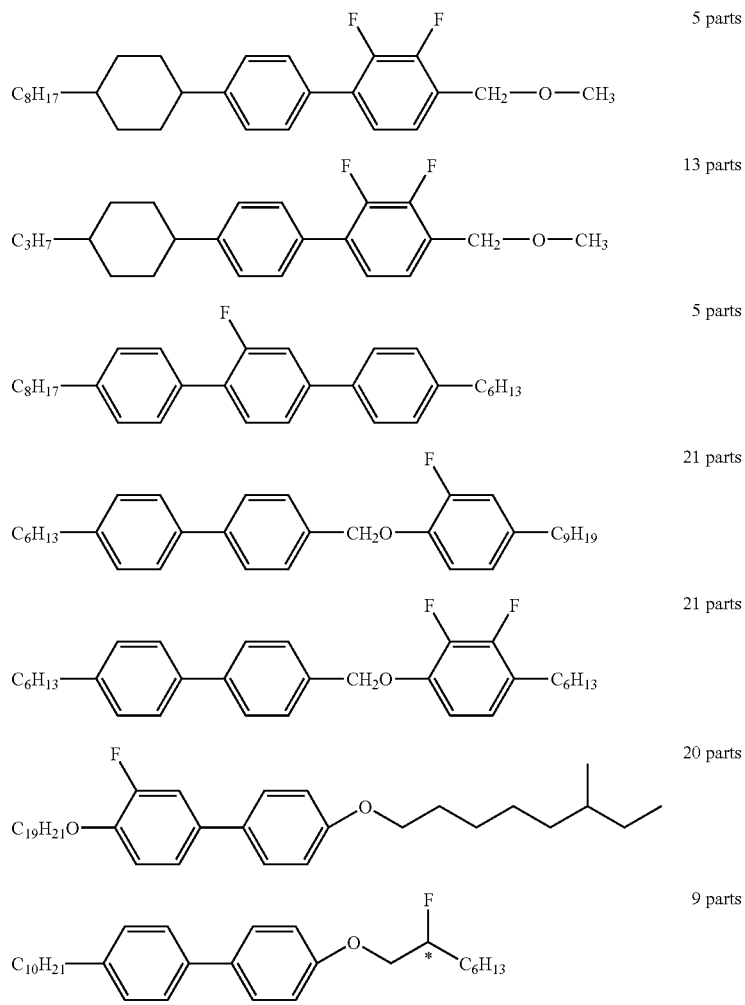

A polymer-stabilized ferroelectric liquid crystal composition (MFLC-6) was prepared by mixing a ferroelectric liquid crystal composition (FLC-3) and at least one kind of monomer component selected from groups of compounds (I) and (III), respectively. Structures or contents and proportions of the respective components of the polymer-stabilized ferroelectric liquid crystal composition (MFLC-6 are as follows.

| FLC-3 | 94 parts |
| --- | --- |
| Compound I-1 | 1.2 parts |
| Compound III-AA | 4.8 parts |
| Irgacure 651 | 0.12 part |

Herein, the compound (I-1) is a non-liquid crystalline monomer selected from the general formula (I), and the compound (III-AA) is a liquid crystalline monomer selected from the general formula (III).

With respect to the polymer-stabilized ferroelectric liquid crystal composition (MFLC-6) thus obtained, a liquid crystal display device was produced by polymerizing an acrylate compound in the polymer-stabilized ferroelectric liquid crystal composition according to the above method for producing a polymer-stabilized liquid crystal display device. The display device thus obtained was favorable with its stable V type switching behavior at room temperature, an applied voltage (Vr50) at a transmittance of 50% of as low as 3 V at 40° C., 3 V at 20° C. and 3 V at 0° C., and its less temperature dependency.

Comparative Example 12

In the same manner as in Examples, except that the compound represented by the general formula (I) is not contained as a monomer composition, a ferroelectric liquid crystal composition (FLC-3), a compound (III-AA) and Irgacure 651 were mixed in a ratio shown below to prepare a comparative polymer-stabilized ferroelectric liquid crystal composition (MFLC-C6).

| FLC-3 | 94 parts |
| --- | --- |
| Compound (III-AA) | 6 parts |
| Irgacure 651 | 0.12 part |

In the same manner as in Example 15, an acrylate compound in a polymer-stabilized ferroelectric liquid crystal composition was polymerized to produce a liquid crystal display device. It was less favorable since Vr50 was 6 V at 40° C., 5 V at 20° C. and 4 V at 0° C., higher than that in Example 10, and the temperature dependency was higher.

The invention claimed is:

1. A polymer-stabilized liquid crystal composition comprising:
   a polymerizable compound (I) represented by general formula (I-c);
   a compound (II) represented by general formula (II-a) or (II-b);
   at least one polymerizable compound (III) selected from the group consisting of compounds represented by general formulas (III-a), (III-b), and (III-c); and
   a chiral compound (IV) represented by general formula (IV-a) or (IV-b), wherein
   the polymerizable compound (I) forms a polymer that has a glass transition temperature of $-100°$ C. to $25°$ C., the general formula (I-c):

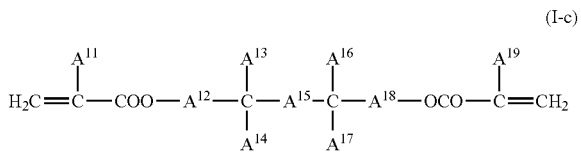

(in the formula (I-c), $A^{11}$ and $A^{19}$ each independently represents a hydrogen atom or a methyl group,
$A^{12}$ and $A^{18}$ each independently represents a single bond or an alkylene group of 1 to 15 carbon atoms (one, or two or more methylene group(s) existing in the alkylene group each independently substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group),
$A^{13}$ and $A^{16}$ each independently represents a linear alkyl group of 2 to 20 carbon atoms (one, or two or more methylene group(s) existing in the linear alkyl group each independently may be substituted with an oxygen atom, —CO—, —COO—, or —OCO in a manner that any oxygen atoms are not directly bonded to each other),
$A^{14}$ and $A^{17}$ each independently represents a hydrogen atom or an alkyl group of 1 to 10 carbon atoms (one, or two or more methylene group(s) existing in the alkyl group each independently may be substituted with an oxygen atom, —CO—, —COO—, or —OCO— in a manner that any oxygen atoms are not directly bonded to each other, and one, or two or more hydrogen atom(s) existing in the alkyl group each independently may be substituted with a halogen atom or an alkyl group of 1 to 9 carbon atoms), and
$A^{15}$ represents an alkylene group of 9 to 16 carbon atoms (in at least one or more and five or less methylene group(s) existing in the alkylene group, one hydrogen atom in the methylene group each independently is substituted with a linear or branched alkyl group of 1 to 10 carbon atoms, and one, or two or more methylene group(s) existing in the alkylene group each independently may be substituted with an oxygen atom, —CO—, —COO—, or —OCO— in a manner that any oxygen atoms are not directly bonded to each other));
the general formula (II-a) or (II-b):

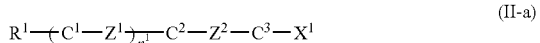

(in the formulas (II-a) and (II-b), $R^1$ and $R^2$ each independently represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other),
$C^1$ represents a 1,4-phenylene group, a 1,4-cyclohexylene group, or a 1,3-dioxane-2,5-diyl group (the 1,4-phenylene group among these groups is unsubstituted, or can contain one, or two or more fluorine atom(s), chlorine atom(s), methyl group(s), trifluoromethyl group(s) or trifluoromethoxy group(s) as substituent(s)), $C^2$ and $C^3$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, a 1,3,4-thiadiazole-2,5-diyl, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $Z^1$ and $Z^2$ each independently represents a single bond, —$CH_2CH_2$—, —$CH_2O$—, —$OCH_2$—, —$CH_2CH_2O$—, —$OCH_2CH_2$—, —$CH_2CH_2CH_2O$—, —$OCH_2CH_2CH_2$—, —CH=CH—, —C≡C—, —$CF_2O$—, —$OCF_2$—, —COO—, or —OCO—, $X^1$ represents a fluorine atom, a chlorine atom, a trifluoromethyl group, a trifluoromethoxy group, a difluoromethyl group, or an isocyanate group or cyano group, and $n^1$ represents 0, 1, or 2, provided that plural $C^1$ and $Z^1$ may be the same or different when $n^1$ represents 2);

the general formula (III-a):

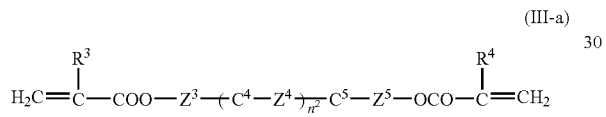

(III-a)

(in the formula (III-a), $R^3$ and $R^4$ each independently represents a hydrogen atom or a methyl group, $C^4$ and $C^5$ each independently represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s), or trifluoromethoxy group(s) as substituent(s)), $Z^3$ and $Z^5$ each independently represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^4$ represents a single bond, —$CH_2CH_2$—, —$CH_2O$—, —$OCH_2$—, —$CH_2CH_2O$—, —$OCH_2CH_2$—, —$CH_2CH_2CH_2O$—, —$OCH_2CH_2CH_2$—, —$CH_2CH_2OCO$—, —$OCOCH_2CH_2$—, —$CH_2CH_2COO$—, —$OCOCH_2CH_2$—, —CH=CH—, —C≡C—, —$CF_2O$—, —$OCF_2$—, —COO—, or —OCO—, and $n^2$ represents 0, 1, or 2, provided that plural $C^4$ and $Z^4$ may be the same or different when $n^2$ represents 2);

the general formula (III-b):

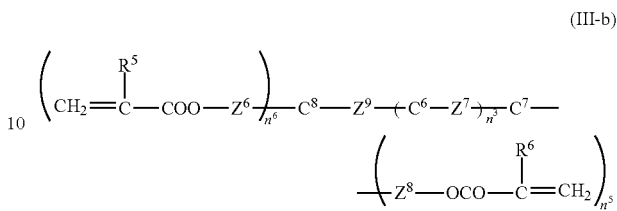

(III-b)

(in the formula (III-b), $R^5$ and $R^6$ each independently represents a hydrogen atom or a methyl group, $C^6$ represents a 1,4-phenylene group, a 1,4-cyclohexylene group, a pyridine-2,5-diyl group, a pyrimidine-2,5-diyl group, a pyridazine-3,6-diyl group, a 1,3-dioxane-2,5-diyl group, a cyclohexene-1,4-diyl group, a decahydronaphthalene-2,6-diyl group, a 1,2,3,4-tetrahydronaphthalene-2,6-diyl group, a 2,6-naphthylene group, or an indan-2,5-diyl group (the 1,4-phenylene group, the 1,2,3,4-tetrahydronaphthalene-2,6-diyl group, the 2,6-naphthylene group, and the indan-2,5-diyl group among these groups are unsubstituted, or can contain one, or two or more fluorine atom(s), chlorine atom(s), methyl group(s), trifluoromethyl group(s) or trifluoromethoxy group(s) as substituent(s)), $C^7$ and $C^8$ each independently represents a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group, $Z^6$ and $Z^8$ each independently represents a single bond or an alkylene group of 1 to 15 carbon atoms (one, or two or more methylene group(s) existing in the alkylene group each independently may be substituted with an oxygen atom, —CO—, —COO—, or —OCO— in a manner that any oxygen atoms are not directly bonded to each other, and one, or two or more hydrogen atom(s) existing in the alkylene group each independently may be substituted with a fluorine atom, a methyl group, or an ethyl group), $Z^7$ and $Z^9$ each independently represents a single bond, —$CH_2CH_2$—, —$CH_2O$—, —$OCH_2$—, —$CH_2CH_2O$—, —$OCH_2CH_2$—, —$CH_2CH_2CH_2O$—, —$OCH_2CH_2CH_2$—, —$CH_2CH_2OCO$—, —$COOCH_2CH_2$—, —$CH_2CH_2COO$—, —$OCOCH_2CH_2$—, —CH=CH—, —C≡C—, —$CF_2O$—, —$OCF_2$—, —COO—, or —OCO—, $n^3$ represents 0, 1, or 2, provided that plural $C^6$ and $Z^7$ may be the same or different when $n^3$ represents 2, and $n^5$ and $n^6$ each independently represents 1, 2, or 3);

the general formula (III-c):

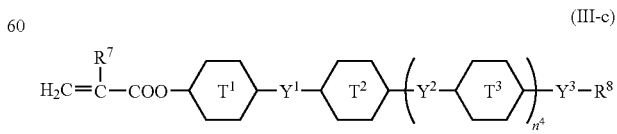

(III-c)

(in the formula (III-c), $R^7$ represents a hydrogen atom or a methyl group, 6-membered rings $T^1$, $T^2$ and $T^3$ each independently represents any one of:

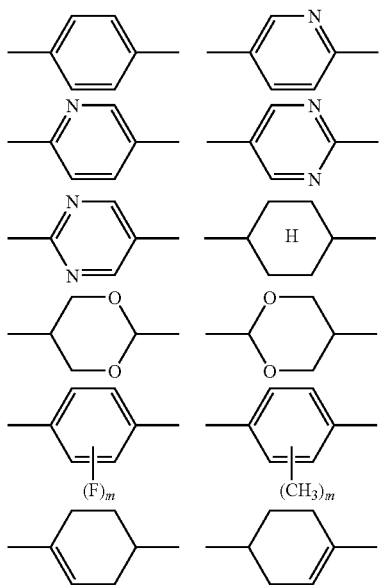

(in which m represents an integer of 1 to 4), $n^4$ represents an integer of 0 or 1, $Y^1$ and $Y^2$ each independently represents a single bond, —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH$_2$=CHCH$_2$CH$_2$—, or —CH$_2$CH$_2$CH=CH—, $Y^3$ represents a single bond, —COO—, or —OCO—, and $R^8$ represents a hydrocarbon group of 1 to 18 carbon atoms); and the general formula (IV-a) or (IV-b):

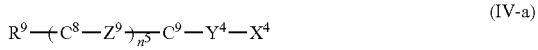 (IV-a)

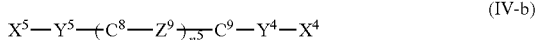 (IV-b)

(in the formula (IV-a) and (IV-b), $R^9$ represents an alkyl group of 1 to 18 carbon atoms or an alkenyl group of 2 to 18 carbon atoms (one, or two or more methylene group(s) existing in the alkyl group or an alkenyl group each independently may be substituted with an oxygen atom in a manner that any oxygen atoms are not directly bonded to each other), $C^8$ and $C^9$ each independently represents a 1,4-phenylene group, a 1,4-cyclohexylene group, or a pyrimidine-2,5-diyl group (the 1,4-phenylene group or the 1,4-cyclohexylene group among these groups is unsubstituted, or can contain one, or two or more fluorine atom(s), chlorine atom(s), methyl group(s), cyano group(s), trifluoromethyl group(s) or trifluoromethoxy group(s) as substituent(s)), $Z^9$ represents a single bond, —CH$_2$CH$_2$—, —C≡C—, —CF$_2$O—, —COO—, or —OCO—, $Y^4$ and $Y^5$ each independently represents a single bond, an oxygen atom, an alkylene group of 1 to 14 carbon atoms, —OCH$_2$—, —COO—, —OCO—, —OCH$_2$CH$_2$—, or —OCOCH$_2$—, $n^5$ represents 0, 1, or 2, provided that plural $C^8$ and $Z^9$ may be the same or different when $n^5$ represents 2, and $X^4$ and $X^5$ each independently represents a group represented by any of general formulas (IV-c) to (IV-h):

 (IV-c)

 (IV-d)

 (IV-e)

 (IV-f)

 (IV-g)

 (IV-h)

(in the formulas (IV-c) to (IV-h), the symbol * represents that a carbon atom is an asymmetric carbon, $R^c$, $R^d$, $R^e$, $R^f$, and $R^g$ each independently represents an alkyl group of 2 to 20 carbon atoms (one, or two or more methylene group(s) existing in the alkyl group each independently may be substituted with an oxygen atom, —CO—, —COO—, or —OCO— in a manner that any oxygen atoms are not directly bonded to each other), $X^c$, $X^d$, and $Y^d$ each independently represents a fluorine atom, a chlorine atom, a methyl group, or a cyano group, $X^e$ and $Y^e$ each independently represents a hydrogen atom, a fluorine atom, a chlorine atom, a methyl group, or a cyano group,)

$X^h$ and $Y^h$ each independently represents a fluorine atom, a chlorine atom, a methyl group, or a cyano group, $Z^d$ represents a single bond or methylene group, $Z^e$ represents an oxygen atom or a group represented by —OC($R^{e1}$)($R^{e2}$)O— (in which $R^{e1}$ and $R^{e2}$ each independently represents a hydrogen atom or an alkyl group of 1 to 10 carbon atoms), $Z^f$ represents a carbonyl group or a group represented by —CH($R^{f1}$)— (in which $R^{f1}$ represents a hydrogen atom or an alkyl group of 1 to 10 carbon atoms), and $Z^g$ represents —OCO—, —COO—, —CH$_2$O—, or —OCH$_2$—)).

2. The polymer-stabilized liquid crystal composition according to claim 1, wherein the content of the polymerizable compound (III) is from 0.1% to 8%, and a composition ratio (III):(I) of the polymerizable compound (III) to the polymerizable compound (I) is from 1:1 to 49:1.

3. The polymer-stabilized liquid crystal composition according to claim 1, which exhibits a smectic phase at room temperature.

4. The polymer-stabilized liquid crystal composition according to claim 3, wherein the smectic phase is a chiral smectic C phase.

5. The polymer-stabilized liquid crystal composition according to claim 4, wherein the chiral smectic C phase is a ferroelectric liquid crystal phase.

6. A liquid crystal display device, which is
a polymer-stabilized liquid crystal display device in which a low-molecular liquid crystal is immobilized by dispersing polymers in a liquid crystal in the form of nanoparticles, or
a polymer-stabilized liquid crystal display device in which a three-dimensional network of polymer chains is formed in a liquid crystal, wherein
a low-molecular liquid crystal-dispersed structure in the polymers is obtained by subjecting the polymer-stabilized liquid crystal composition according to claim 1 to ultraviolet exposure so as to polymer-stabilize alignment of the low-molecular liquid crystal.

7. A method for producing a liquid crystal display device in which alignment of a low-molecular liquid crystal is stabilized by forming nanoparticles or a three-dimensional network of polymer chains in a liquid crystal,
the method comprising subjecting the polymer-stabilized liquid crystal composition according to claim 1 to ultraviolet exposure while applying an alternating current.

8. The method for producing a liquid crystal display device according to claim 7, wherein the ultraviolet exposure is performed at a temperature, at which a liquid crystalline phase of the low-molecular liquid crystal exhibits a chiral smectic C phase, while applying an alternating current.

9. The method for producing a liquid crystal display device according to claim 7, wherein the ultraviolet exposure is performed at a temperature, at which a liquid crystalline phase of the low-molecular liquid crystal exhibits a chiral smectic C phase, while applying an alternating current of a frequency of 500 Hz to 10 kHz.

10. The method for producing a liquid crystal display device according to claim 7, wherein the ultraviolet exposure is performed at a temperature, at which a liquid crystalline phase of the low-molecular liquid crystal exhibits a chiral smectic C phase, while applying a square wave of a frequency of 500 Hz to 10 kHz.

11. The method for producing a liquid crystal display device according to claim 7, wherein the ultraviolet exposure is performed at a temperature, at which a liquid crystalline phase of the low-molecular liquid crystal exhibits a chiral smectic C phase, while applying a square wave of a frequency of 500 Hz to 10 kHz at a voltage of ±15 V or less.

12. The method for producing a liquid crystal display device according to claim 7, the ultraviolet exposure is performed at a temperature of (T−40)° C. or higher and (T+5)° C. or lower, and 35° C. or higher, where T (° C.) denotes a phase transition temperature between a smectic A phase and a chiral smectic C phase of the polymer-stabilized liquid crystal composition, while applying an alternating current to the polymer-stabilized liquid crystal composition.

13. The method for producing a liquid crystal display device according to claim 7, wherein the ultraviolet exposure is performed with ultraviolet rays of 1,000 mJ/cm$^2$ or more.

14. A liquid crystal display device obtained by the method according to claim 7.

15. The liquid crystal display device according to claim 6 further comprising: an active device of a thin film transistor device, a metal-insulator-metal device, or a thin film diode device; and
a liquid crystal pixel electrode, wherein
the liquid crystal display device is driven by the active device.

16. The liquid crystal display device according to claim 15, wherein
a storage capacity is connected in parallel between the active device and the liquid crystal pixel electrode, and Cs/Cflc is 0.1 or more and 3 or less, where Cflc denotes an electrostatic capacity of the liquid crystal pixel electrode and Cs denotes a storage capacity.

17. The liquid crystal display device according to claim 15, which is driven by a field sequential system.

18. The liquid crystal display device according to claim 14 further comprising: an active device of a thin film transistor device, a metal-insulator-metal device, or a thin film diode device; and
a liquid crystal pixel electrode, wherein
the liquid crystal display device is driven by the active device.

19. The liquid crystal display device according to claim 16, which is driven by a field sequential system.

* * * * *

UNITED STATES PATENT AND TRADEMARK OFFICE
CERTIFICATE OF CORRECTION

PATENT NO. : 8,405,799 B2
APPLICATION NO. : 12/594034
DATED : March 26, 2013
INVENTOR(S) : Fujisawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 633 days.

Signed and Sealed this
First Day of September, 2015

Michelle K. Lee
*Director of the United States Patent and Trademark Office*